United States Patent
Kopp

(10) Patent No.: US 11,472,540 B2
(45) Date of Patent: Oct. 18, 2022

(54) VARIABLE ROTARY PENDULOUS MASS VIBRATION SUPPRESSION SYSTEM

(71) Applicant: Moog Inc., East Aurora, NY (US)

(72) Inventor: John Kopp, West Seneca, NY (US)

(73) Assignee: Moog Inc., East Aurora, NY (US)

( * ) Notice: Subject to any disclaimer, the term of this patent is extended or adjusted under 35 U.S.C. 154(b) by 481 days.

(21) Appl. No.: 16/625,485

(22) PCT Filed: Mar. 30, 2018

(86) PCT No.: PCT/US2018/025508
§ 371 (c)(1),
(2) Date: Dec. 20, 2019

(87) PCT Pub. No.: WO2019/005249
PCT Pub. Date: Jan. 3, 2019

(65) Prior Publication Data
US 2021/0139137 A1 May 13, 2021

Related U.S. Application Data

(60) Provisional application No. 62/525,386, filed on Jun. 27, 2017.

(51) Int. Cl.
*B64C 27/00* (2006.01)
*H02P 5/51* (2016.01)
(Continued)

(52) U.S. Cl.
CPC ............ *B64C 27/001* (2013.01); *B64D 27/24* (2013.01); *B64D 31/00* (2013.01); *F16F 15/223* (2013.01);
(Continued)

(58) Field of Classification Search
CPC . B64C 27/001; B64C 2027/003; B64D 27/24; B64D 31/00; F16F 15/223;
(Continued)

(56) References Cited

U.S. PATENT DOCUMENTS 3,509,971 A * 5/1970 Gerstine ............... B64C 27/001
244/17.11
4,255,084 A * 3/1981 Mouille ............... B64C 27/001
416/500
(Continued)

FOREIGN PATENT DOCUMENTS

| EP | 0337040 A1 | 10/1989 |
| EP | 0776431 B1 | 4/1998 |
| WO | 2017013303 A1 | 1/2017 |

OTHER PUBLICATIONS

European Patent Office (ISA/EP), International Search Report and Written Opinion of ISA from International Patent Application No. PCT/US2018/025458, dated Jun. 25, 2018.
(Continued)

*Primary Examiner* — Medhat Badawi
(74) *Attorney, Agent, or Firm* — Harter Secrest & Emery LLP

(57) ABSTRACT

A vibration suppression unit for an aircraft comprising a mass having a center of mass, a first rotor, a second rotor, a first coupling between the first rotor and the mass, a second coupling between the second rotor and the mass, the first and second couplings having first and second coupling centers offset perpendicularly from a central axis of rotation by different radial distances and offset in axially from the center of mass with respect to the central axis by different axial distances, the first and second coupling centers having a selectively variable displacement angle defined by the angle between lines extending between the central axis of rotation and the first coupling center and the second coupling center, respectively, wherein the first rotor and the second rotor are controllable to produce a vibration control force vector having a controllable magnitude and frequency about the central axis.

24 Claims, 43 Drawing Sheets

(51) Int. Cl.
*B64D 27/24* (2006.01)
*B64D 31/00* (2006.01)
*F16F 15/22* (2006.01)

(52) U.S. Cl.
CPC .......... *H02P 5/51* (2016.02); *B64C 2027/003* (2013.01); *F16F 2222/08* (2013.01); *F16F 2230/08* (2013.01); *F16F 2230/18* (2013.01); *F16F 2232/02* (2013.01)

(58) Field of Classification Search
CPC ............... F16F 2222/08; F16F 2230/08; F16F 2230/18; F16F 2232/02; H02P 5/51
See application file for complete search history.

(56) References Cited

U.S. PATENT DOCUMENTS

| | | | | |
|---|---|---|---|---|
| 5,347,884 | A * | 9/1994 | Garnjost | F16F 15/322 29/901 |
| 5,825,663 | A * | 10/1998 | Barba | G05D 19/02 702/56 |
| 6,045,090 | A * | 4/2000 | Krysinsky | B64C 27/001 244/17.27 |
| 6,494,680 | B2 * | 12/2002 | Cardin | F16F 15/1471 416/500 |
| 7,448,854 | B2 * | 11/2008 | Jolly | B64C 27/001 415/119 |
| 7,722,322 | B2 * | 5/2010 | Altieri | G01M 1/22 415/119 |
| 7,942,633 | B2 | 5/2011 | Jolly et al. | |
| 8,021,115 | B2 * | 9/2011 | Welsh | B64C 27/001 416/500 |
| 8,090,482 | B2 * | 1/2012 | Jolly | F16F 15/002 701/3 |
| 8,162,606 | B2 * | 4/2012 | Jolly | B64C 27/001 416/61 |
| 8,267,652 | B2 * | 9/2012 | Jolly | F16F 15/223 416/61 |
| 8,313,296 | B2 | 11/2012 | Jolly et al. | |
| 8,424,799 | B2 * | 4/2013 | Popelka | F16F 7/1011 244/17.27 |
| 8,435,002 | B2 * | 5/2013 | Jolly | B64C 27/001 416/61 |
| 8,465,002 | B2 * | 6/2013 | Yli-Koski | F16K 5/184 251/312 |
| 8,474,745 | B2 * | 7/2013 | Popelka | B64C 11/008 244/17.27 |
| 8,480,364 | B2 | 7/2013 | Altieri et al. | |
| 8,639,399 | B2 | 1/2014 | Jolly et al. | |
| 8,920,125 | B2 * | 12/2014 | Welsh | F01D 5/02 416/145 |
| 9,073,627 | B2 | 7/2015 | Jolly et al. | |
| 9,139,296 | B2 | 9/2015 | Popelka et al. | |
| 9,452,828 | B2 | 9/2016 | Heverly et al. | |
| 9,776,712 | B2 | 10/2017 | Jolly et al. | |
| 10,308,355 | B2 * | 6/2019 | Arce | B64C 27/001 |
| 10,364,865 | B2 | 7/2019 | Hunter et al. | |
| 10,407,157 | B2 * | 9/2019 | Foskey | B64C 29/0033 |
| 10,457,380 | B2 * | 10/2019 | Choi | B64C 27/35 |
| 10,538,315 | B2 * | 1/2020 | Kopanski | B64C 27/008 |
| 10,723,450 | B2 * | 7/2020 | Schmiedel | B64C 27/59 |
| 2006/0135302 | A1 * | 6/2006 | Manfredotti | F16F 15/22 474/87 |
| 2014/0360830 | A1 * | 12/2014 | Heverly | B64C 27/001 188/378 |
| 2015/0203196 | A1 * | 7/2015 | Heverly, II | B64C 27/001 701/3 |
| 2016/0195161 | A1 * | 7/2016 | Hunter | F16F 15/1478 74/570.1 |
| 2021/0139137 | A1 * | 5/2021 | Kopp | F16F 15/223 |

OTHER PUBLICATIONS

European Patent Office, International Search Report in PCT Appl. PCT/US2018/025531, dated Jun. 25, 2018.
European Patent Office, International Search Report in PCT Appl. PCT/US2018/025508, dated Jun. 25, 2018.

* cited by examiner

VARIABLE ROTARY PENDULOUS MASS VIBRATION SUPPRESSION SYSTEM

TECHNICAL FIELD

The present invention relates generally to the field of aircraft vibration control systems, and more particularly to a variable rotary mass vibration suppression system.

BACKGROUND ART

Active counter-vibration devices have been used in rotary-wing aircraft, such as helicopters and tiltrotors, to oppose and cancel high levels of vibration transmitted from the rotor to the fuselage. If such vibrations are not suppressed, they can lead to structural fatigue and may be transmitted to other areas and systems of the helicopter.

Hub mounted vibration control systems are used to suppress vibrations more proximate to the source of the vibration, namely at the main rotor system. The rotor system of a conventional helicopter drives a plurality of rotor blades that are subject to numerous aerodynamic loads. Mast or hub mounted vibration isolation systems suppress vibrations at a location proximate to the source, as opposed to active vibration control systems that may be used to reduce or suppress vibrations at locations more remote from the main rotor system.

U.S. Pat. No. 8,920,125, entitled "Dual Frequency Hub Mounted Vibration Suppressor System," issued Dec. 30, 2014, is directed to a hub mounted vibration suppression system that includes an annular electric motor system defined about the axis of rotation of the main rotor system and a control system in communication with the annular electric motor system to independently control rotation of at least two masses about the axis of rotation of the main rotor system to reduce in-plane vibration of the rotating system. This patent is also directed to a method of reducing vibrations in a rotary-wing aircraft main rotor system that includes independently rotating a multiple of independently rotatable masses disposed about the axis of rotation defined by the main rotor system and controlling a relative angular position of the independent rotatable masses to reduce the vibrations of the main rotor system.

U.S. Pat. No. 8,435,002, entitled "Helicopter Vibration Control System and Rotating Assembly Rotary Forces Generators for Cancelling Vibrations," issued May 7, 2013, is directed to a rotary blade rotating hub mounted rotating assembly vibration control system that includes a first imbalance mass concentration rotor, a second imbalance mass concentration rotor, a third imbalance mass concentration rotor, and a fourth imbalance mass concentration rotor, each having a center axis of rotation that is centered on the rotating assembly center axis of rotation.

U.S. Patent Application Publication No. 2015/0203196, entitled "Active Vibration Control System With Non-Concentric Revolving Masses," is directed to vibration control system for a rotor hub having unbalanced weights each rotating about an axis non-concentric with the rotor hub axis.

BRIEF SUMMARY

With parenthetical reference to the corresponding parts, portions or surfaces of the disclosed embodiment, merely for purposes of illustration and not by way of limitation, an improved vibration suppression system (15, 215) for a rotary-wing aircraft (16) having a plurality of rotor blades (18) mounted to a rotor hub (19) and driven about a central axis of rotation (20, 220) at an operational speed and in a rotational direction (22) relative to a non-rotating body (21) of the aircraft is disclosed comprising: a vibration control mass (23, 123, 223) having a center of mass (25, 125, 225); a first rotor (28, 128, 302) having a first axis of rotation coincident with the central axis; a second rotor (30, 130, 402) having a second axis of rotation coincident with the central axis; a first coupling (32, 132, 232) between the first rotor and the vibration control mass; the first coupling having a first coupling center (33, 133, 233) offset perpendicularly from the central axis a first radial coupling distance (34, 234); a second coupling (35, 135, 235) between the second rotor and the vibration control mass; the second coupling having a second coupling center (36, 136. 236) offset perpendicularly from the central axis a second radial coupling distance (37, 237); the first radial coupling distance being different from the second radial coupling distance; the first coupling center offset axially from the center of mass with respect to the central axis by a first axial coupling distance (38, 238); the second coupling center offset axially from the center of mass with respect to the central axis by a second axial coupling distance (39, 239); the first axial coupling distance being different from the second axial coupling distance; the first and second coupling centers having a selectively variable displacement angle (40) defined by the inclusive angle between a line (34A) extending between the central axis and the first coupling center and a line (37A) extending between the central axis and the second coupling center; wherein the first rotor and the second rotor are controllable to produce a vibration control force vector (41, 41A) having a controllable magnitude and frequency about the central axis.

The first rotor and second rotor may be controllable to produce a circular vibration control force vector (41). The first rotor and second rotor may be controllable to rotate in the same direction (22) about the central axis to produce the circular vibration control force vector. The first rotor and second rotor may be controllable to produce a linear vibration control force vector (41A). The first rotor and second rotor may be controllable to rotate in opposite directions (22, 53) about the central axis to produce the linear vibration control force vector.

The center of mass may have a selectively variable radial displacement distance (42) from the central axis ranging from a minimum distance (FIG. 8) to a maximum distance (FIG. 6). When the displacement angle is zero degrees, the center of mass may be coincident to the central axis of rotation and the displacement distance may be the minimum distance from the central axis. The center of mass may be the maximum displacement distance from the central axis when the displacement angle is 180 degrees.

The first coupling center, the second coupling center and the center of mass may align on a common linkage axis (64, 164, 264) when the displacement angle is zero, whereby a sum of moments of the first coupling center about the central axis is equal and opposite to a sum of moments of the second coupling center about the central axis. The first coupling center may be offset axially from the second coupling center with respect to the central axis by a fixed distance (43, 243).

The vibration control mass may comprise a shaft (26, 126, 226) elongated about a shaft axis (64, 164, 264) and the shaft may be restrained (66, 68) from movement axially along the shaft axis relative to one of the first coupling center and the second coupling center and may be movable axially along the shaft axis relative to the other of the first coupling center and the second coupling center.

The vibration control force vector may be a function of a speed sum of a rotational speed of the hub about the central axis relative to the non-rotating body of the aircraft and a rotational speed of the center of mass about the central axis relative to the hub. The first rotor axis and the second rotor axis may be coincident with the central axis.

The vibration control mass may comprise a mass head (24, 124, 224) and a mass shaft (26, 126, 226) and the first coupling may be between the first rotor and the mass shaft and the second coupling may be between the second rotor and the mass shaft. The first coupling may comprise a first spherical bearing (32) having a first outer ring (80) orientated about the first coupling center (33) that rotates with rotation of the first rotor and a first inner ring (83) rotatable with the mass shaft in at least two degrees of motion about the first coupling center relative to the first outer ring. The second coupling may comprise a second spherical bearing (35) having a second outer ring (90) orientated about the second coupling center (36) that rotates with rotation of the second rotor and a second inner ring (93) rotatable with the mass shaft in at least two degrees of motion about the second coupling center relative to the second outer ring. The first outer ring may comprise a first annular bore having a first bore axis (33A); the first bore axis may be not concentric with the central axis; the first coupling center may be concentric with the first bore axis; the mass shaft may extend through the first annular bore; the second outer ring may comprise a second annular bore having a second bore axis (36A); the second bore axis may be not concentric with the central axis; the second coupling center may be concentric with the second bore axis; and the mass shaft may extend through the second annular bore. The mass shaft may be elongated about a shaft axis (64) intersecting the first coupling center; the mass shaft may be fixed to the first inner ring, whereby the first inner ring rotates about the first coupling center with rotation of the mass shaft about the shaft axis and the mass shaft may be restrained from movement axially along the shaft axis relative to the first inner ring; and the mass shaft may be in sliding engagement with the second inner ring, whereby the mass shaft may be movable axially along the shaft axis relative to the second inner ring and the mass shaft may be rotatable about the shaft axis relative to the second inner ring.

The first coupling (132) may comprise a universal type coupling having: a first yoke (180) that rotates with rotation of the first rotor (128); a second yoke (181) having a first pivot shaft (183B) rotationally supported by the first yoke about a first pivot axis (133B); a bearing (185) between the first pivot shaft and the first yoke; a second pivot shaft (183A) connected to the mass shaft (126) and rotationally supported by the second yoke about a second pivot axis (133A); and a bearing (184) between the second pivot shaft and the second yoke. The second coupling (135) may comprise a universal type coupling having: a third yoke (190) that rotates with rotation of the second rotor (130); a fourth yoke (191) having a third pivot shaft (193B) rotationally supported by the fourth yoke about a third pivot axis (136B); a bearing (195) between the third pivot shaft and the third yoke; a fourth pivot shaft (193A) connected to the mass shaft and rotationally supported by the fourth yoke about a fourth pivot axis (136A); and a bearing (194) between the fourth pivot shaft and the fourth yoke. The first coupling center may comprise an intersection of the first pivot axis and the second pivot axis and the second coupling center may comprise an intersection of the third pivot axis and the fourth pivot axis.

The vibration suppression system may comprise: a first motor (100, 300) driven to rotate the first rotor about the central axis; a second motor (200, 400) driven to rotate the second rotor about the central axis; and a controller (70, 270) that receives input signals and outputs command signals to the first motor and the second motor to control the speed of rotation ($\omega 1$) of the first coupling center about the central axis, the speed of rotation ($\omega 1$) of the second coupling center about the central axis, and the displacement angle. The controller may vary the displacement angle to vary the operational magnitude of the vibration control force vector. The displacement angle may be variable from 0 degrees to 360 degrees. The controller may maintain a constant displacement angle to maintain a desired constant operational magnitude of the vibration control force vector circularly about the central axis. The controller may selectively control the first motor and the second motor such that the first coupling center rotates about the central axis at a first rotational speed and the second coupling center rotates about the central axis at a second rotational speed, whereby the controller controls a speed differential between the speeds of rotation of the first and second coupling centers about the central axis. The controller may vary the displacement angle by varying the speed differential from substantially 1 to 1. The controller may vary the operational magnitude of the vibration control force vector by varying the speed differential such that the first rotational speed that the first coupling center rotates about the central axis is different from the second rotational speed that the second coupling center rotates about the central axis. The controller may maintain the operational magnitude of the vibration control force vector at a constant by maintaining the speed differential at substantially 1 to 1.

The vibration suppression system may comprise: a unit frame (217); the first motor (300) having a stator mounted to the unit frame; the first rotor (302) having an annular stator-facing rim (311) and a plurality of magnets (306) supported by the annular stator-facing rim; the second motor (400) having a stator (401) mounted to the unit frame; and the second rotor (402) having an annular stator-facing rim (411) and a plurality of magnets (406) supported by the annular stator-facing rim.

The vibration suppression system may comprise: a unit frame 17; the first motor (100) having a first stator (102) mounted to the unit frame and a first output shaft (107) rotatable about a first motor axis (103) relative to the first stator; a first rotational coupling (104) between the output shaft of the first motor and the first rotor; the second motor (200) having a second stator (101) mounted to the unit frame and a second output shaft (207) rotatable about a second motor axis (203) relative to the second stator; and a second rotational coupling (204) between the second output shaft of the second motor and the second rotor. The first rotational coupling may comprise a first output gear (108) connected to the first output shaft and a first ring gear (109) connected to the first rotor, the first ring gear in meshed engagement with the first output gear; and the second rotational coupling may comprise a second output gear (208) connected to the second output shaft and a second ring gear (209) connected to the second rotor, the second ring gear in meshed engagement with the second output gear.

The vibration suppression system may comprise a sensor (71) for measuring vibration and providing the input signals to the controller. The first motor and the second motor may each comprise a rotary electric motor. One of the first or second motors may be controlled to operate in a regeneration mode and the other of the first or second motors may be controlled to operate in a power generation mode.

The vibration suppression system may comprise a vibration control housing (17, 217) adapted to be mounted to the rotor hub (19) and operationally configured to rotate with the rotor hub (19) about the hub axis (20, 220) in the operational rotational direction of the rotor hub. The housing may comprise a base (117A) fixed to the hub, an outer ring (117B), an inside ring (117C) and a cap (117D).

The first rotor may be rotationally supported by a first bearing set (110, 305) acting between the housing and the first rotor and the second rotor may be rotationally supported by a second bearing set (210, 405) acting between the second rotor and the housing. The controller may be supported by and rotate with the vibration control housing. The vibration suppression system may further comprise a slip ring configured to provide input signals to the controller.

In another aspect, a vibration suppression system is disclosed comprising: a vibration control mass having a center of mass; a first rotor having a central axis of rotation; a second rotor having an axis of rotation coincident with the central axis of rotation; a first coupling between the first rotor and the vibration control mass; the first coupling having a first coupling center offset perpendicularly from the central axis of rotation a first radial coupling distance; a second coupling between the second rotor and the vibration control mass; the second coupling having a second coupling center offset perpendicularly from the central axis of rotation a second radial coupling distance; the first radial coupling distance being different from the second radial coupling distance; the first coupling center offset axially from the center of mass with respect to the central axis of rotation by a first axial coupling distance; the second coupling center offset axially from the center of mass with respect to the central axis of rotation by a second axial coupling distance; the first axial coupling distance being different from the second axial coupling distance; the first and second coupling centers having a selectively variable displacement angle defined by the inclusive angle between a line extending between the central axis of rotation and the first coupling center and a line extending between the central axis of rotation and the second coupling center; wherein the first rotor and the second rotor are controllable to produce a vibration control force vector having a controllable magnitude and frequency about the central axis of rotation.

The first rotor and second rotor may be controllable to produce a circular vibration control force vector or a linear vibration control force vector.

The center of mass may have a selectively variable radial displacement distance from the central axis of rotation ranging from a minimum distance to a maximum distance; when the displacement angle is zero degrees, the center of mass may be coincident to the central axis of rotation and the displacement distance may be the minimum distance from the central axis of rotation; and the center of mass may be the maximum displacement distance from the central axis of rotation when the displacement angle is 180 degrees.

The vibration control mass may comprise a mass head and a mass shaft and the first coupling may be between the first rotor and the mass shaft and the second coupling may be between the second rotor and the mass shaft. The first coupling may comprise a first spherical bearing having a first outer ring orientated about the first coupling center that rotates with rotation of the first rotor and a first inner ring rotatable with the mass shaft in at least two degrees of motion about the first coupling center relative to the first outer ring; and the second coupling may comprise a second spherical bearing having a second outer ring orientated about the second coupling center that rotates with rotation of the second rotor and a second inner ring rotatable with the mass shaft in at least two degrees of motion about the second coupling center relative to the second outer ring.

The first coupling may comprise a universal type coupling having a first yoke that rotates with rotation of the first rotor, a second yoke having a first pivot shaft rotationally supported by the first yoke about a first pivot axis, a bearing between the first pivot shaft and the first yoke, a second pivot shaft connected to the mass shaft and rotationally supported by the second yoke about a second pivot axis, and a bearing between the second pivot shaft and the second yoke. The second coupling may comprise a universal type coupling having a third yoke that rotates with rotation of the second rotor, a fourth yoke having a third pivot shaft rotationally supported by the third yoke about a third pivot axis, a bearing between the third pivot shaft and the third yoke, a fourth pivot shaft connected to the mass shaft and rotationally supported by the fourth yoke about a fourth pivot axis, and a bearing between the fourth pivot shaft and the fourth yoke. The first coupling center may comprise an intersection of the first pivot axis and the second pivot axis and the second coupling center may comprise an intersection of the third pivot axis and the fourth pivot axis.

The vibration suppression system may comprise: a first motor driven to rotate the first rotor about the central axis of rotation; a second motor driven to rotate the second rotor about the central axis of rotation; and a controller that receives input signals and outputs command signals to the first motor and the second motor to control the speed of rotation of the first coupling center about the central axis of rotation, the speed of rotation of the second coupling center about the central axis of rotation, and the displacement angle.

The controller may vary the displacement angle to vary the operational magnitude of the vibration control force vector and the controller may maintain a constant displacement angle to maintain a desired constant operational magnitude of the vibration control force vector circularly about the central axis of rotation. The controller may selectively control the first motor and the second motor such that the first coupling center rotates about the central axis of rotation at a first rotational speed and the second coupling center rotates about the central axis of rotation at a second rotational speed, whereby the controller controls a speed differential between the speeds of rotation of the first and second coupling centers about the central axis of rotation; the controller may vary the displacement angle by varying the speed differential from substantially 1 to 1; the controller may vary the operational magnitude of the vibration control force vector by varying the speed differential such that the first rotational speed that the first coupling center rotates about the central axis of rotation is different from the second rotational speed that the second coupling center rotates about the central axis of rotation; and the controller may maintain the operational magnitude of the vibration control force vector at a constant by maintaining the speed differential at substantially 1 to 1. The vibration suppression system may comprise a sensor for measuring vibration and providing the input signals to the controller.

The vibration suppression system may comprise: a unit frame; the first motor having a stator mounted to the unit frame; the first rotor having an annular stator-facing rim and a plurality of magnets supported by the annular stator-facing rim; the second motor having a stator mounted to the unit frame; and the second rotor having an annular stator-facing rim and a plurality of magnets supported by the annular stator-facing rim.

The vibration suppression system may comprise: a unit frame; the first motor having a first stator mounted to the unit frame and a first output shaft rotatable about a first motor axis relative to the first stator; a first rotational coupling between the output shaft of the first motor and the first rotor; the second motor having a second stator mounted to the unit frame and a second output shaft rotatable about a second motor axis relative to the second stator; and a second rotational coupling between the second output shaft of the second motor and the second rotor. The first rotational coupling may comprise a first output gear connected to the first output shaft and a first ring gear connected to the first rotor, the first ring gear in meshed engagement with the first output gear; and the second rotational coupling may comprise a second output gear connected to the second output shaft and a second ring gear connected to the second rotor, the second ring gear in meshed engagement with the second output gear.

DETAILED DESCRIPTION OF THE EMBODIMENTS

Figure 1:
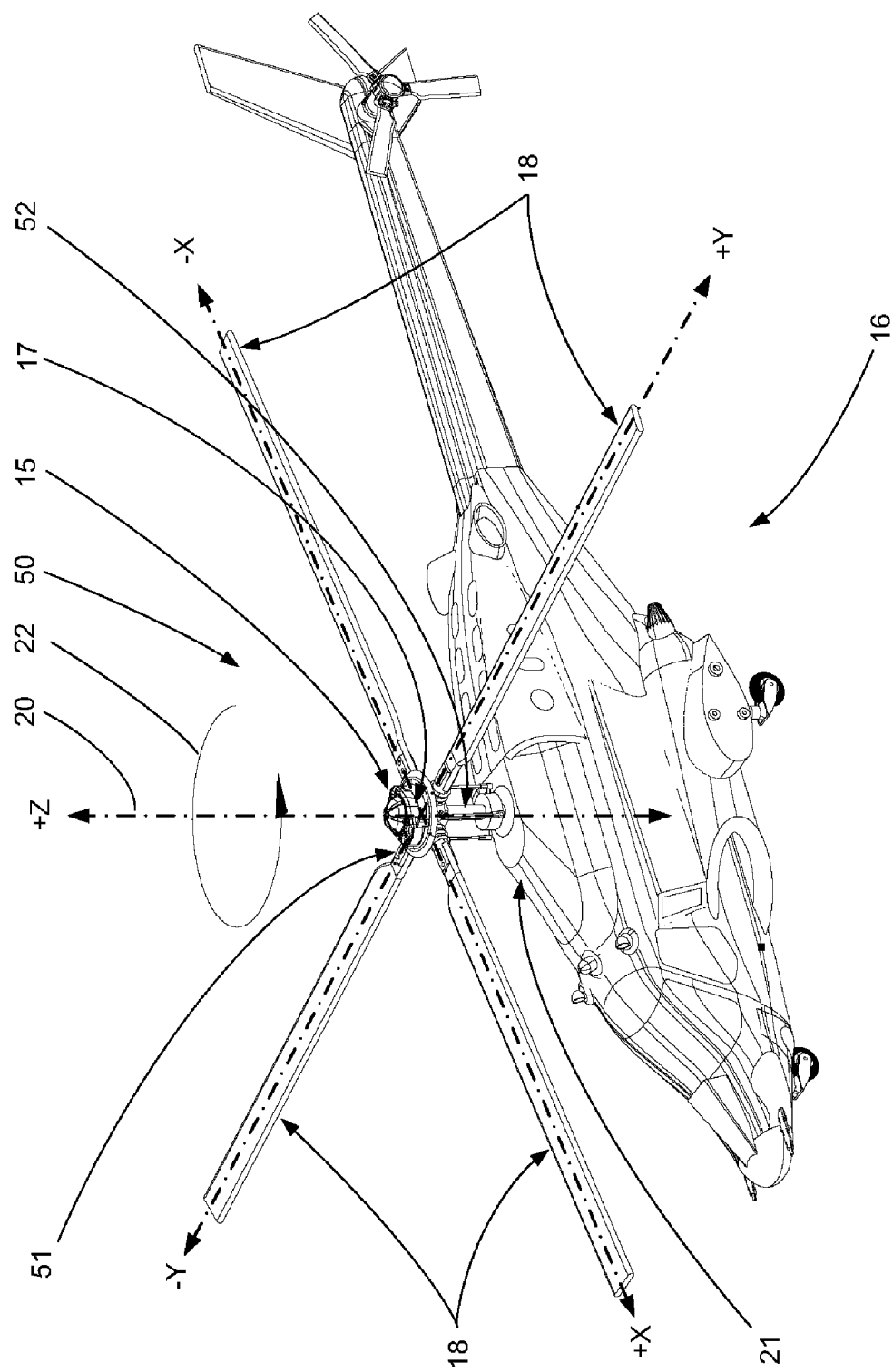
FIG. 1 is a representative perspective view of an embodiment of the improved vibration suppression system on a rotor hub assembly of a rotary wing aircraft.

At the outset, it should be clearly understood that like reference numerals are intended to identify the same structural elements, portions or surfaces consistently throughout the several drawing figures, as such elements, portions or surfaces may be further described or explained by the entire written specification, of which this detailed description is an integral part. Unless otherwise indicated, the drawings are intended to be read (e.g., crosshatching, arrangement of parts, proportion, degree, etc.) together with the specification, and are to be considered a portion of the entire written description. As used in the following description, the terms "horizontal", "vertical", "left", "right", "up" and "down", as well as adjectival and adverbial derivatives thereof (e.g., "horizontally", "rightwardly", "upwardly", etc.), simply refer to the orientation of the illustrated structure as the particular drawing figure faces the reader. Similarly, the terms "inwardly" and "outwardly" generally refer to the orientation of a surface relative to its axis of elongation, or axis of rotation, as appropriate.

FIG. 1 is a schematic illustration of helicopter 16 having airframe 21 and main rotor system 50 that is driven about center axis of rotation 20. Main rotor system 50 includes a plurality of rotor blades 18 mounted to rotor hub 19 via rotor blade grips 51. Rotor hub 19 is driven about center axis of rotation 20 by main rotor shaft 52, which is driven through a main rotor gear box by one of more aircraft engines. Main rotor shaft 52 and hub 19 rotate in rotational direction 22 at an operational rotational frequency about center axis of rotation 20. Although a helicopter is shown and described in this embodiment, vibration suppression unit 15 may be used with other types or configurations of rotary-wing aircraft or rotor-craft or in other vibration control applications.

Figure 2:
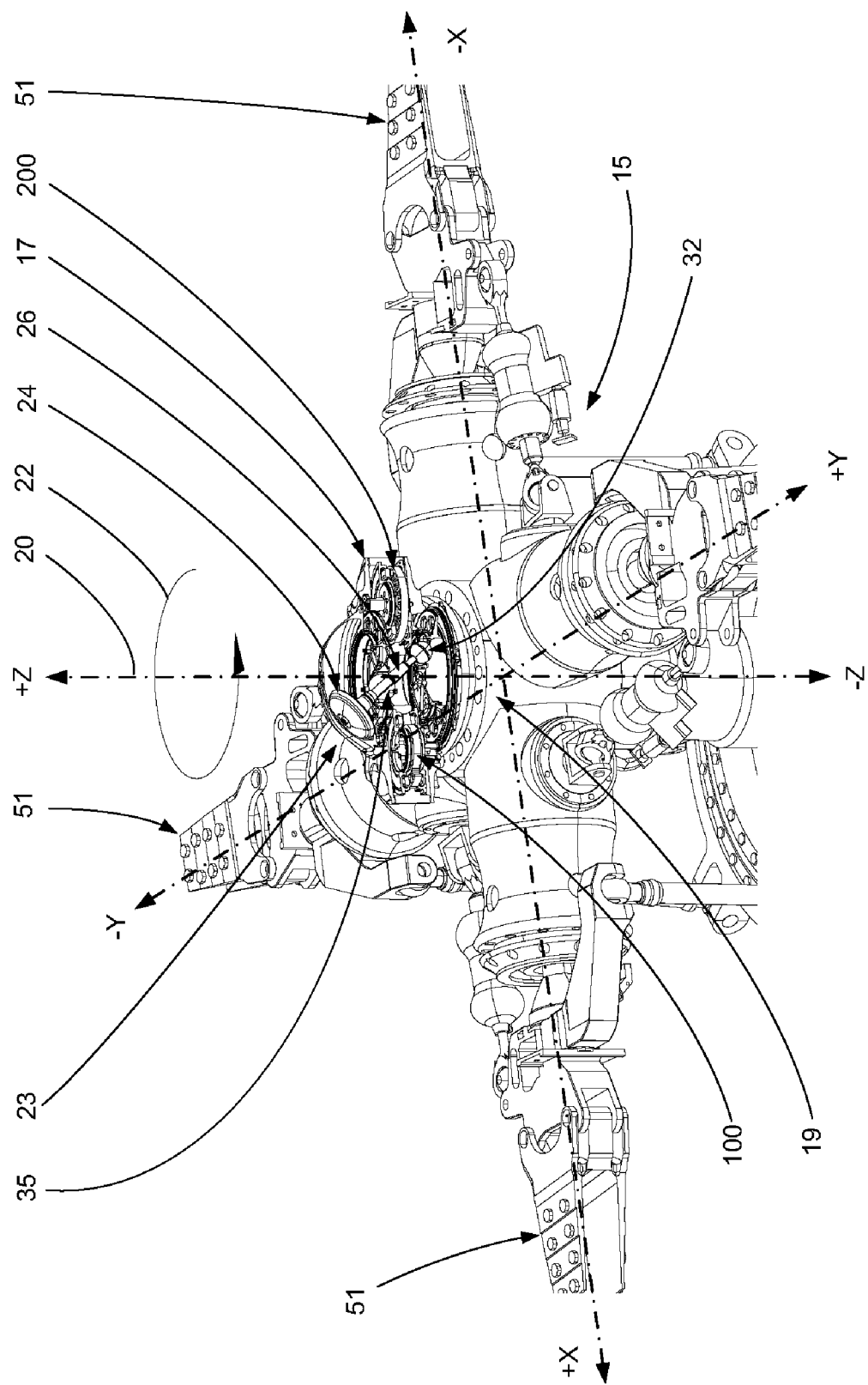
FIG. 2 is an enlarged partial cutaway perspective view of the rotor hub assembly shown in FIG. 1.
Figure 3:
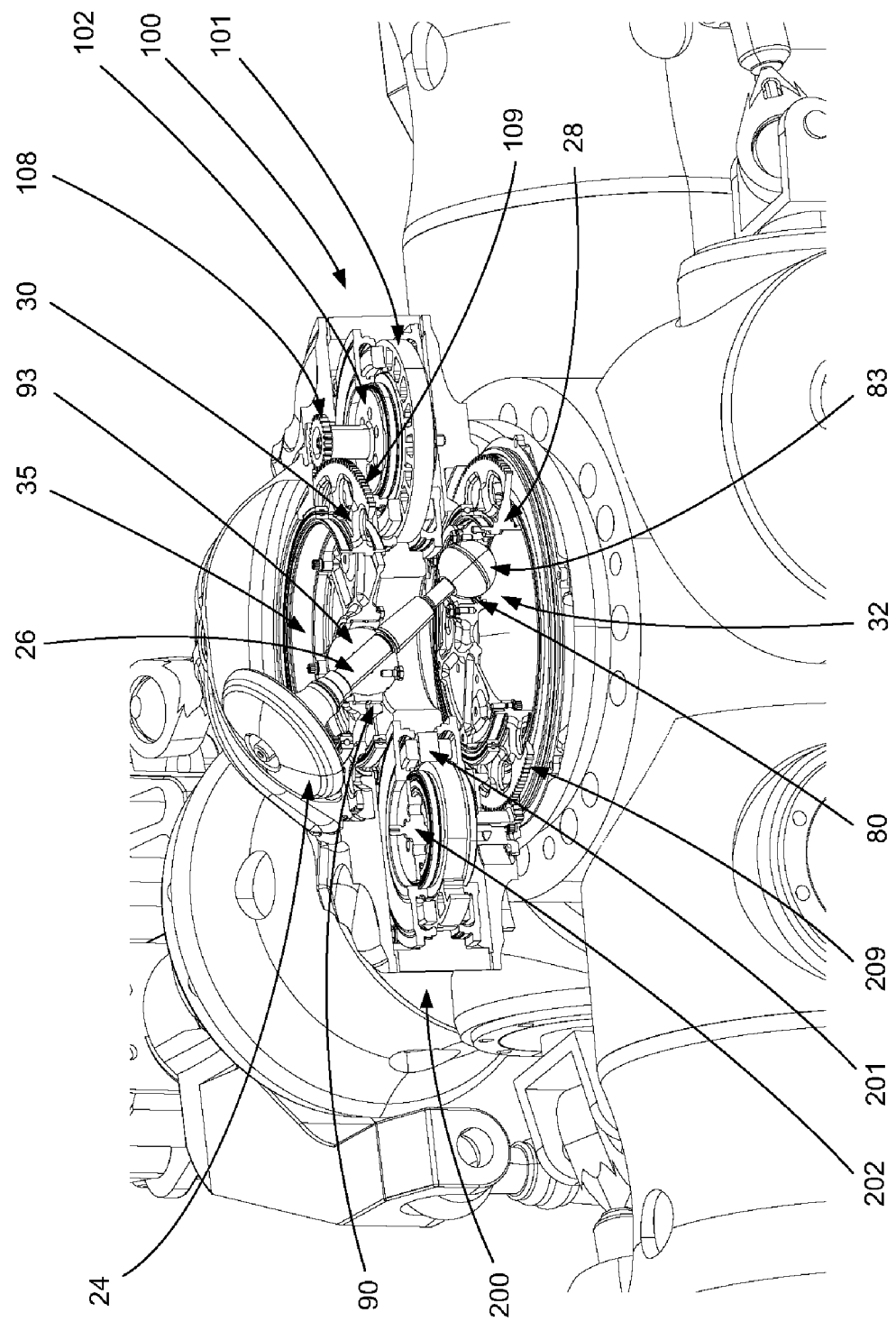
FIG. 3 is an enlarged perspective view of the rotor hub assembly shown in FIG. 2.

As shown in FIGS. 1-3, vibration suppression unit 15 is mounted on top of rotor hub 19. FIG. 1 provides a frame of reference comprising longitudinal axis x-x aligned with the longitudinal axis of helicopter 16, transverse axis y-y perpendicular to axis x-x, and vertical axis z-z concentric with center axis of rotation 20 of rotor hub 19. While system 15 is shown being mounted above hub 19, as an alternative a vibration suppression unit may be mounted directly to fuselage 21 of helicopter 16.

As shown in FIGS. 1-5, vibration suppression unit 15 is mounted to hub 19 and generally includes mass 23 having mass head 24 and mass shaft 26, first motor 100 rotationally coupled via drive train 104 to mass shaft 26 at first spherical bearing 32, second motor 200 rotationally coupled via drive train 204 to mass shaft 26 at second spherical bearing 35, and controller 70, all supported within unit housing 17 mounted to hub 19.

Unit housing 17 comprises cylindrical base 17A, orientated coaxially on hub 19 about center axis 20, outer cylindrical support frame 17B extending upward from base 17A and orientated coaxially with hub 19 about center axis 20, and upper dome 17C covering assembly 15.

Figure 4:
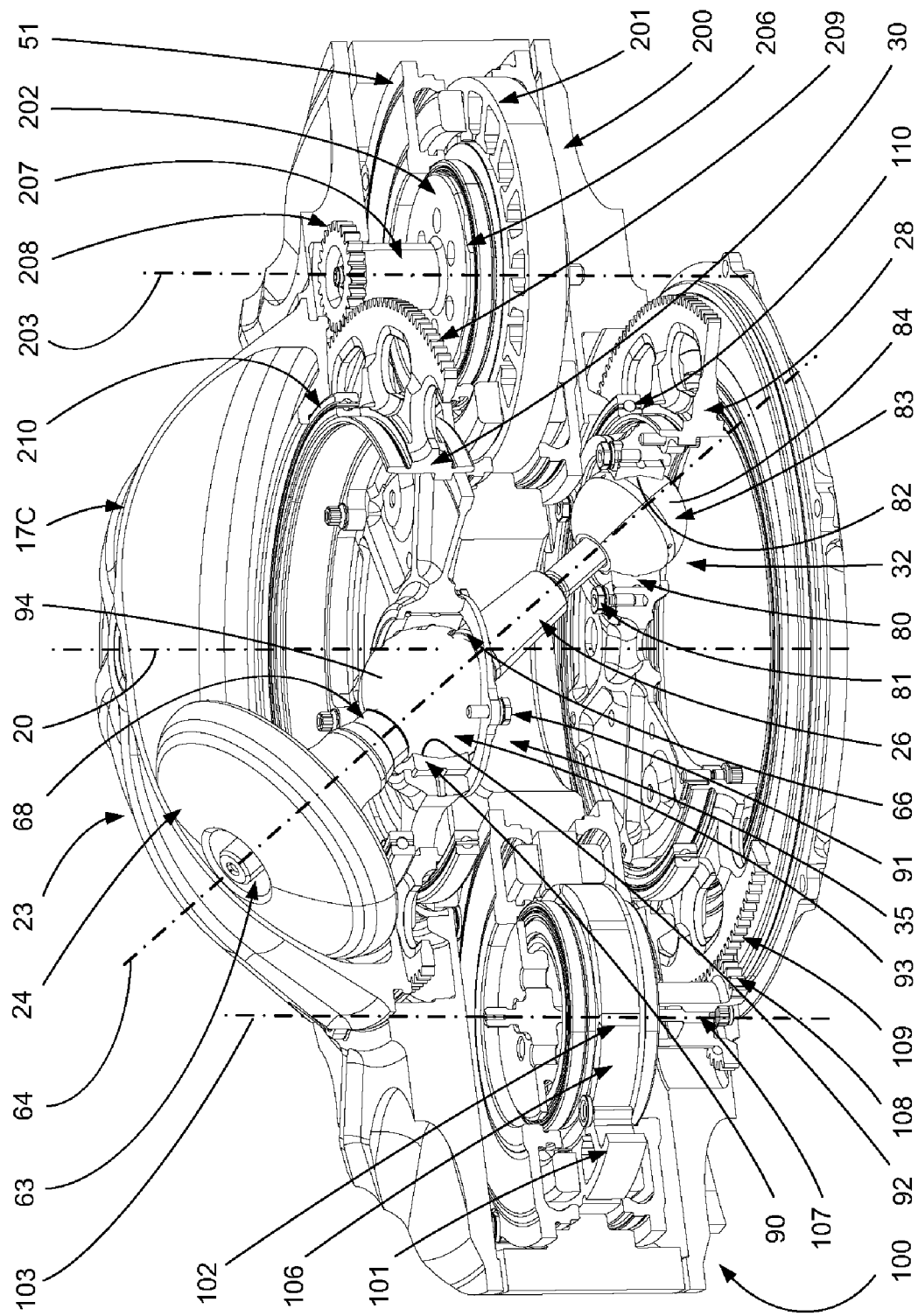
FIG. 4 is an enlarged perspective view of the vibration suppression unit shown in FIG. 3.
Figure 5:
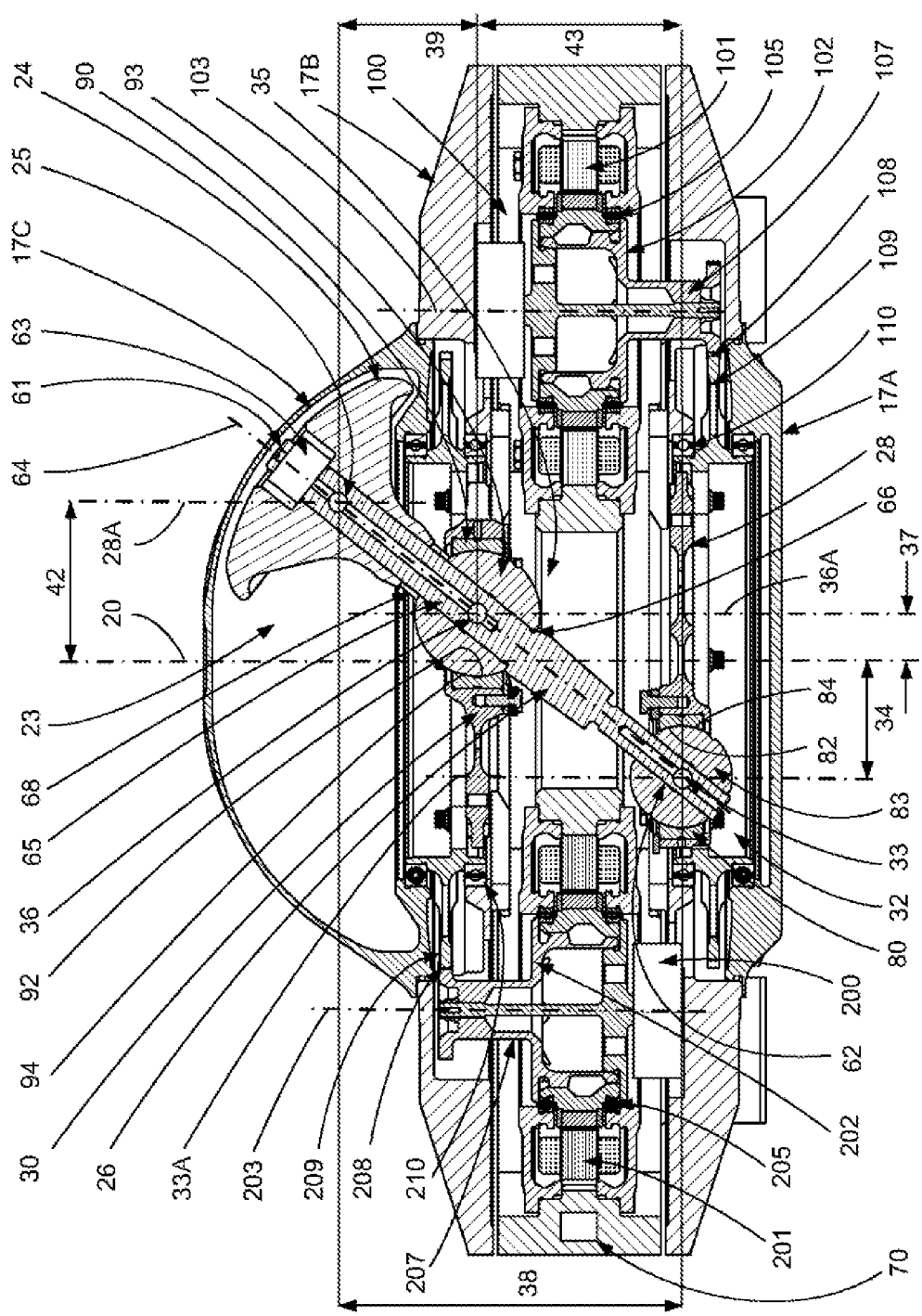
FIG. 5 is a rear vertical cross-sectional view of the vibration suppression unit shown in FIG. 4, taken generally on line A-A of FIG. 4.

As shown in FIGS. 4 and 5, housing 17 supports first motor 100 and second motor 200. Motor 100 comprises stator 101, fixed to frame 17, and rotor 102 that rotates about axis 103 relative to stator 101. Upper and lower bearings 105 act between rotor 102 and housing 17 such that rotor 102 is rotatable about axis 103 relative to housing 17. In this embodiment, motor 100 is a rotary brushless permanent magnet electric motor with rotor 102 having permanent magnets 106 and stator 101 having coils energized to drive rotor 102 about axis 103 in either rotational direction 22 or 53.

Motor 200 comprises stator 201, fixed to frame 17, and rotor 202 that rotates about an axis 205 relative to stator 201. Upper and lower bearings 205 act between rotor 202 and housing 17 such that rotor 202 is rotatable about axis 203 relative to housing 17. In this embodiment, motor 200 is a rotary brushless permanent magnet electric motor with rotor 202 having permanent magnets 206 and stator 201 having coils energized to drive rotor 202 about axis 205 in either rotational direction 22 or 53.

In this embodiment, motor axis 105, motor axis 205 and central axis 20 are parallel to each other, but are not coaxial. Shaft 107 extends from rotor 102 and terminates at output gear 108 having externally facing teeth. Gear 108 is in meshed engagement with the outwardly facing teeth of ring gear 109 fixed to direct rotor 28. Ring gear 109 is a ring-shaped annular structure orientated about center axis 20. Ring gear 109 and direct rotor 28 rotate about center axis 20 relative to housing 17 with rotation of rotor 102 and gear 108 about motor axis 103. Direct rotor 28 rotates about axis 20 opposite to the direction of rotation of rotor 102 and gear 108 about axis 103. However, other gearing configurations may be used as alternatives to drive direct rotor 28 about axis 20 relative to hub 19. In a circular force mode, first motor 100 is configured to rotate direct rotor 28 about center axis 20 relative to rotor shaft 28 and hub 19 in a rotational direction that is the same as rotational direction 22 of hub 19 and at a desire operational frequency or speed of rotation. Thus, rotor 102 is selectively driven about axis 103 in rotational direction 53 to drive rotation of direct rotor 28 about center axis 20 in rotational direction 22.

Shaft 207 extends from rotor 202 and terminates at output gear 208 having externally facing teeth. Gear 208 is in meshed engagement with the outwardly facing teeth of ring gear 209 fixed to direct rotor 30. Ring gear 209 is a ring-shaped annular structure orientated about center axis 20. Ring gear 209 and direct rotor 30 rotate about center axis 20 relative to housing 17 with rotation of rotor 202 and gear 208 about motor axis 203. Direct rotor 30 rotates about axis 20 opposite to the direction of rotation of rotor 202 and gear 208 about axis 203. However, other gearing configurations may be used as alternatives to drive direct rotor 30 about axis 20 relative to hub 19. In a circular force mode, second motor 200 is configured to rotate direct rotor 30 about center axis 20 relative to rotor shaft 28 and hub 19 in a rotational direction that is the same as rotational direction 22 of hub 19 and at a desired operational frequency or speed of rotation. Thus, rotor 202 is selectively driven about axis 203 in rotational direction 53 to drive rotation of direct rotor 30 about center axis 20 in rotational direction 22.

As shown in FIGS. 4 and 5, direct rotor 28 is rotationally supported by housing 17. Upper and lower bearing pairs 110 act between the inner cylindrical bearing surfaces of frame 17 and the opposed outer cylindrical bearing surfaces of direct rotor 28, respectively. Direct rotor 28 is configured to rotate about axis 20 on upper and lower bearing pairs 110. Thus, direct rotor 28 is mounted on housing 17 by rolling bearings 110 such that direct rotor 28 is rotatable relative to housing 17. Direct rotor 28 has a center of mass or gravity that is substantially coincident with axis 20 about which it rotates.

As shown in FIGS. 4 and 5, direct rotor 30 is rotationally supported by housing 17. Upper and lower bearing pairs 210 act between the inner cylindrical bearing surfaces of frame 17 and the opposed outer cylindrical bearing surfaces of direct rotor 30, respectively. Direct rotor 30 is configured to rotate about axis 20 on upper and lower bearing pairs 210. Thus, direct rotor 30 is mounted on housing 17 by rolling bearings 210 such that direct rotor 30 is rotatable relative to housing 17. Direct rotor 30 has a center of mass or gravity that is substantially coincident with axis 20 about which it rotates.

In this embodiment, mass 23 comprises a generally mushroom shaped mass head 24 fixed to first threaded end portion 61 of shaft 26 by nut 63. Shaft 26 is a generally cylindrical sold member orientated about mass link axis 64 such that mass 23 is generally symmetrical about mass link axis 64 and has a center of mass or center of gravity 25 on shaft axis 64. Mass 23 is rotationally supported at spherical bearing 32 having coupling center 33 by direct rotor 28. Mass 23 is also rotationally supported at spherical bearing 35 having coupling center 36 by direct rotor 30.

In this embodiment, spherical bearing 32 is a rotary coupling about center 33 between shaft 26 of mass 23 and direct rotor 28. As shown, direct rotor 28 is fixed via bolts 81 to outer race or ring 80 orientated about coupling center 33 such that ring 80 rotates with rotation of direct rotor 28. Ring 80 has an inner bore and spherical inner diameter surface 82 and is orientated about bore axis 33A. The second end portion 62 of shaft 26, opposite to first end portion 61 and mass head 24, extends through and is attached to ball 83 having outer spherical diameter surface 84. Ball 83 is retained in outer ring 80, with surface 84 of ball 83 in sliding engagement with surface 82 of outer ring 80. Thus, outer ring 80 rotates with rotation of first direct rotor 28, and ball 83 is rotatable with mass shaft 26 in at least two degrees of motion about first coupling center 33 relative to outer ring 80.

In this embodiment, spherical bearing 35 is a rotary coupling about center 36 between shaft 26 of mass 23 and direct rotor 30. As shown, direct rotor 30 is clamped via bolts 91 to outer race or ring 90 orientated about coupling center 36 such that ring 90 rotates with rotation of second direct rotor 30. Ring 90 has an inner bore and spherical inner diameter surface 92 and is orientated about bore axis 36A. The medial portion 65 of shaft 26, between first end portion 61 and mass head 24 and second end portion 62 and ball 83, extends through and is attached to ball 93 having outer spherical diameter surface 94. Ball 93 is retained in outer ring 90, with surface 94 of ball 93 in sliding engagement with surface 92 of outer ring 90. Thus, outer ring 90 rotates with rotation of second direct rotor 30, and ball 93 is rotatable with mass shaft 26 in at least two degrees of motion about second coupling center 36 relative to outer ring 90.

Shaft 26 is restrained from movement axially in the through-bore of ball 93 along shaft axis 64 relative to ball 93 by annular step 66 in shaft 26 on one side and annular rim 68 of mass head 24 on the other side, such that shaft 26 does not move axially in either direction along shaft axis 64 relative to coupling center 36. However, end portion 62 of shaft 26 is not restrained in such a manner. Shaft end portion 62 may slide in the through-bore of ball 83, and shaft 26 is in sliding engagement with ball 83 such that shaft 26 is movable axially along shaft axis 64 relative to ball 83 and coupling center 33, and shaft 26 is rotatable about shaft axis 64 relative to ball 83 and coupling center 33.

As shown in FIGS. 4-6 and 9-9C, ring 80 is not concentric with direct rotor 28 about rotor axis of rotation 20 (a1). Rather, ring 80 is offset in rotor 28 such that coupling center 33 (p2) is offset perpendicularly from central axis 20 (a1) by first radial coupling distance 34 (r2). Similarly, ring 90 is not concentric with direct rotor 30 about rotor axis of rotation 20 (a1). Rather, ring 90 is offset in rotor 30 such that coupling center 36 (p1) is offset perpendicularly from central axis 20 (a1) by second radial coupling distance 37 (r1). As shown, first radial coupling distance 34 is different from second radial coupling distance 37. In this embodiment, first radial coupling distance 34 is about twice second radial coupling distance 37.

As also shown, mass head 24 and center of mass 25, rotor 30, and rotor 28 are stacked axially relative to center axis 20 such that coupling center 33 (p2) is offset axially from center of mass 25 with respect to central axis 20 (a1) by a first axial coupling distance 38 (h1+h2). Second coupling center 36 is in turn offset axially from center of mass 25 with respect to central axis 20 by a second axial coupling distance 39 (h1). Accordingly, first coupling center 33 is offset axially from second coupling center 36 with respect to central axis 20 by coupling distance 43 (h2). As shown, first axial coupling distance 38 is different from second axial coupling distance 39. In this embodiment, first axial coupling distance 38 is greater than second axial coupling distance 39.

Figure 6:
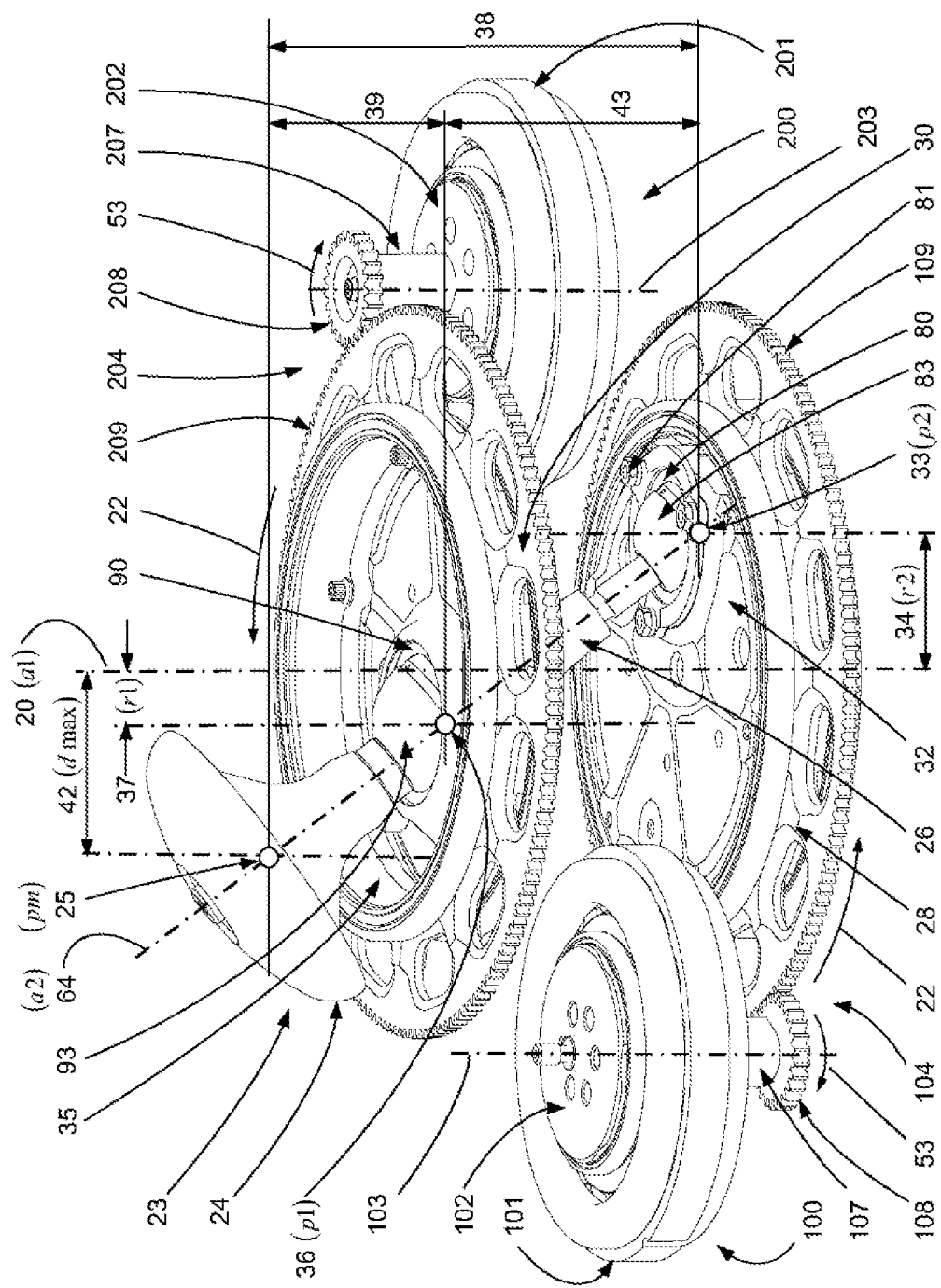
FIG. 6 is a partial perspective view of the vibration suppression unit shown in FIG. 4 in a maximum resulting force configuration.
Figure 6A:
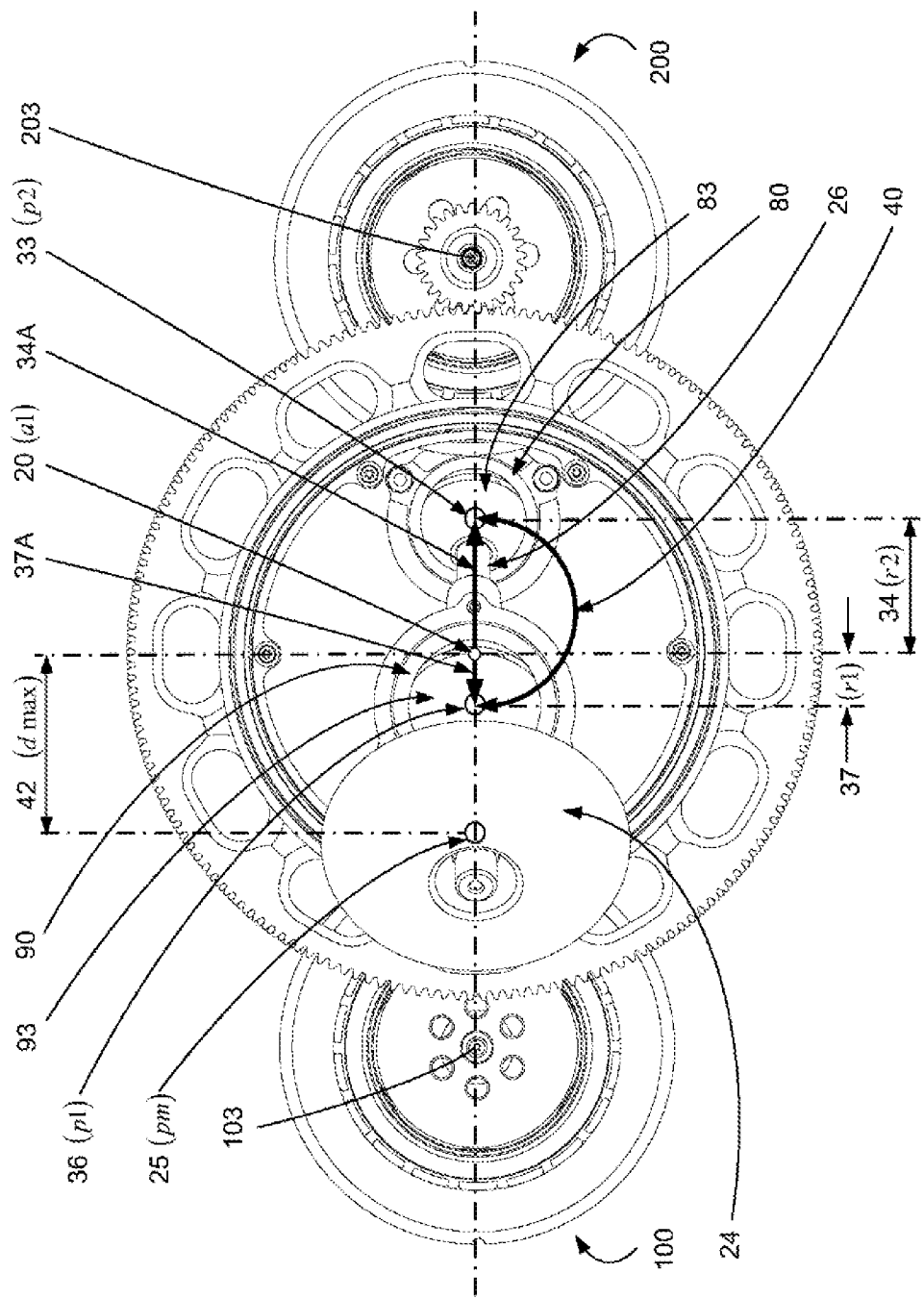
FIG. 6A is a top partial cutaway view of the vibration suppression unit shown in FIG. 6 in the maximum resulting force configuration.
Figure 6B:
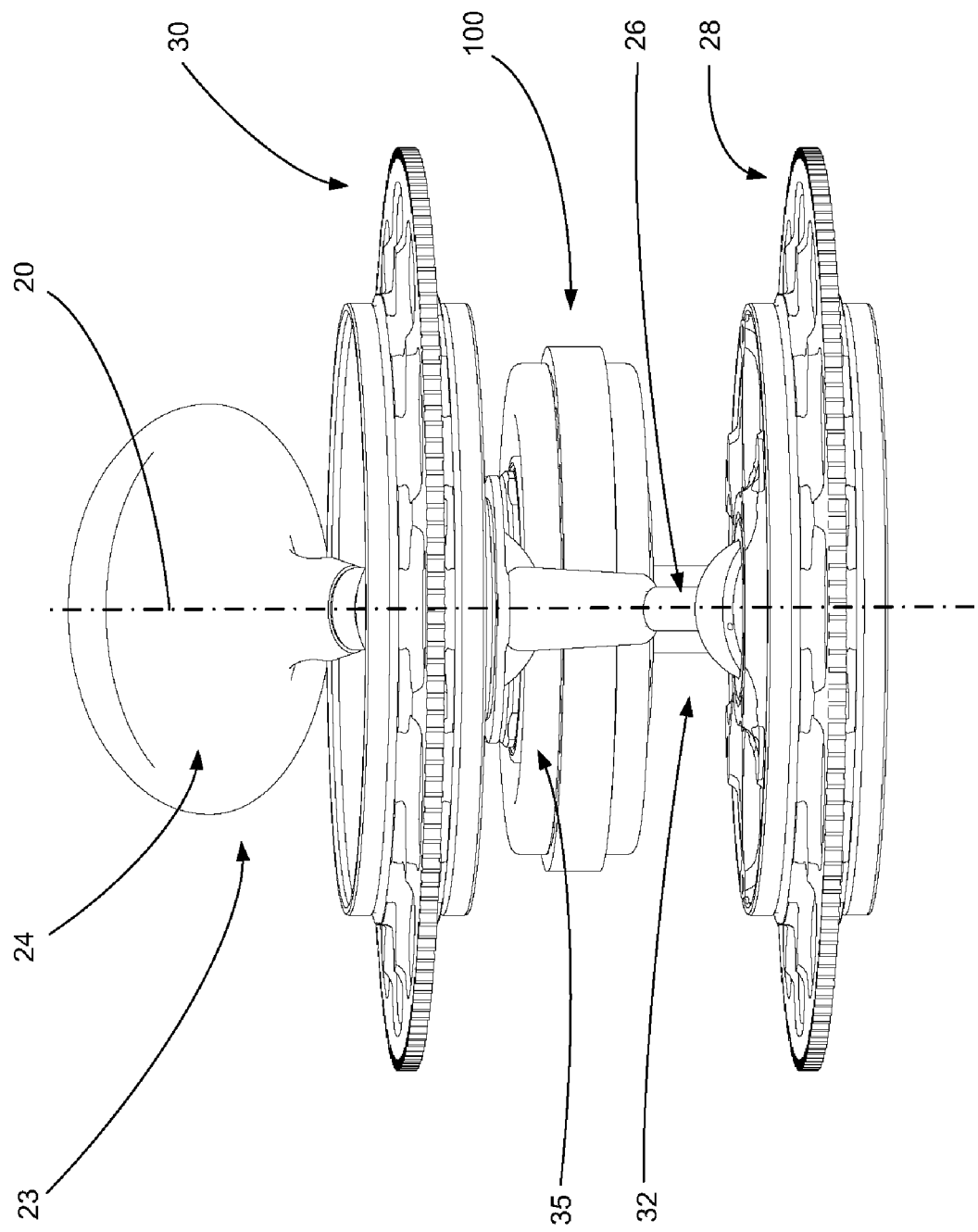
FIG. 6B is a right side view of the vibration suppression unit shown in FIG. 6 in the maximum resulting force configuration.
Figure 6C:
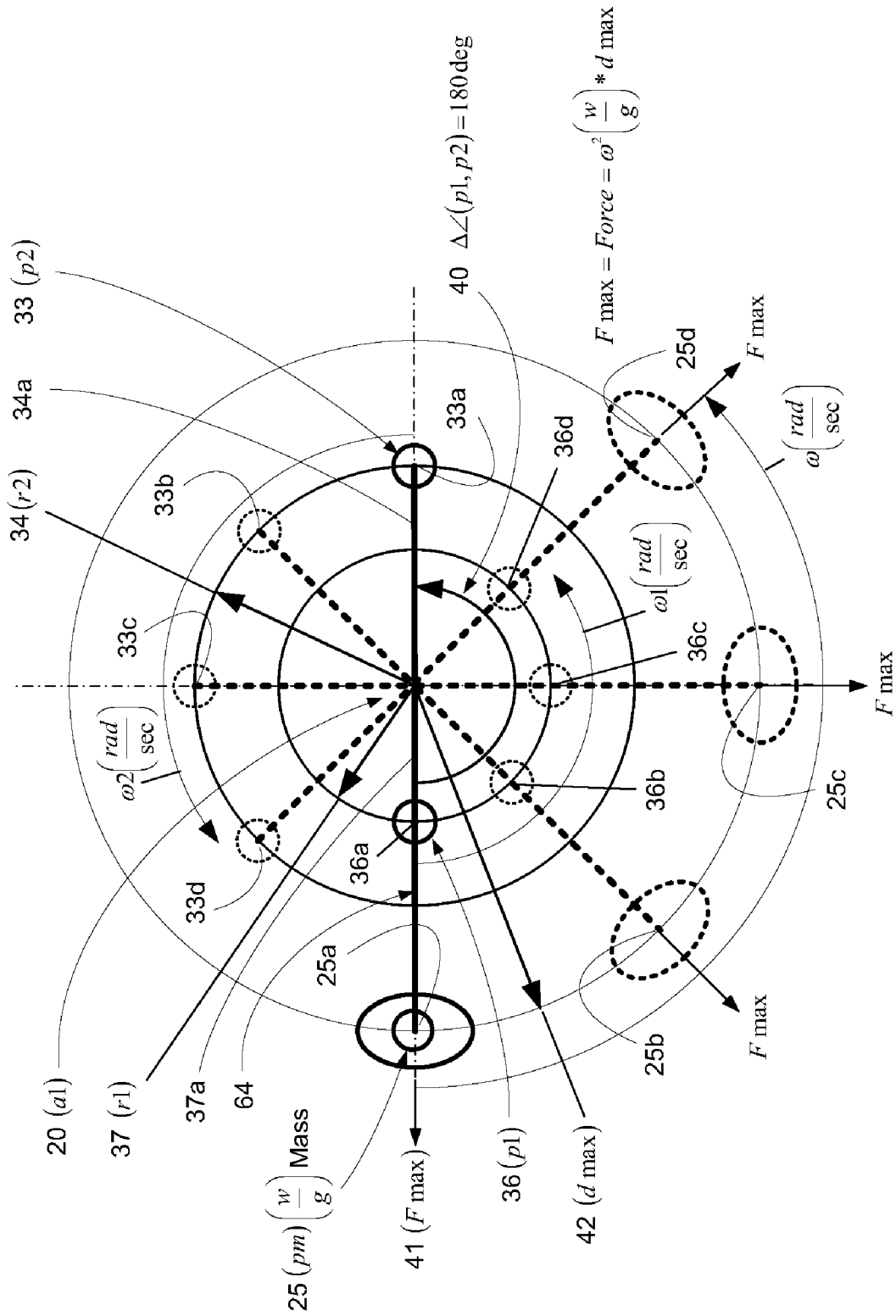
FIG. 6C is a top diagram view of the operational movement and generated counter vibration forces of the vibration suppression unit shown in FIG. 6 in a circular operation mode and in the maximum resulting force configuration.
Figure 8:
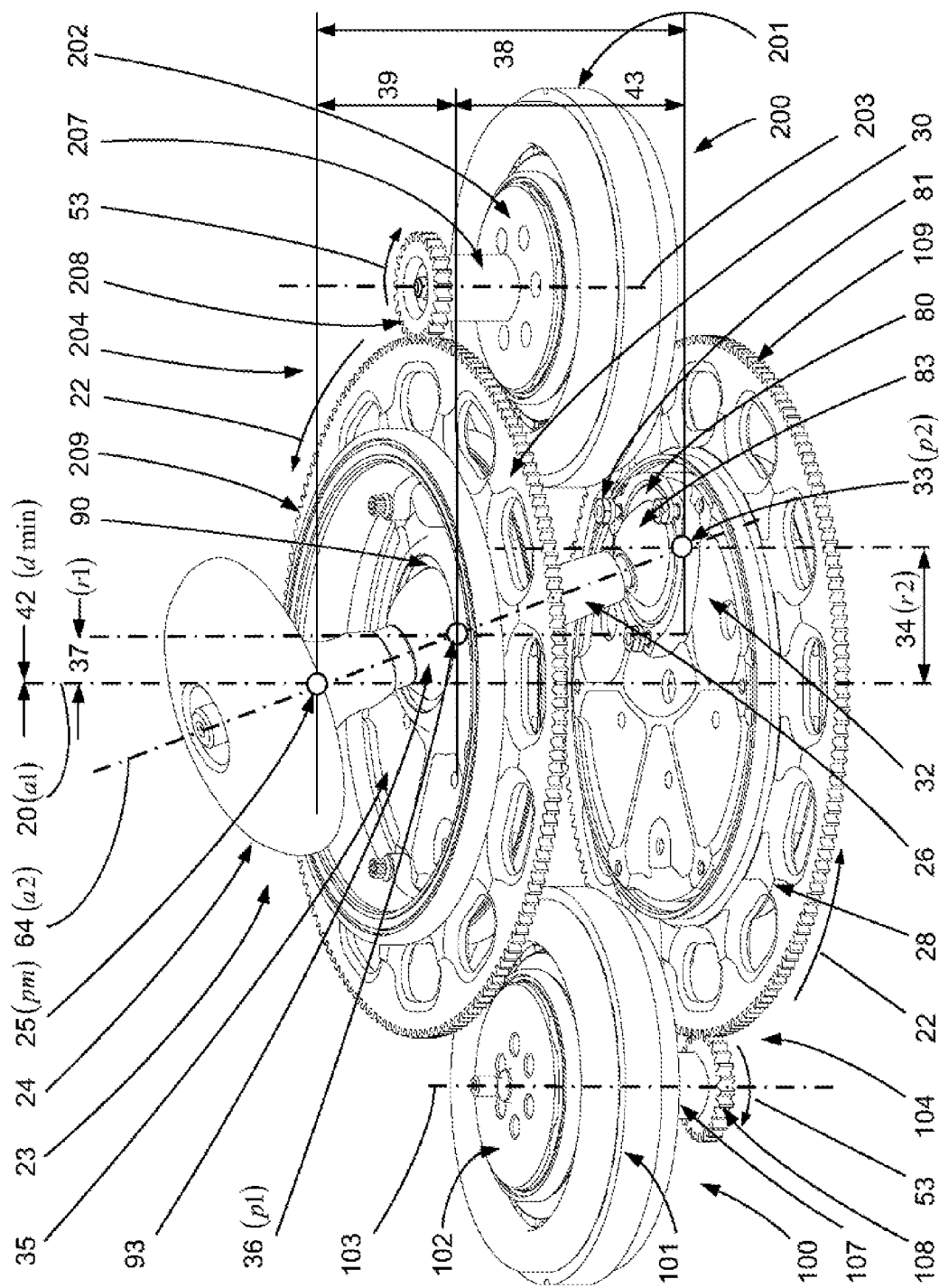
FIG. 8 is a partial perspective view of the vibration suppression unit shown in FIG. 4 in a minimum resulting force configuration.
Figure 8A:
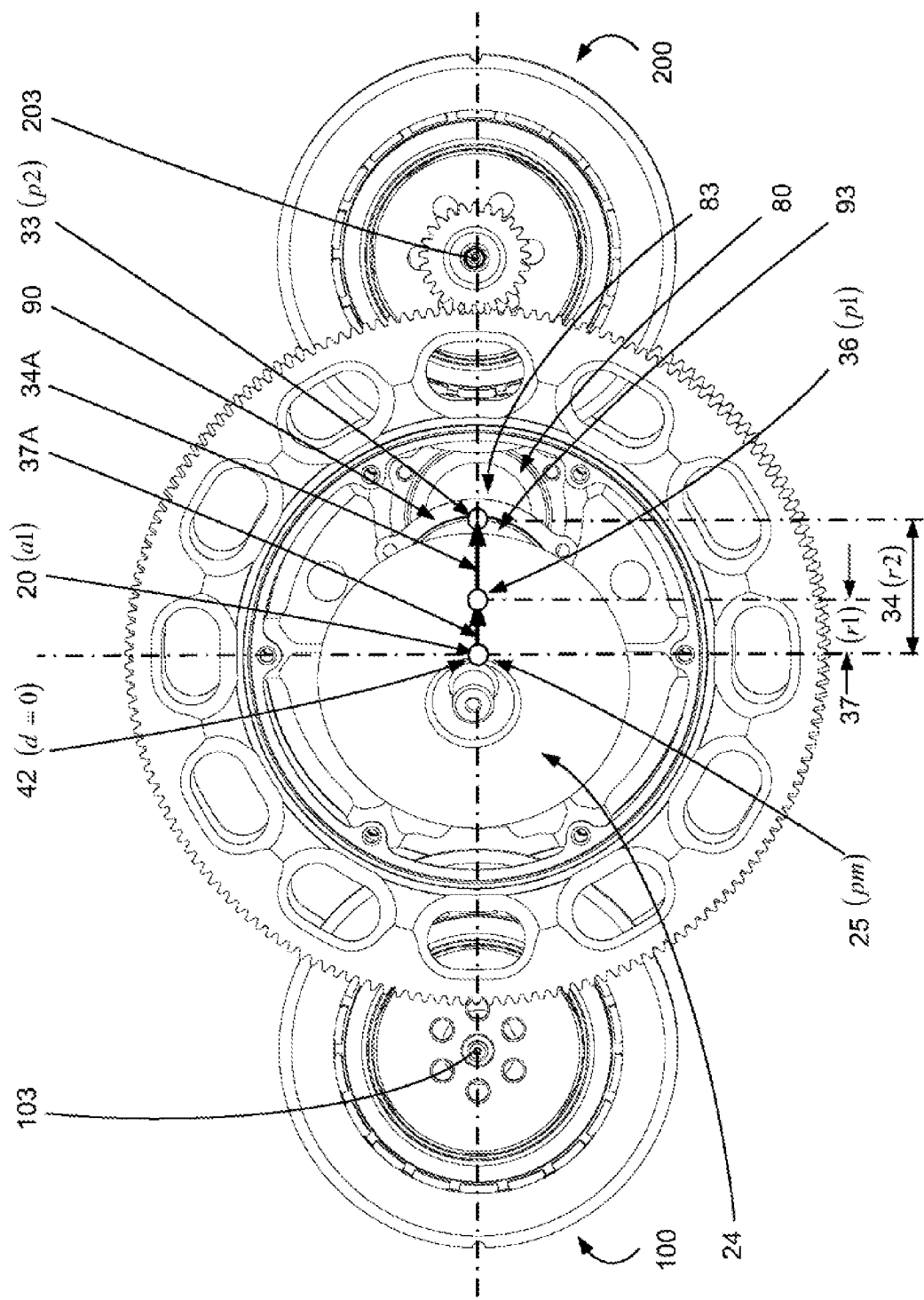
FIG. 8A is a top partial cutaway view of the vibration suppression unit shown in FIG. 8 in the minimum resulting force configuration.
Figure 8B:
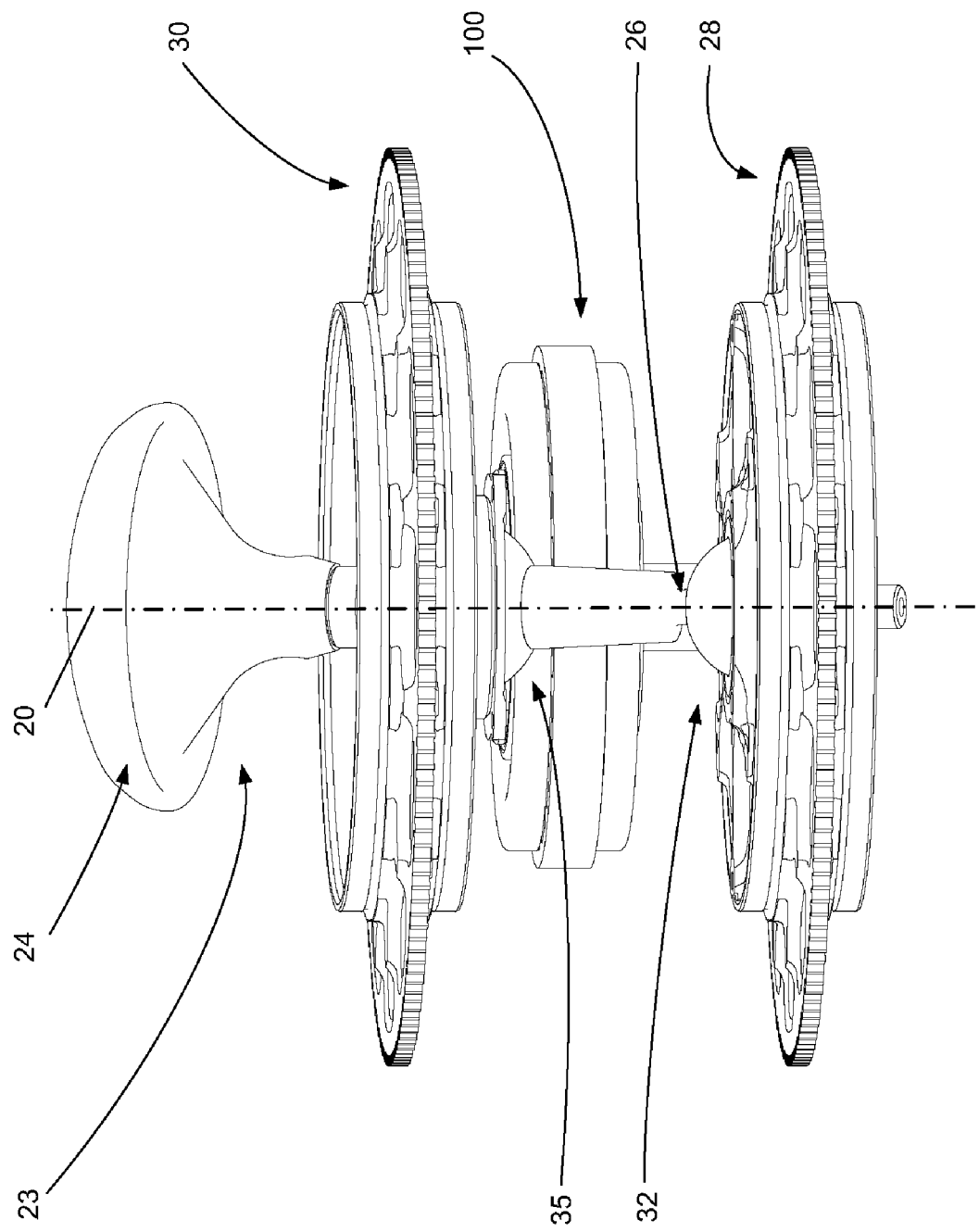
FIG. 8B is a right side view of the vibration suppression unit shown in FIG. 8 in the minimum resulting force configuration.
Figure 8C:
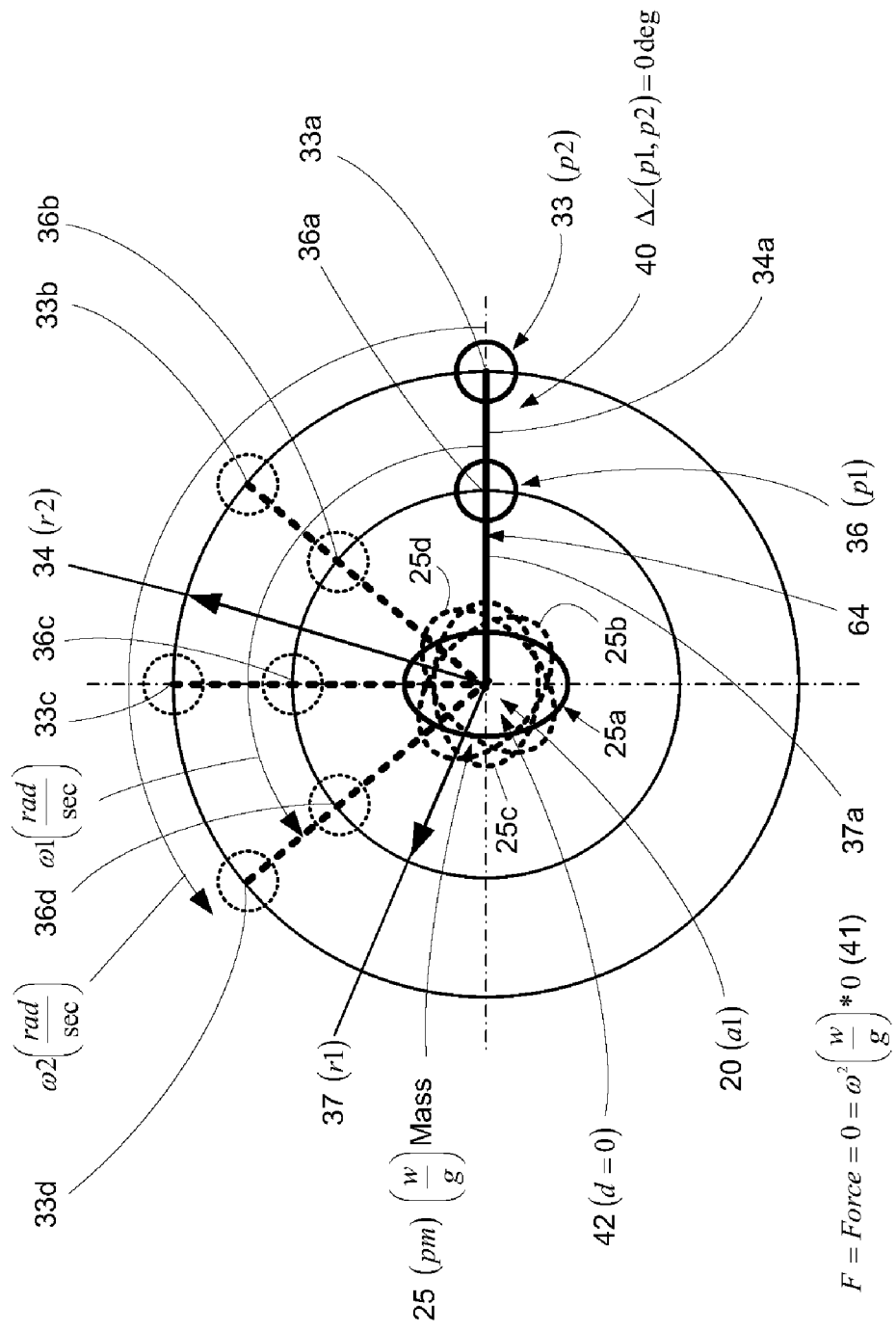
FIG. 8C is a top diagram view of the operational movement and generated counter vibration forces of the vibration suppression unit shown in FIG. 8 in a circular operation mode and in the minimum resulting force configuration.
Figure 9:
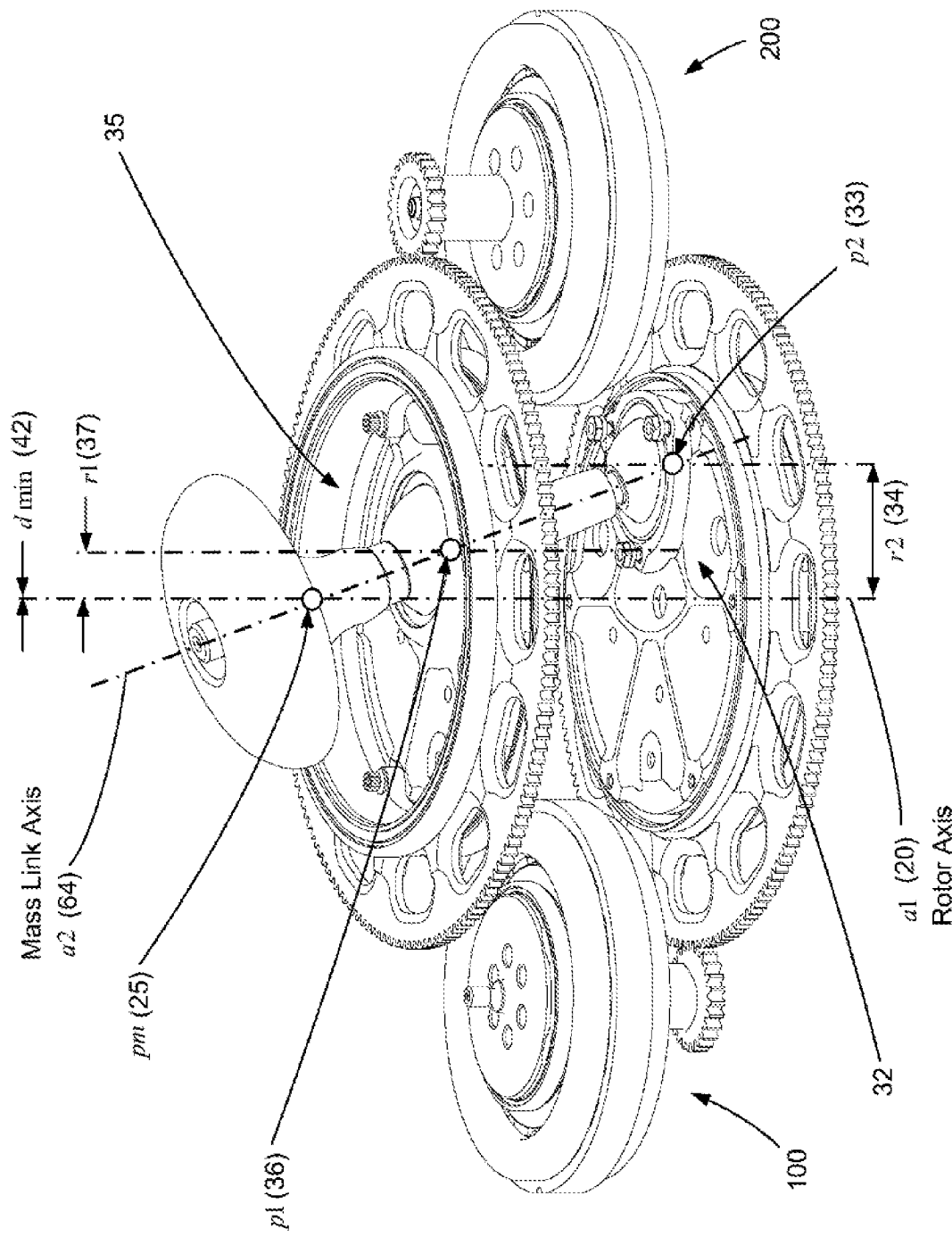
FIG. 9 is a partial perspective view of the vibration suppression unit shown in FIG. 4 in the minimum resulting force configuration.
Figure 9A:
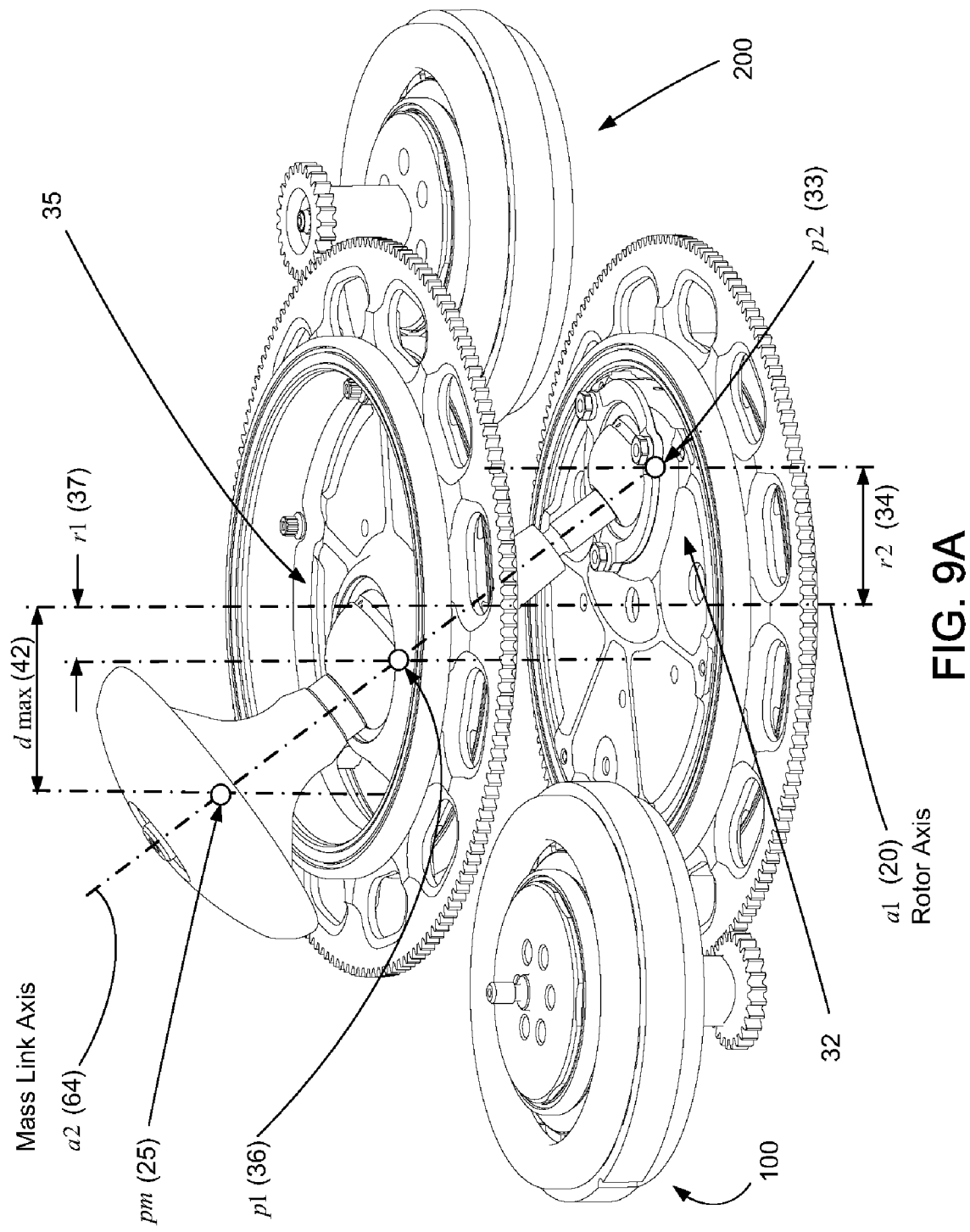
FIG. 9A is a partial perspective view of the vibration suppression unit shown in FIG. 9 in the maximum resulting force configuration.
Figure 9B:
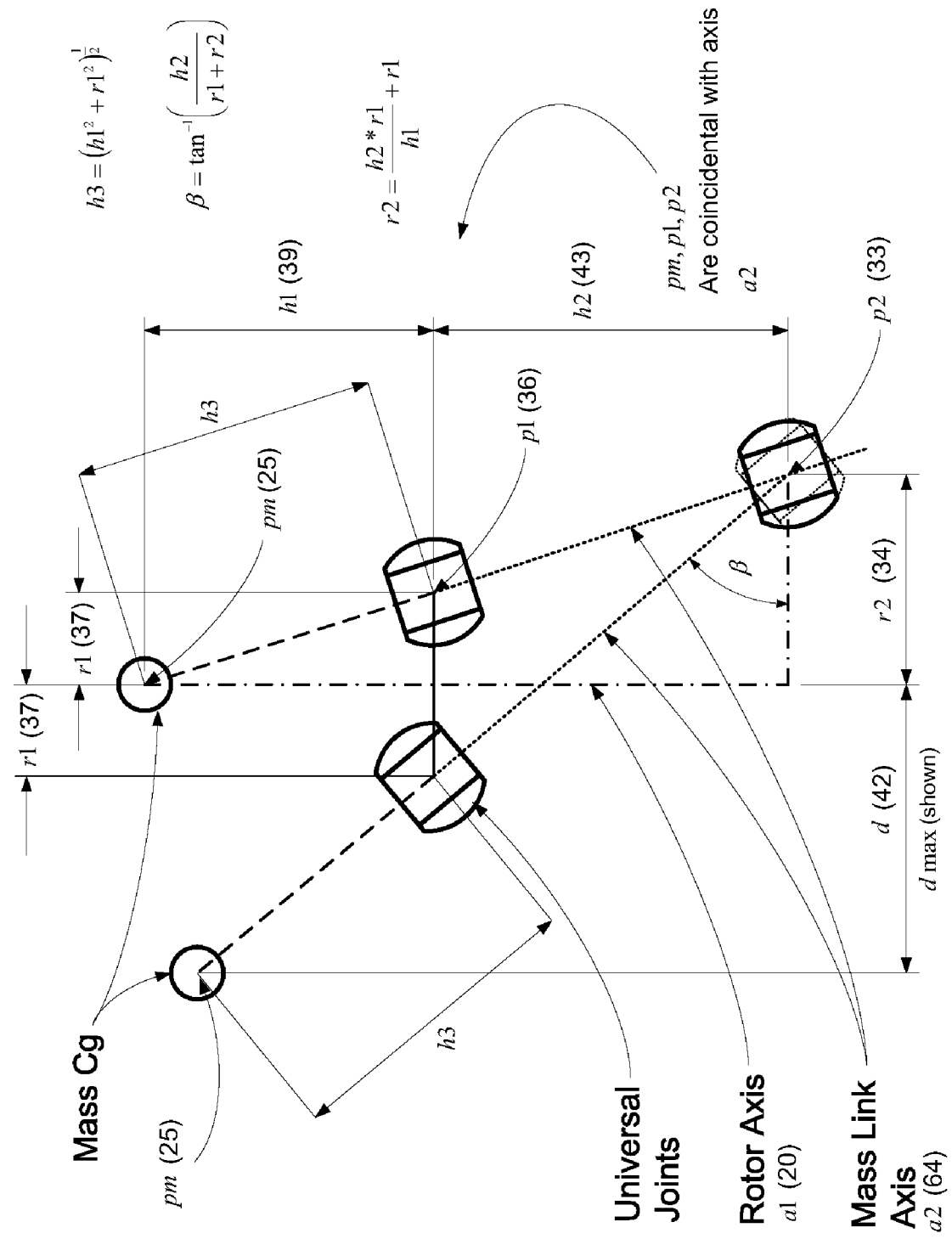
FIG. 9B is a side diagram view showing the dimensional relationships of the vibration suppression mass shown in FIG. 9 in the minimum resulting force configuration together with the dimensional relationships of the vibration suppression mass shown in FIG. 9A in the maximum resulting force configuration.

As shown in FIG. 3, based on radial displacement distance 34 of coupling center 33 from axis 20 and radial displacement distance 37 of coupling center 36 from central axis 20, center of mass 25 has a selectively variable radial displacement distance 42 ($d$) from central axis 20 ranging from a minimum distance (d=0), as shown in FIGS. 8-8C and 9, to a maximum distance (d max), as shown in FIGS. 6-6C and 9A.

As shown in FIGS. 6A, 6C, 7A, 7C, 8A, 8C and 9C, ring 80 and first coupling center 33, and ring 90 and second coupling center 36, have a selectively variable displacement angle 40 ($\Delta <(p1, p2)$) about center axis 20 defined by the inclusive angle between a phantom or imaginary line 34A, extending between central axis 20 and first coupling center 33 perpendicular to central axis 20, and a phantom or imaginary line 37A extending between central axis 20 and second coupling center 36 perpendicular to central axis 20. As shown, the magnitude of radial displacement distance 42 (d) of center of mass 25 from central axis 20, between a minimum distance (d=0) and a maximum distance (d max), is selectively varied by selectively varying displacement angle 40 between zero degrees and 180 degrees, respectively. As shown, the relative rotation of rotors 28 and 30 may be controlled to vary displacement angle 40, and thereby vary displacement distance 42 (d), to produce a vibration control force vector 41 having a controllable magnitude and frequency about central axis 20.

Thus, first coupling center 33 (p2) is driven about center axis 20 (a1) via rotor 28 in a circular path of radius 34 (r2). Rotor 28 is selectively driven by motor 100 and output gear 108 in rotational direction 22 at a rotational frequency ($\omega 1$). Thus, rotation of rotor 102 and output gear 108 about axis 103 causes rotation of rotor 28 and first coupling center 33 about axis 20. Second coupling center 36 (p1) is driven about center axis 20 (a1) via rotor 30 in a circular path of diameter 37 (r1). Rotor 30 is selectively driven by motor 200 and output gear 208 in rotational direction 22 at a rotational frequency ($\omega 2$). Thus, rotation of rotor 202 and output gear 208 about axis 203 causes rotation of rotor 30 and first coupling center 36 about axis 20. Accordingly, first coupling center 33 and second coupling center 36 may be selectively driven to rotate about axis 20 at the same time. When first coupling center 33 and second coupling center 36 are driven to rotate about axis 20 at the same speed ($\omega 1 = \omega 2$), displacement angle 40, and thereby displacement distance 42 (d), are maintained at a constant. To vary displacement angle 40, and thereby vary displacement distance 42 ($d$) to produce a desired vibration control force vector 41, first coupling center 33 and second coupling center 36 are driven to rotate about axis 20 at different speeds ($\omega 1 \neq \omega 2$) until the desired displacement distance 42 ($d$) and magnitude of vibration control force vector 41 is achieved. The relative positions of first coupling center 33 and second coupling center 36 to each other about center axis 20 is controlled to control distance 42 of center of mass 25 from central axis 20. In this embodiment, such distance can range from a maximum eccentric distance (d max) when displacement angle 40 is 180 degrees, such that first coupling center 33 and second coupling center 36 are the furthest from each other about central axis 20, as shown in FIGS. 6-6C, to a minimum eccentric distance (d=0) when displacement angle 40 is about zero degrees, such that first coupling center 33 and second coupling center 36 are angularly aligned about central axis 20, and center of mass 25 is on central axis 20, as shown in FIGS. 8-8C.

First coupling center 33 is offset a radial distance 34 from axis 20. Accordingly, rotor 28 is rotationally coupled to mass 23 such that first coupling center 33, and shaft 26 at end portion 62, rotates about axis 20 with selective rotation of drive gear 108 about axis 103. Second coupling center 36 is offset a radial distance 37 from axis 20. Accordingly, rotor 30 is also rotationally coupled to mass 23 such that second coupling center 36, and shaft 26 at intermediate portion 65, rotates about axis 20 with selective rotation of drive gear 208 about axis 203. Thus, first and second coupling centers 33 and 36 have a selectively variable displacement angle 40 defined by the inclusive angle between line 34A extending between axis 20 and first coupling center 33 and line 37A extending between axis 20 and second coupling center 36 when superimposed on the same plane perpendicular to axis 20.

As shown in FIGS. 6C, 7C, 8C and 9C, mass 23 may be controlled via motors 100 and 200 and rotors 28 and 30 to rotate center of mass 25 of mass 23 about axis 20 at a desired rotational frequency (w), which rotation results in a circular vibration control force 41. Furthermore, the magnitude of force 41 may be varied by varying angle 40, which varies distance 42 (d) of center of mass 25 from its center of rotation 20. Since rotors 28 and 30 may be rotated at different speeds to vary angle 40 and distance 42 (d), the magnitude of force 41 may be varied accordingly. When angle 40 is 180 degrees, center of mass 25 is furthest away from center of rotation axis 20 and distance 42 is a maximum (d max). When angle 40 is zero degrees, center of mass 25 is coincident with or substantially aligned on center of rotation axis 20 and distance 42 is about zero (d=0).

Figure 9C:
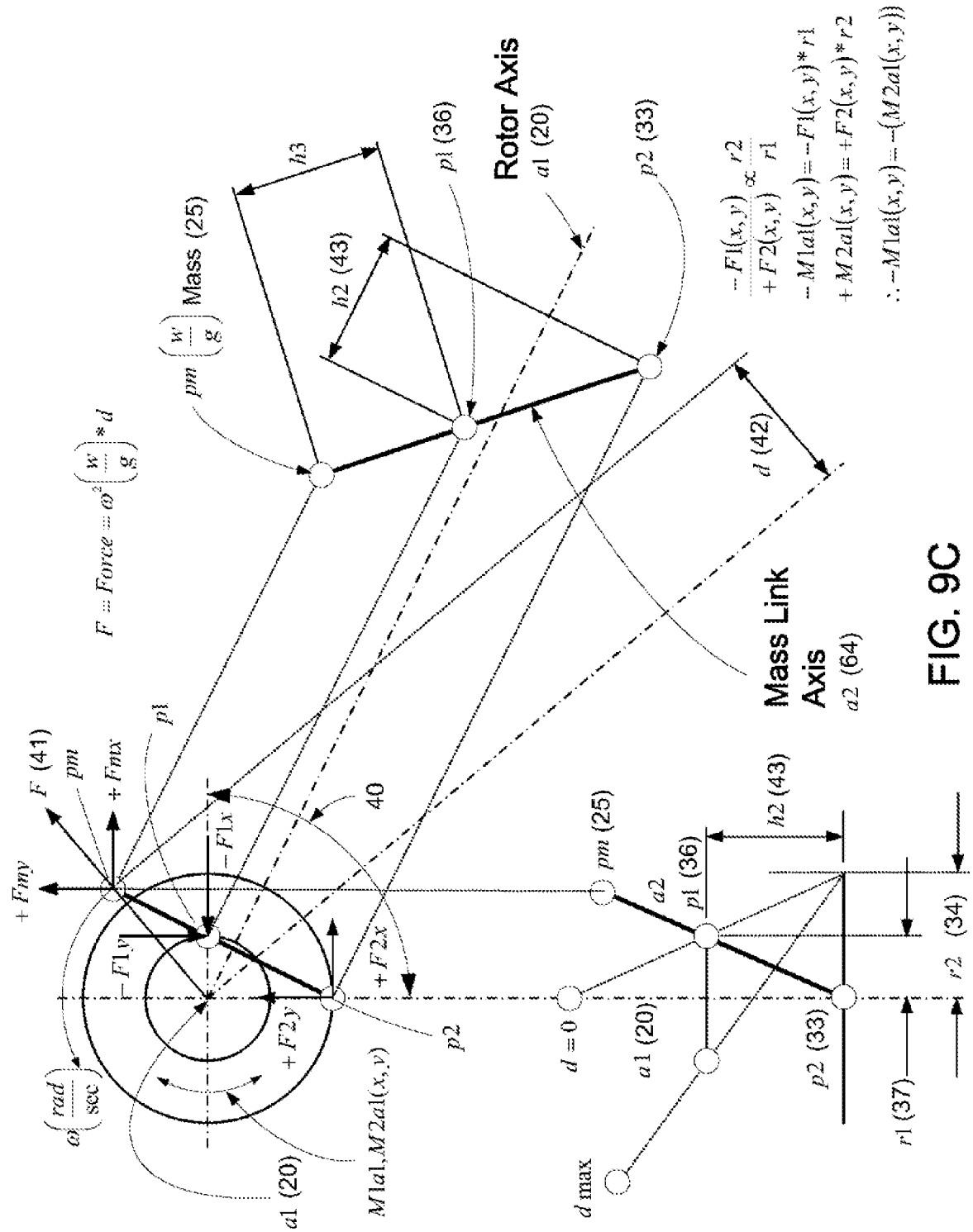
FIG. 9C is a diagram of the operation forces of the vibration suppression mass shown in FIG. 7 in the intermediate resulting force configuration.

As shown, central axis 20, motor axis 103 and motor axis 203 are substantially parallel. Shaft axis 64 and central axis 20 are not parallel. As shown in FIGS. 9-9C, center of mass 25, pivot center 36 and pivot center 33 are coincident with shaft axis 64. As shown in FIG. 9C, the moments are proportional to moment arms r1 and r2 such that moment M1 of rotor 30 and moment M2 of rotor 28 are about equal and opposite, which reduces the required motor power in the circular force mode. As shown in FIG. 14A, regenerative power circuit 76 may be added to take advantage of a mode in which one motor is controlled to operate as a generator in a regeneration mode and the other motor is controlled to operate as a driver in a power generation mode in the circular force mode. In this embodiment motors 100 and 200 are powered by 3 phase AC power source 79, rectified to DC. As shown, power control includes AC rectification filter and monitor 78, DC power input filter and monitor 77, regenerative power circuit 76, 3-phase bridges 75, and current sensors 74.

Figure 7:
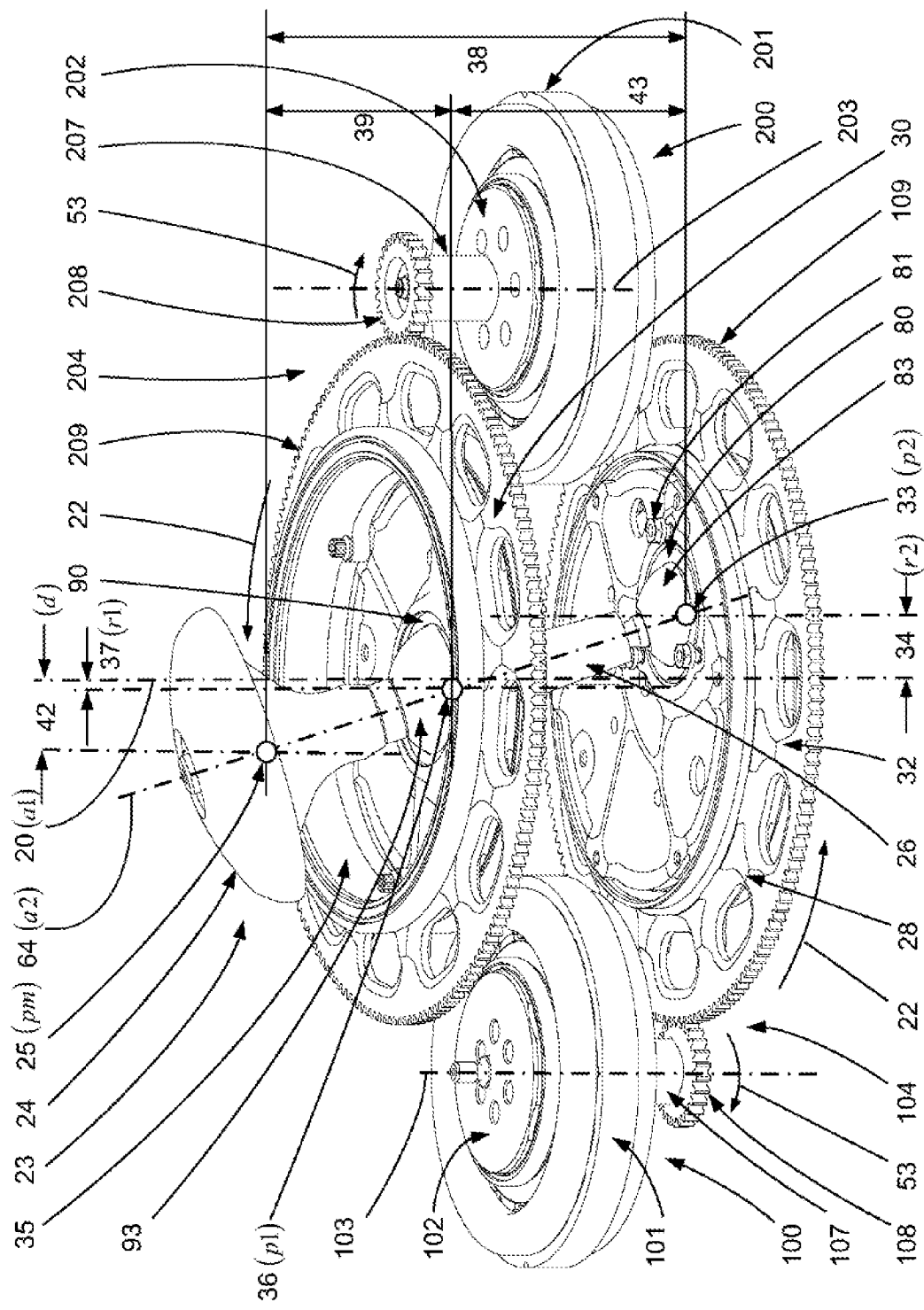
FIG. 7 is a partial perspective view of the vibration suppression unit shown in FIG. 4 in an intermediate resulting force configuration.
Figure 7A:
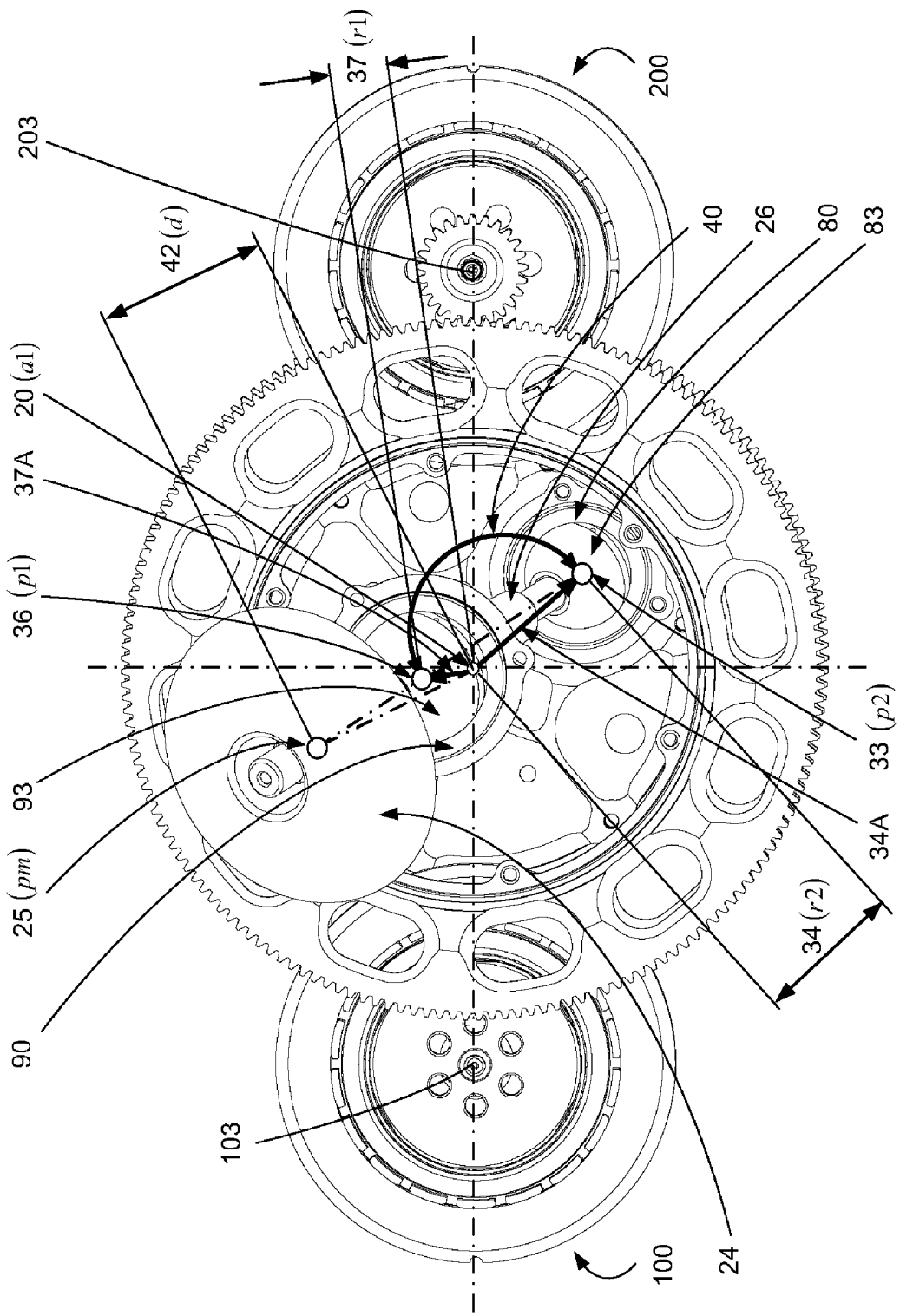
FIG. 7A is a top partial cutaway view of the vibration suppression unit shown in FIG. 7 in the intermediate resulting force configuration.
Figure 7B:
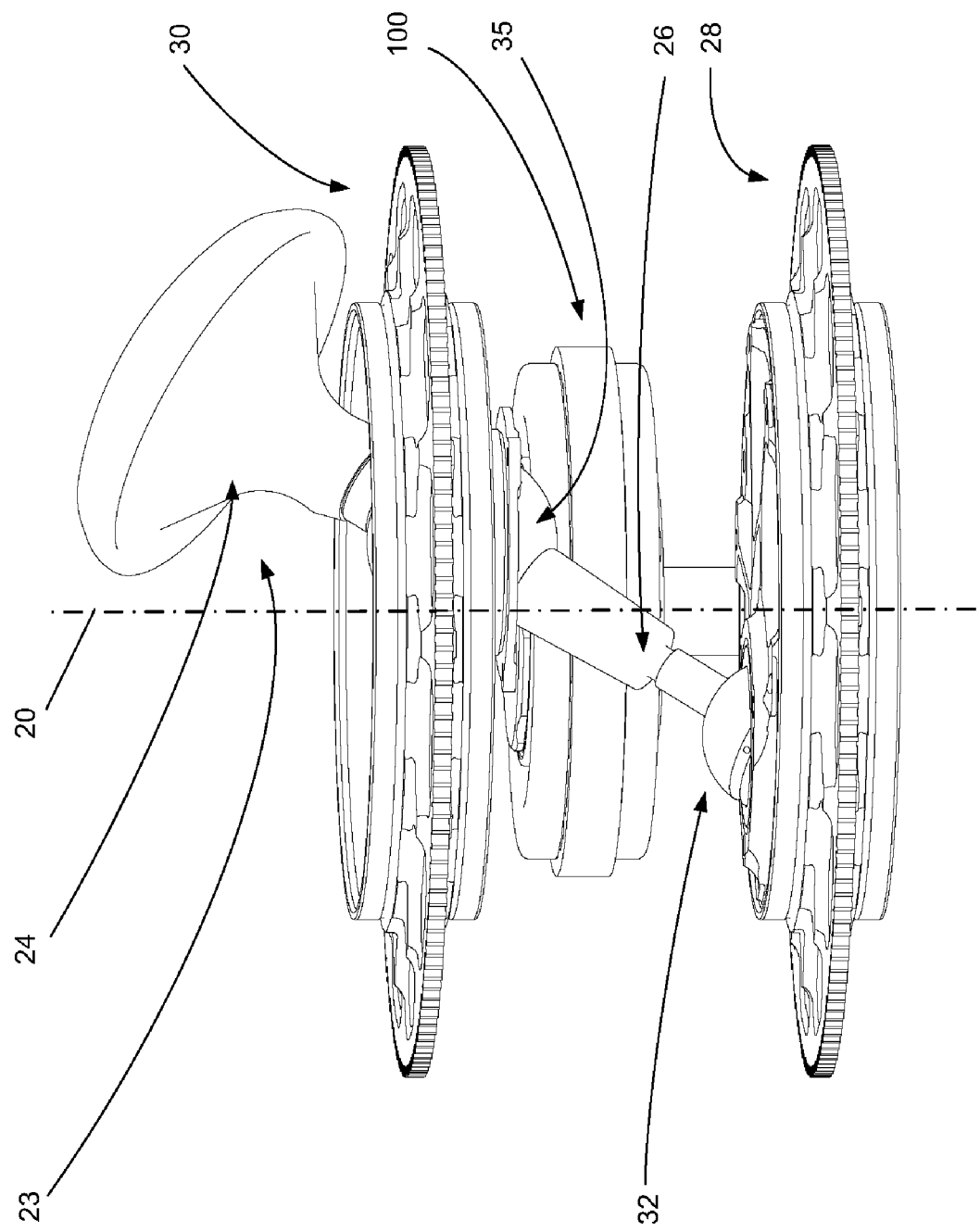
FIG. 7B is a right side view of the vibration suppression unit shown in FIG. 7 in the intermediate resulting force configuration.
Figure 7C:
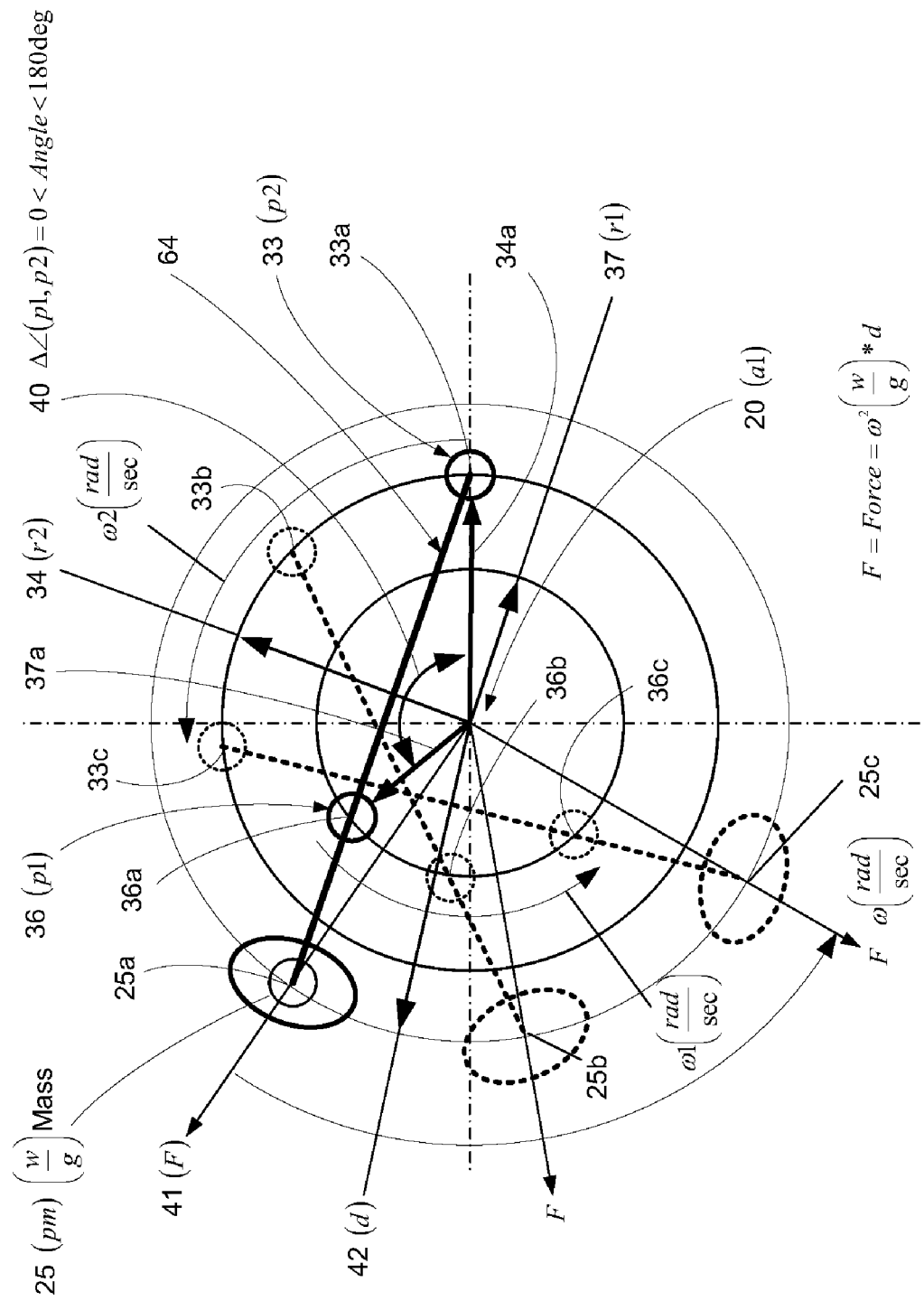
FIG. 7C is a top diagram view of the operational movement and generated counter vibration forces of the vibration suppression unit shown in FIG. 7 in a circular operation mode and in the intermediate resulting force configuration.

Rotor 28 and rotor 30 rotate about central axis 20 in the same rotational direction 22. As shown in the sequencing of positions in FIGS. 6C, 7C and 8C, mass 23 may be controlled by controller 70 to provide a rotating outward force vector 41 by maintaining a desired displacement angle 40 between zero and 180 degrees during an operational cycle. Thus, as shown in FIGS. 6C, 7C and 8C, by maintaining a constant angle 40 between 0 and 180 degrees, the motion of center of mass 25 is circular about axis 20, with the travel of center of mass 25a-25d being points on a circle of radius 42 (d). The motion of pivot axis or center 36 (p1) is also circular, with the travel of pivot center 36a-36d being points on a circle of radius 37 (r1) about axis 20, and the motion of pivot axis or center 33 (p2) is also circular, with the travel of pivot center 33a-33d being points on a circle of radius 34 (r2) about axis 20.

Rotational couplings 104 and 204 provide the desired relative rotational direction and motion of rotors 28 and 30, respectively. While in this embodiment rotational couplings 104 and 204 comprise meshed gear trains, it is contemplated that other geared combinations may be used and/or various alternative rotational couplings may be employed. For example and without limitation, the masses may be mechanically linked to the motors via one or more belts, gears, pulleys, chains, sprockets, and/or any other types of suitable couplers configured to physically or mechanically link the subject elements.

Figure 10:
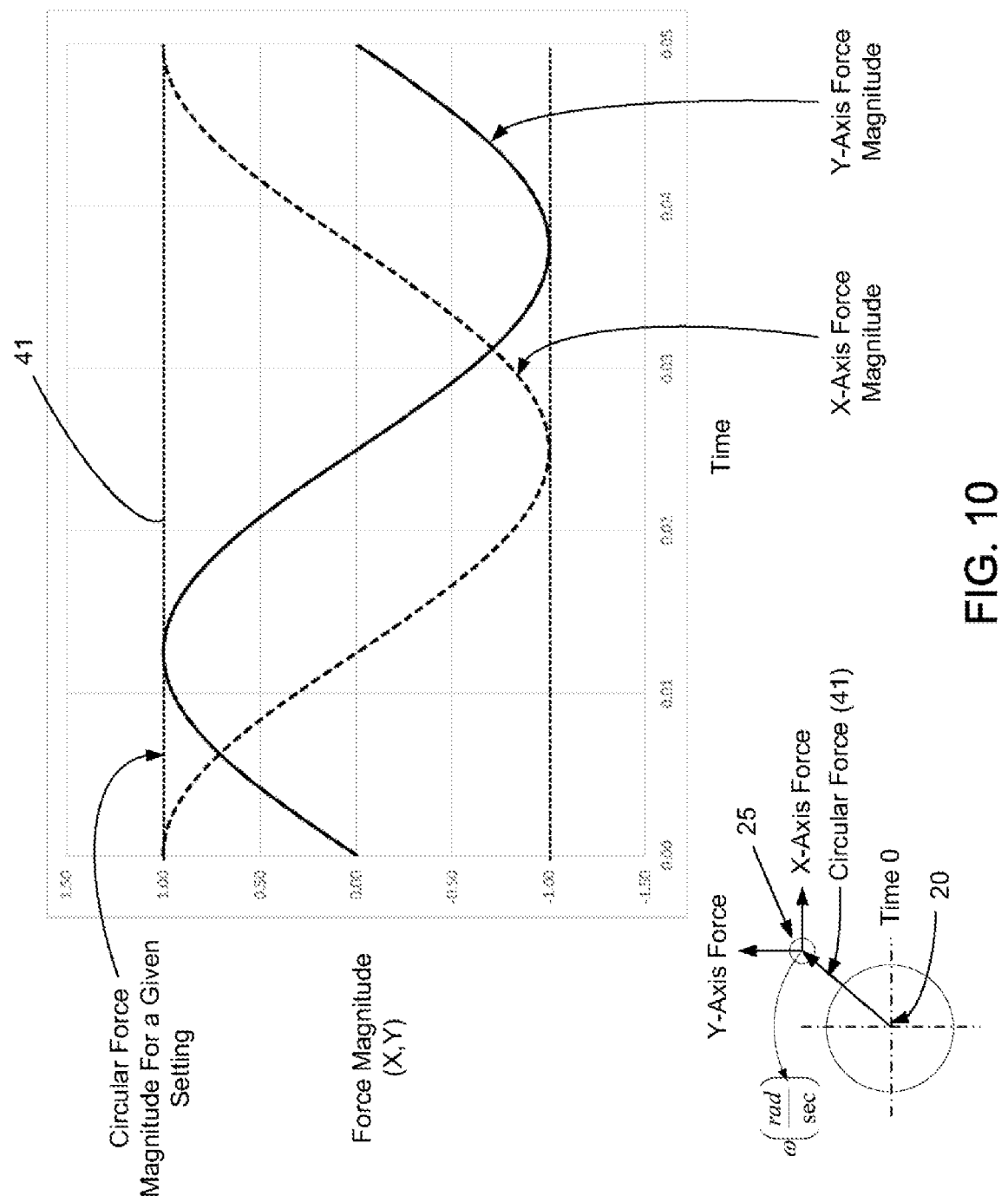
FIG. 10 shows the x and y components of a circular reaction force versus time for a given constant force magnitude.
Figure 10A:
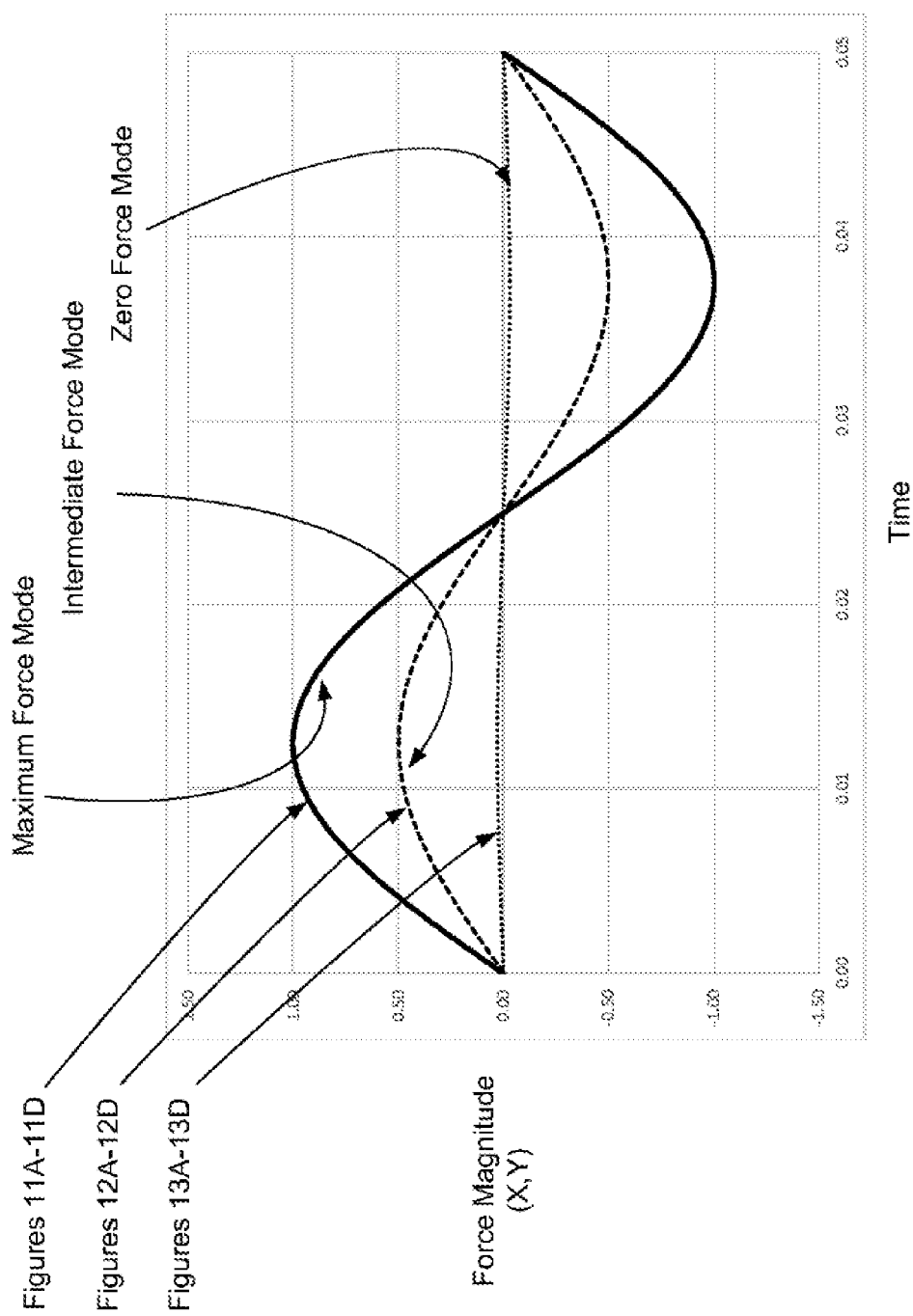
FIG. 10A shows the x and y components of a circular reaction force versus time for the maximum, intermediate and minimum configurations shown in FIGS. 6, 7 and 8, respectively.
Figure 11A:
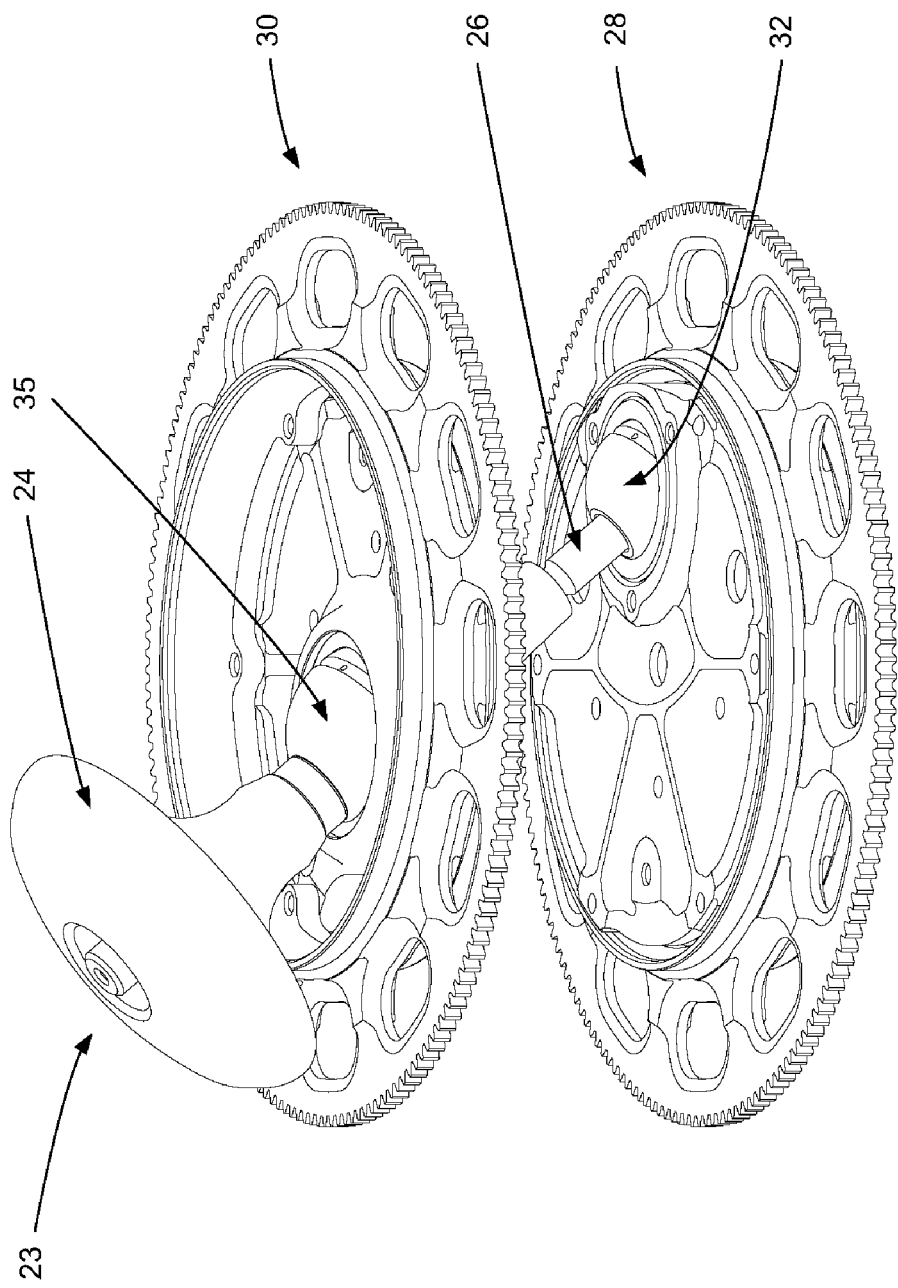
FIGS. 11A-11D show the relative positions of the mass for the curve of the maximum configuration shown in FIG. 10A.
Figure 11B:
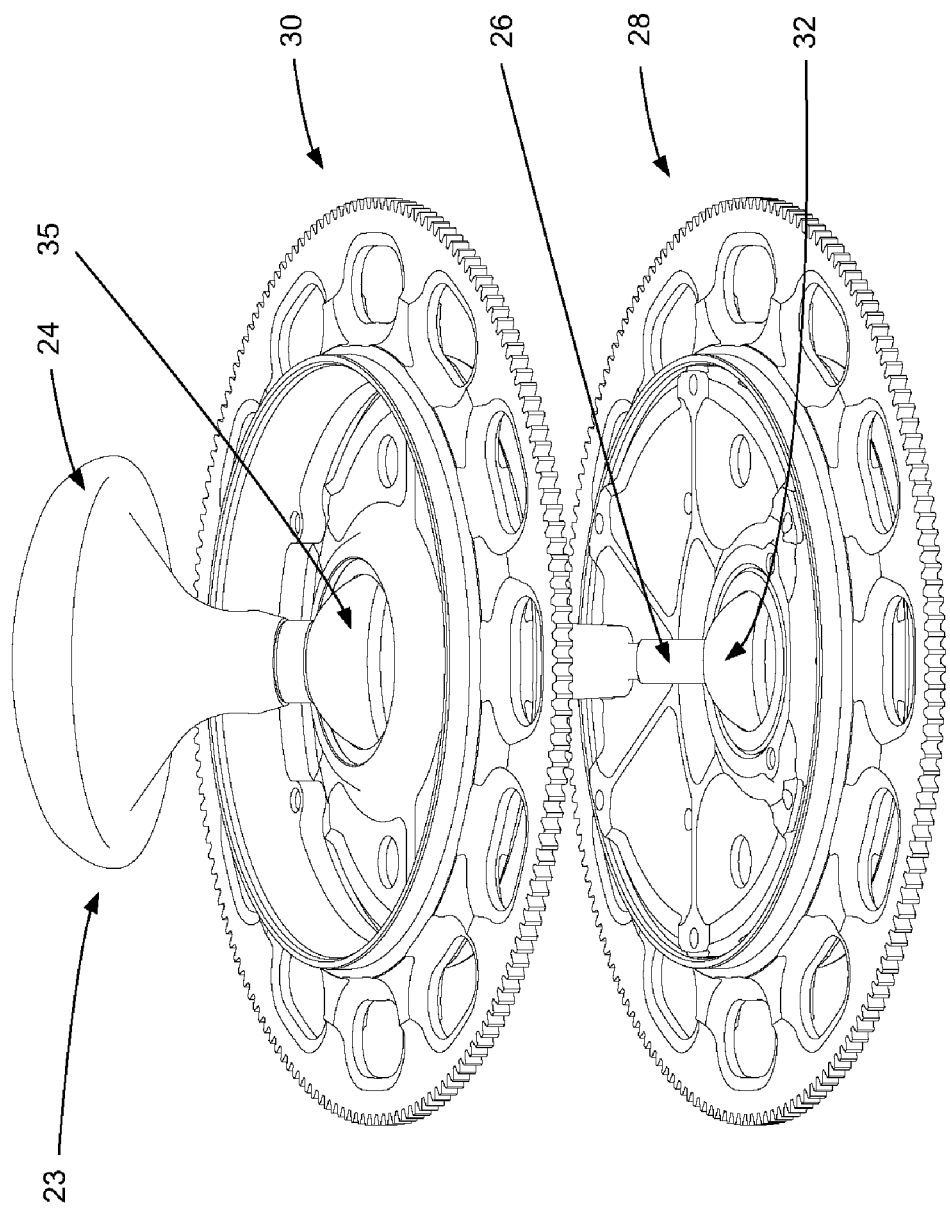
Figure 11C:
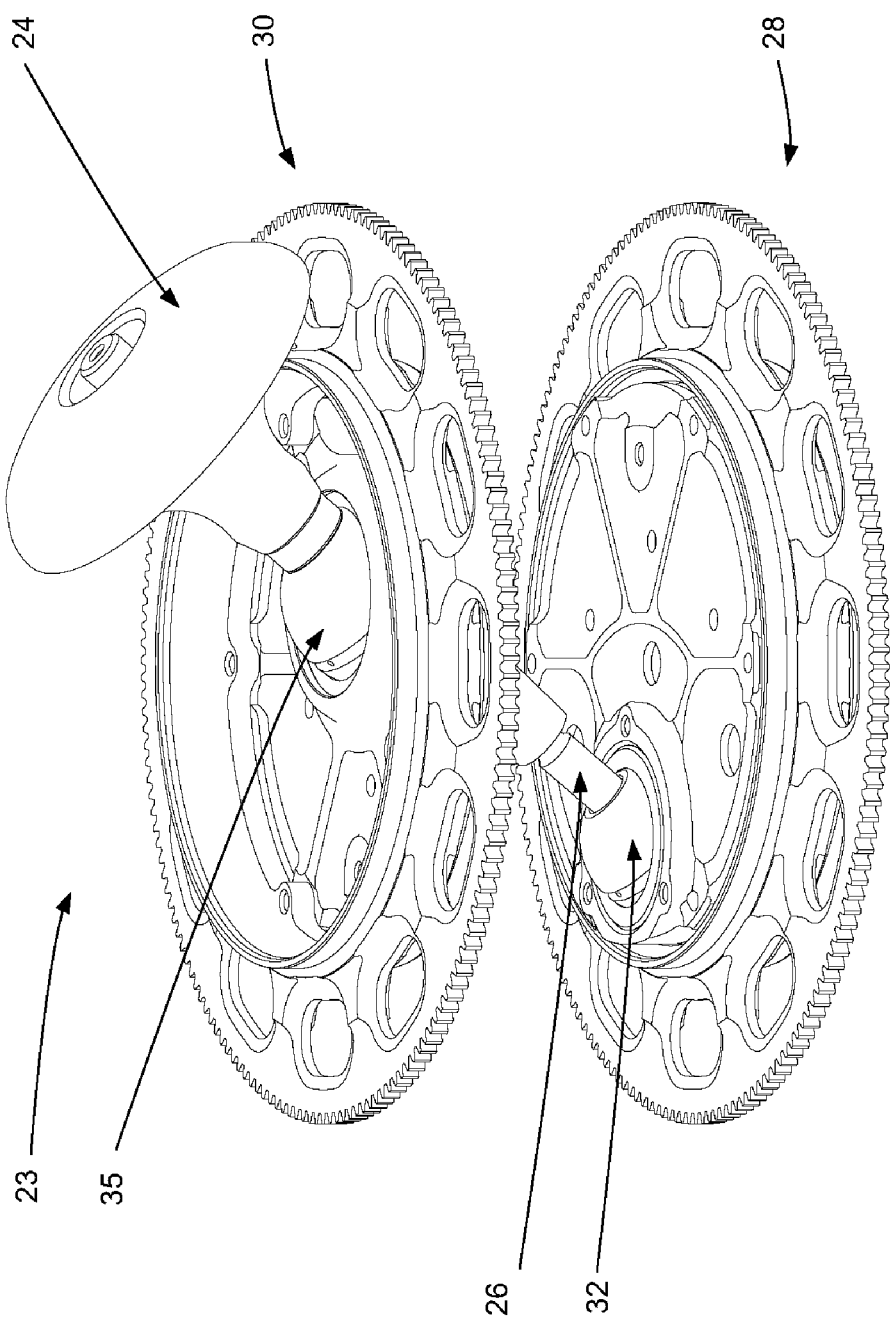
Figure 11D:
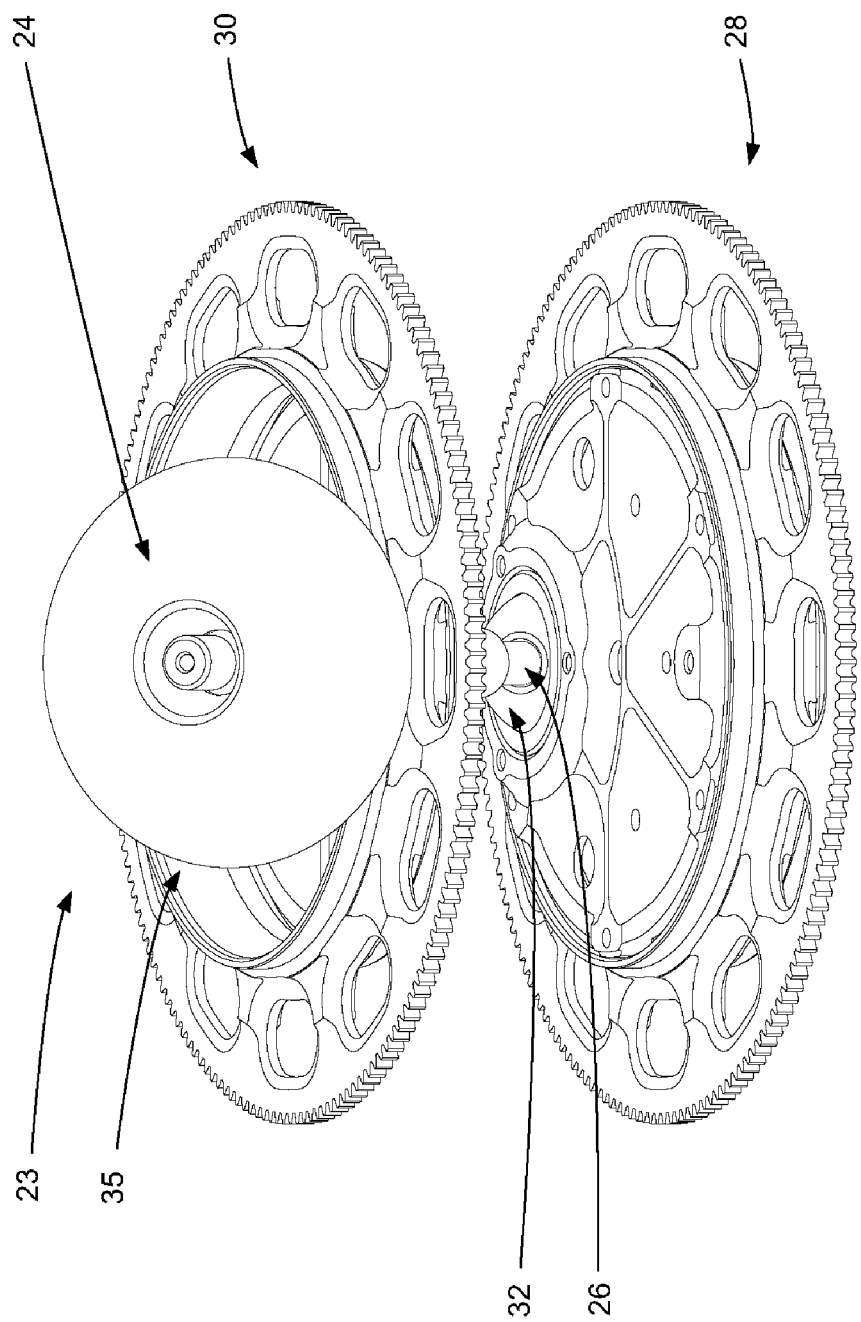
Figure 12A:
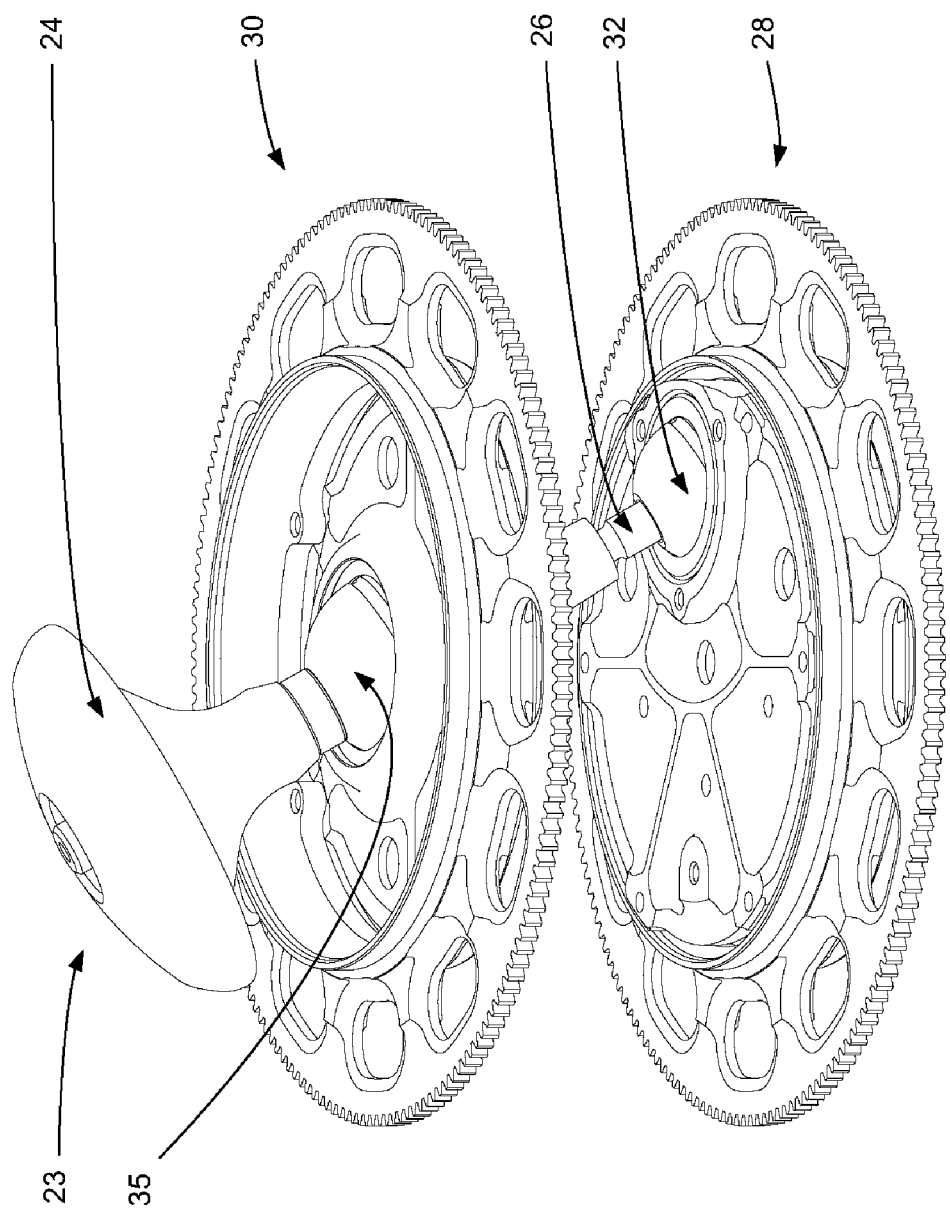
FIGS. 12A-12D show the relative positions of the mass for the curve of the intermediate configuration shown in FIG. 10A.
Figure 12B:
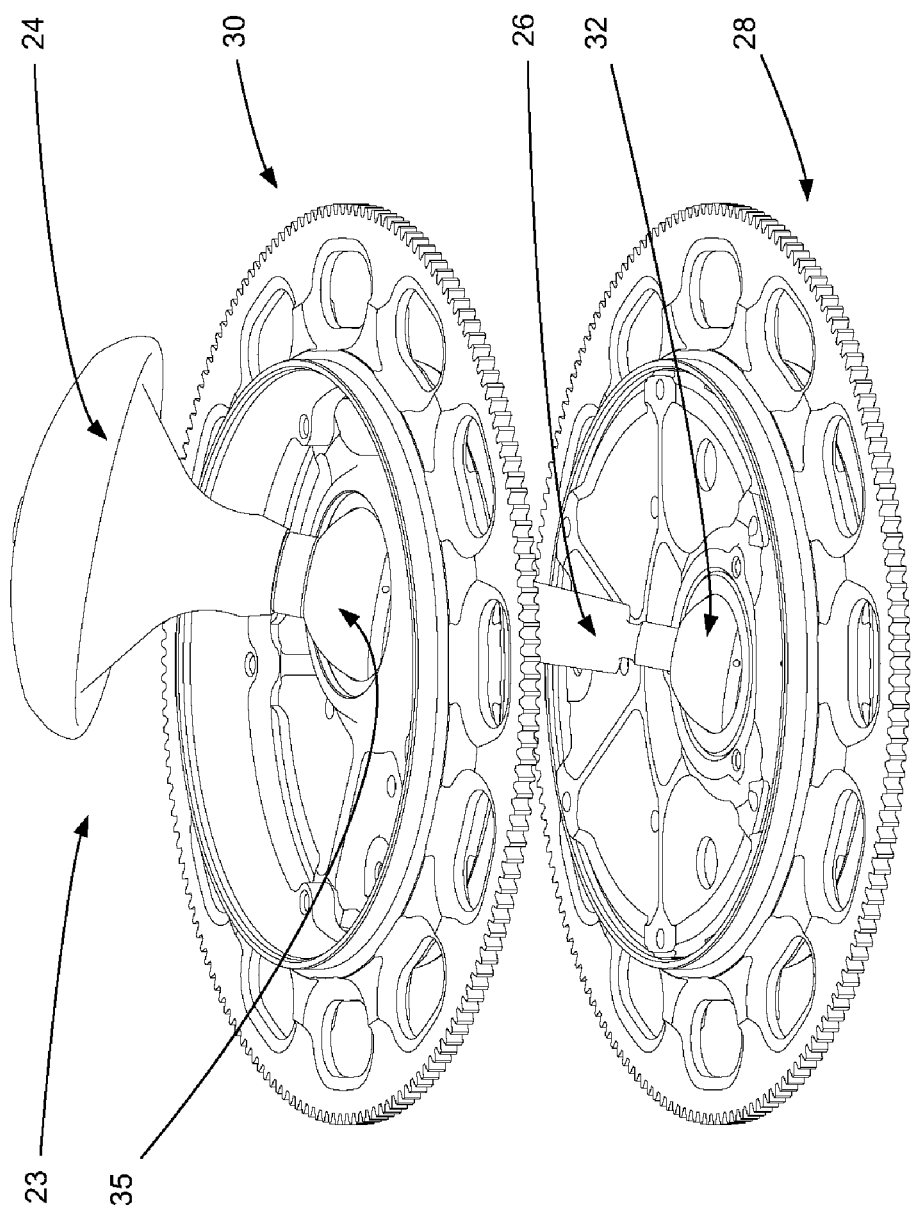
Figure 12C:
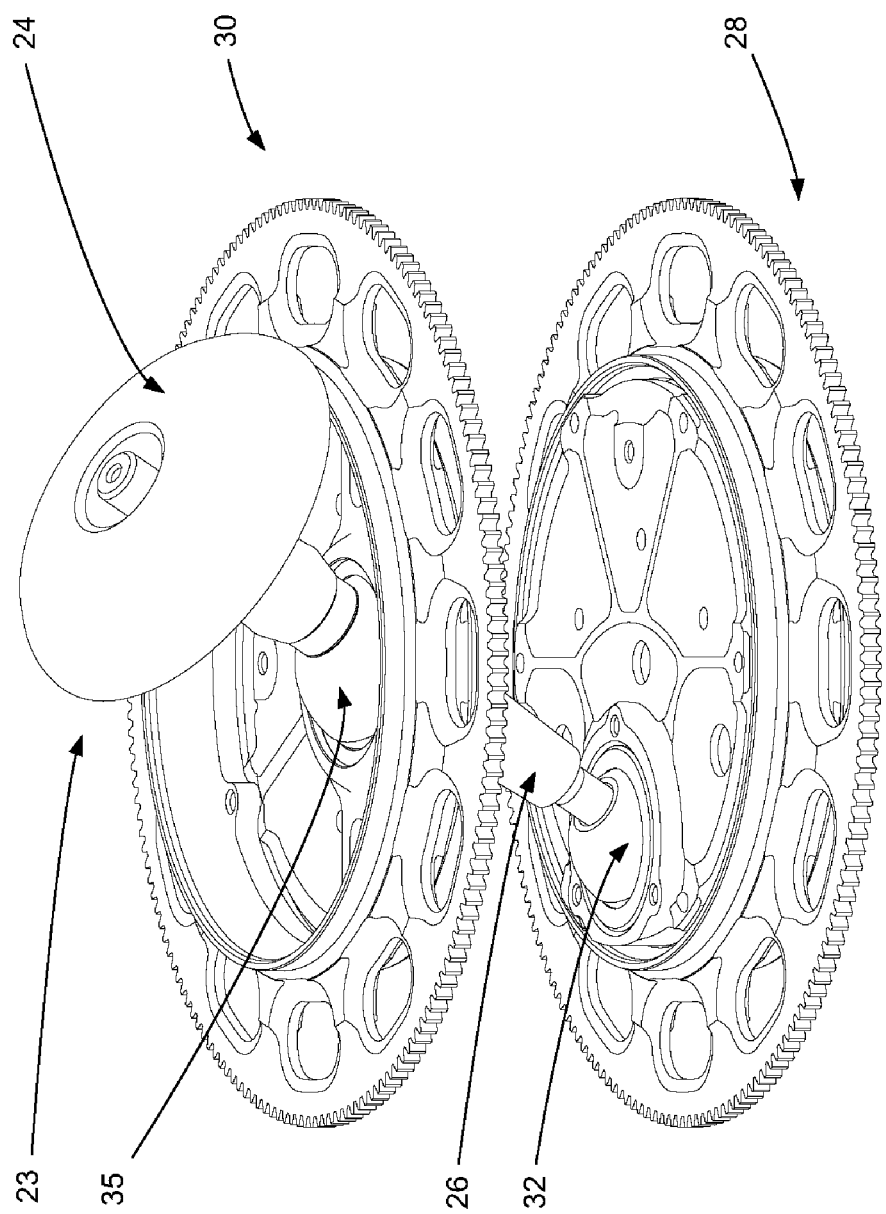
Figure 12D:
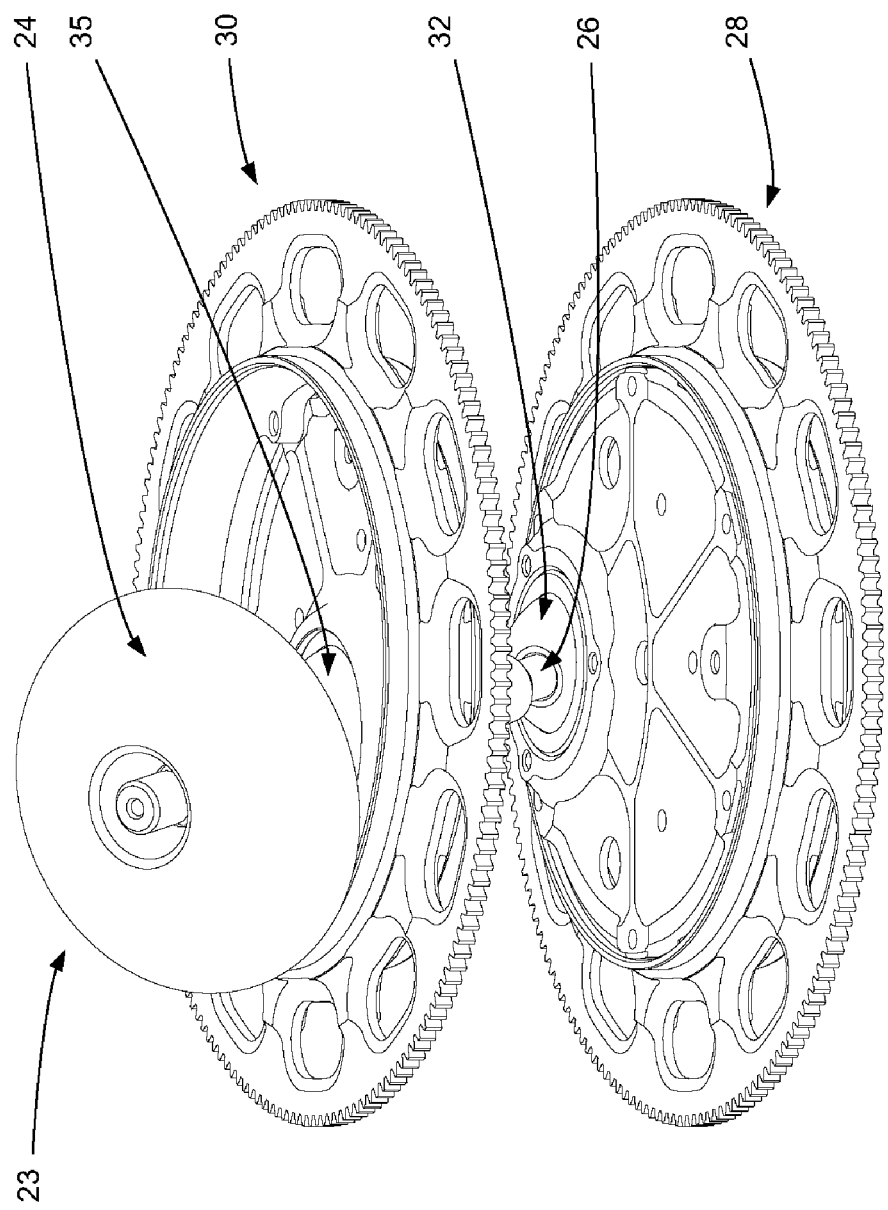
Figure 13A:
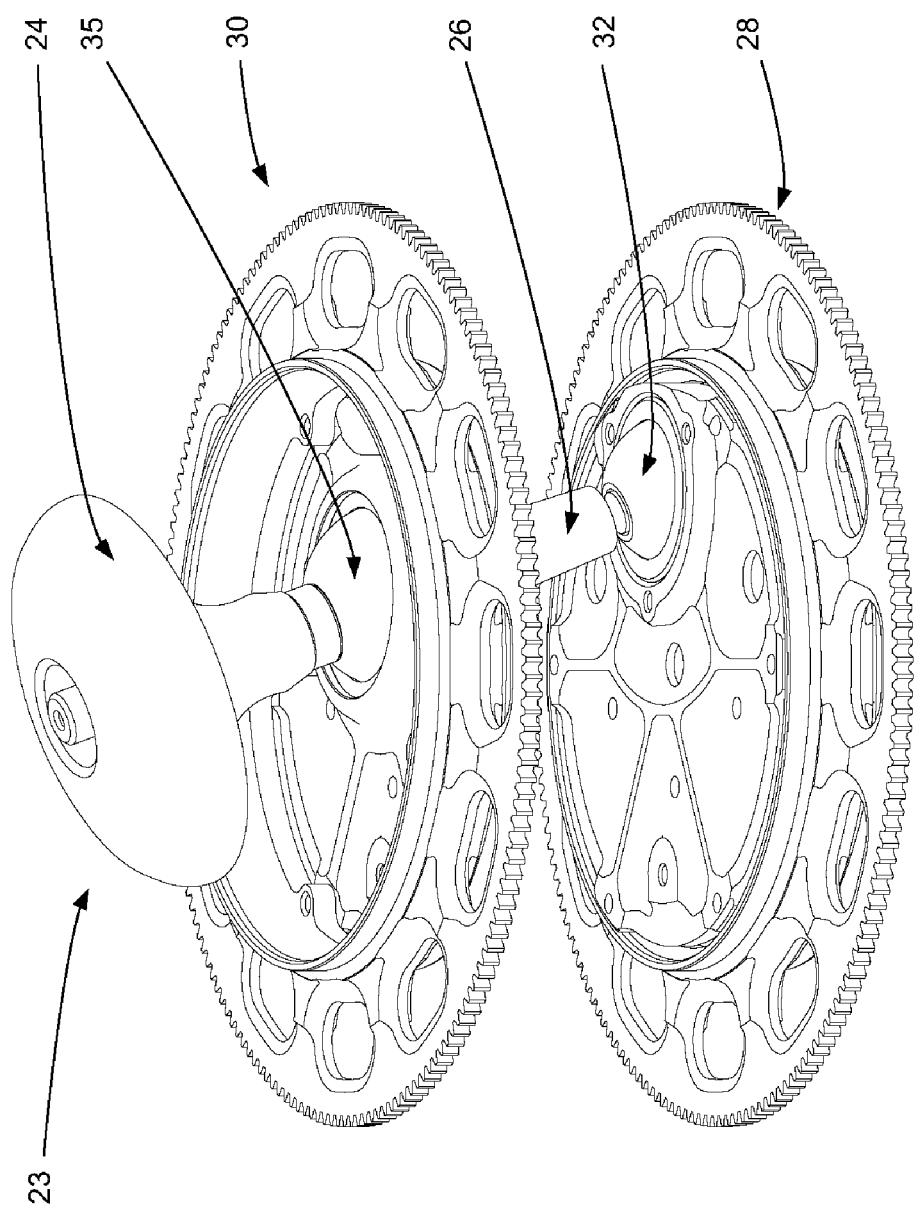
FIGS. 13A-13D show the relative positions of the mass for the curve of the minimum configuration shown in FIG. 10A.
Figure 13B:
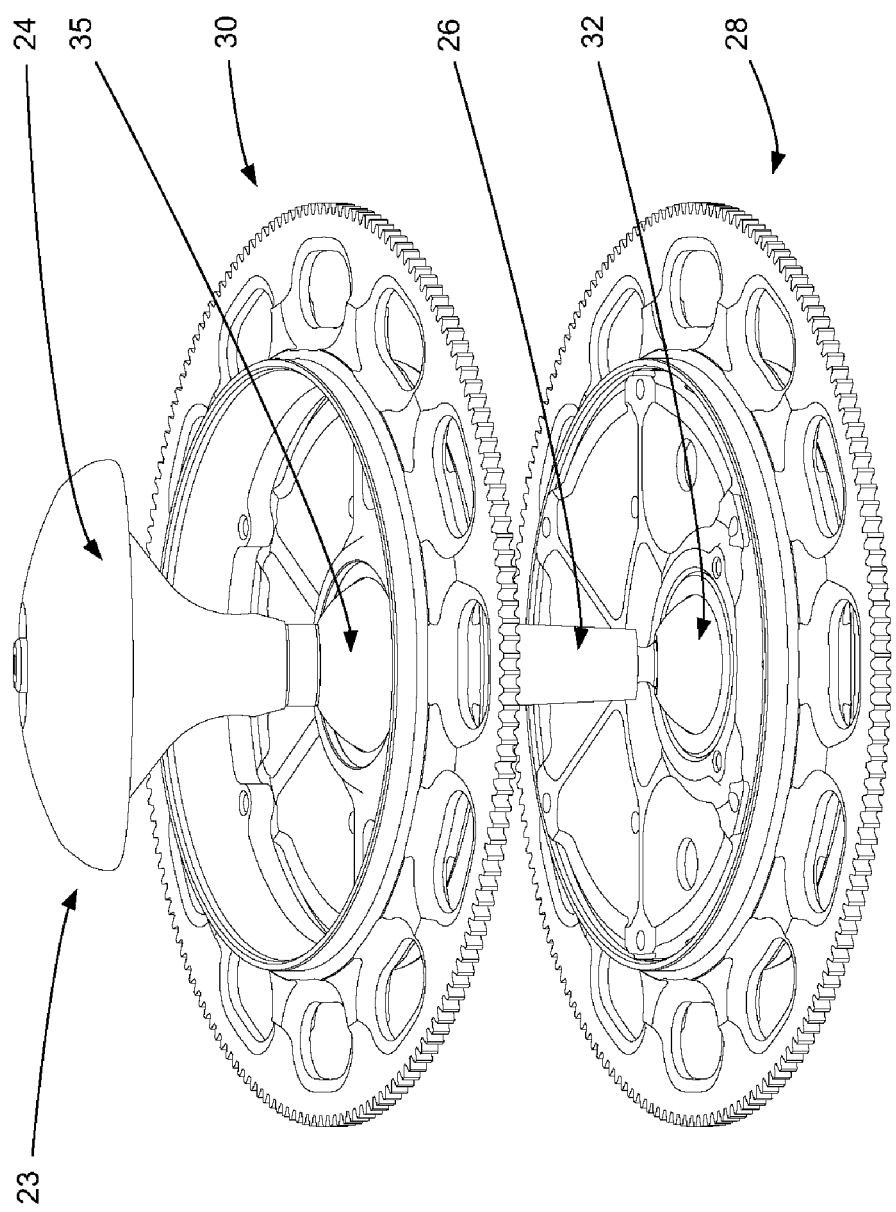
Figure 13C:
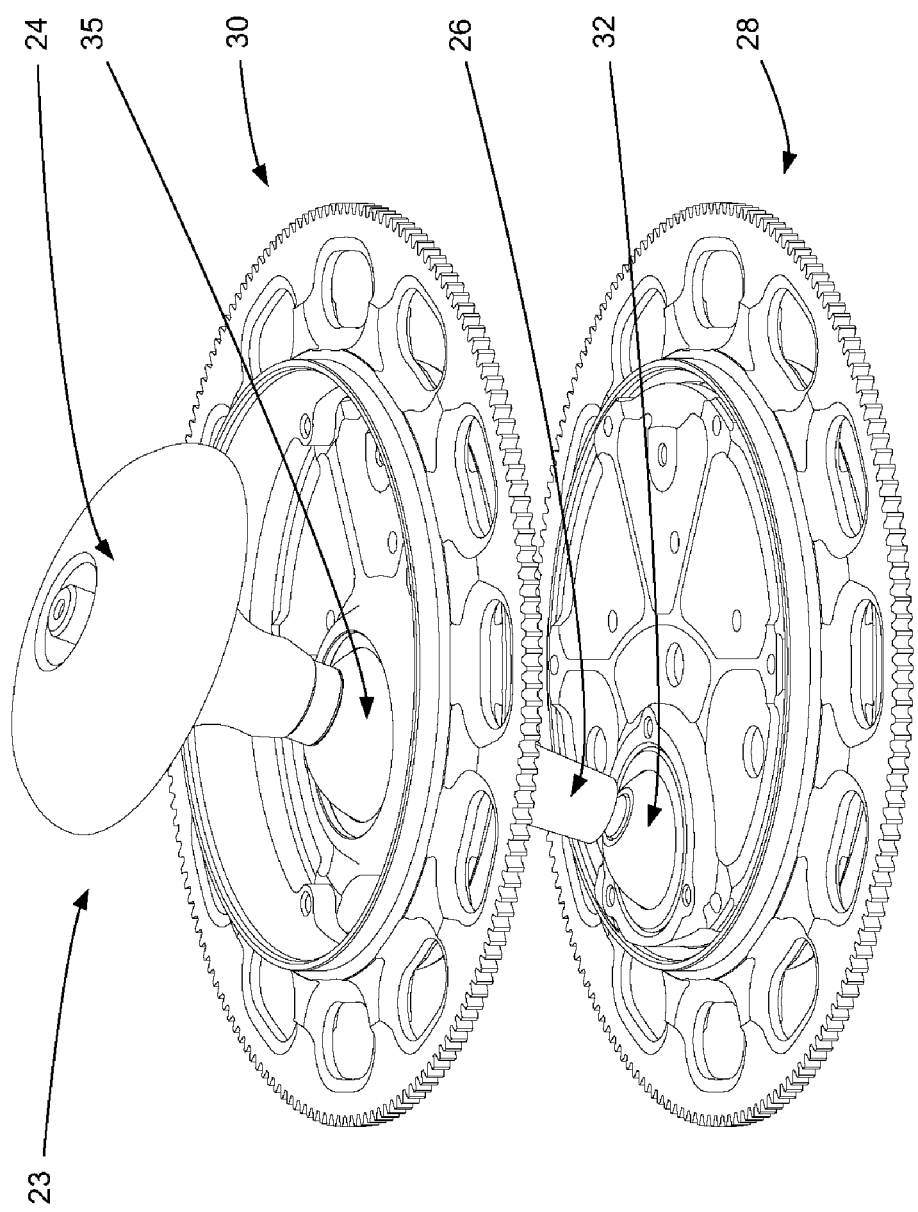
Figure 13D:
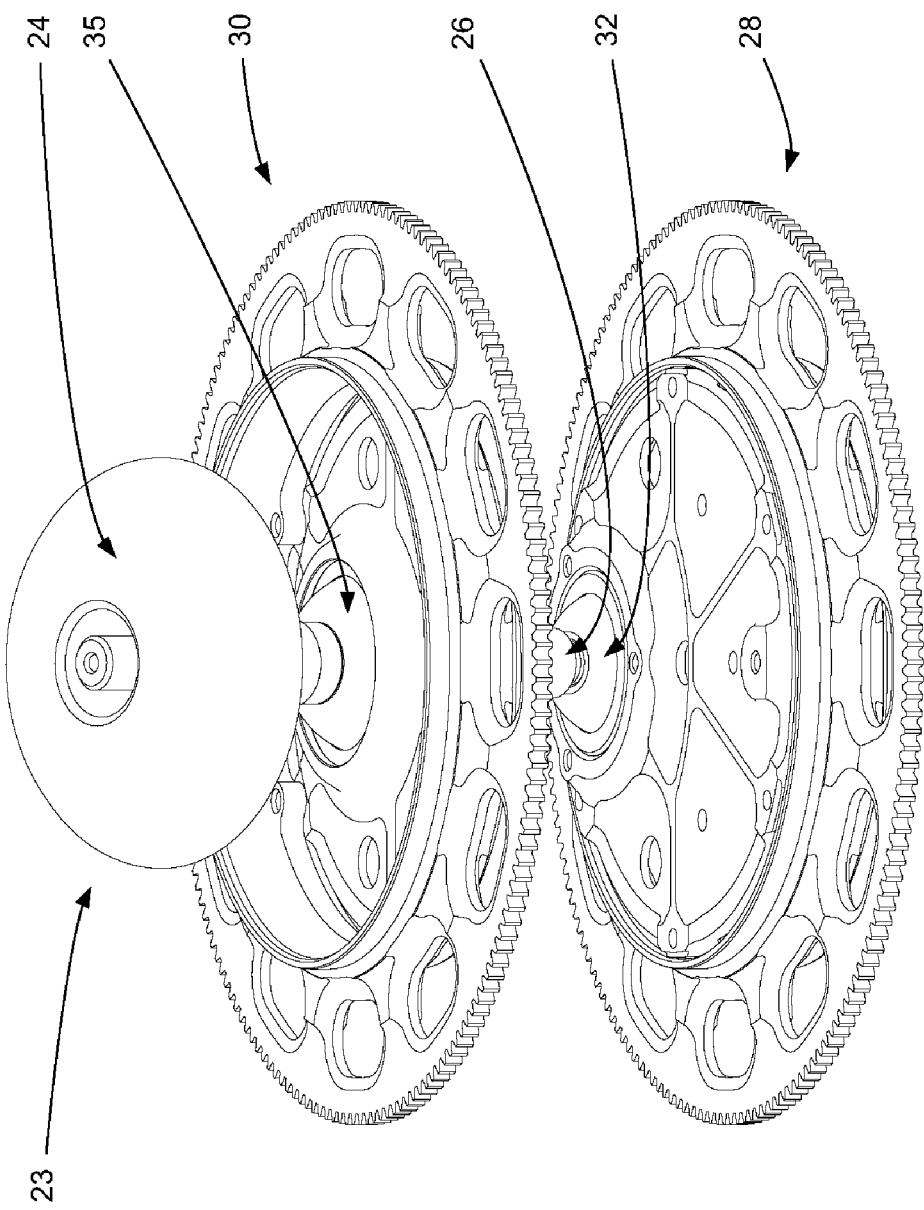

The relative motion of rotor 28 and pivot center 33 and rotor 30 and pivot center 36 about axis 20, and resulting force vector 41 of mass 23, may be controlled to adjust the maximum magnitude of resulting vibration counter force 41. As shown in FIG. 10A, the peak force magnitude of unit 15 may be adjusted from a maximum force mode, shown in FIGS. 6-6C, to a zero or minimum force mode, shown in FIGS. 8-8C.

FIGS. 6-6C and 13A-13D show the alignment between rotor 28 and pivot center 33 relative to rotor 30 and pivot center 36 about axis 20 when controlled to provide a maximum peak counter vibration force about axis 20, with the graphical representation of such reaction force versus time shown in FIG. 10A. As shown in FIGS. 6-6C and 11A-11D, in this maximum force configuration, mass 23 is controlled such that displacement angle 40 is about 180 degrees and eccentric distance 42 is at a maximum (d max), such that the motion of center of mass 25 about axis 20 and resulting force vector 41 is a maximum.

FIGS. 7-7C and 12A-12D show an intermediate force configuration. In this intermediate force mode, the circular motion of center of mass 25 and resulting force vector 41 can be controlled to provide a magnitude less than maximum but greater than zero. To reduce the maximum magnitude of resulting vibration counter force 41, the speed of rotation (w) of rotors 28 and 30 and pivot centers 33 and 36, respectively, are controlled such that displacement angle 40 is reduced below 180 degrees and eccentric distance 42 is less than the maximum (d). Such reduction can range from zero to 180 degrees, with 180 degrees being the maximum as shown in FIGS. 6-6C and 11A-11D, and zero degrees being a minimum of substantially zero as shown in FIGS. 8-8C and 13A-13D.

FIGS. 8-8C and 13A-13D show a minimum configuration which results is substantially no vibration counter force. In this mode, shaft axis 64 intersects central axis 20 such that center of mass 25 is rotating at axis 20 and displacement distance 42 is substantially zero (d=0).

Figure 14:
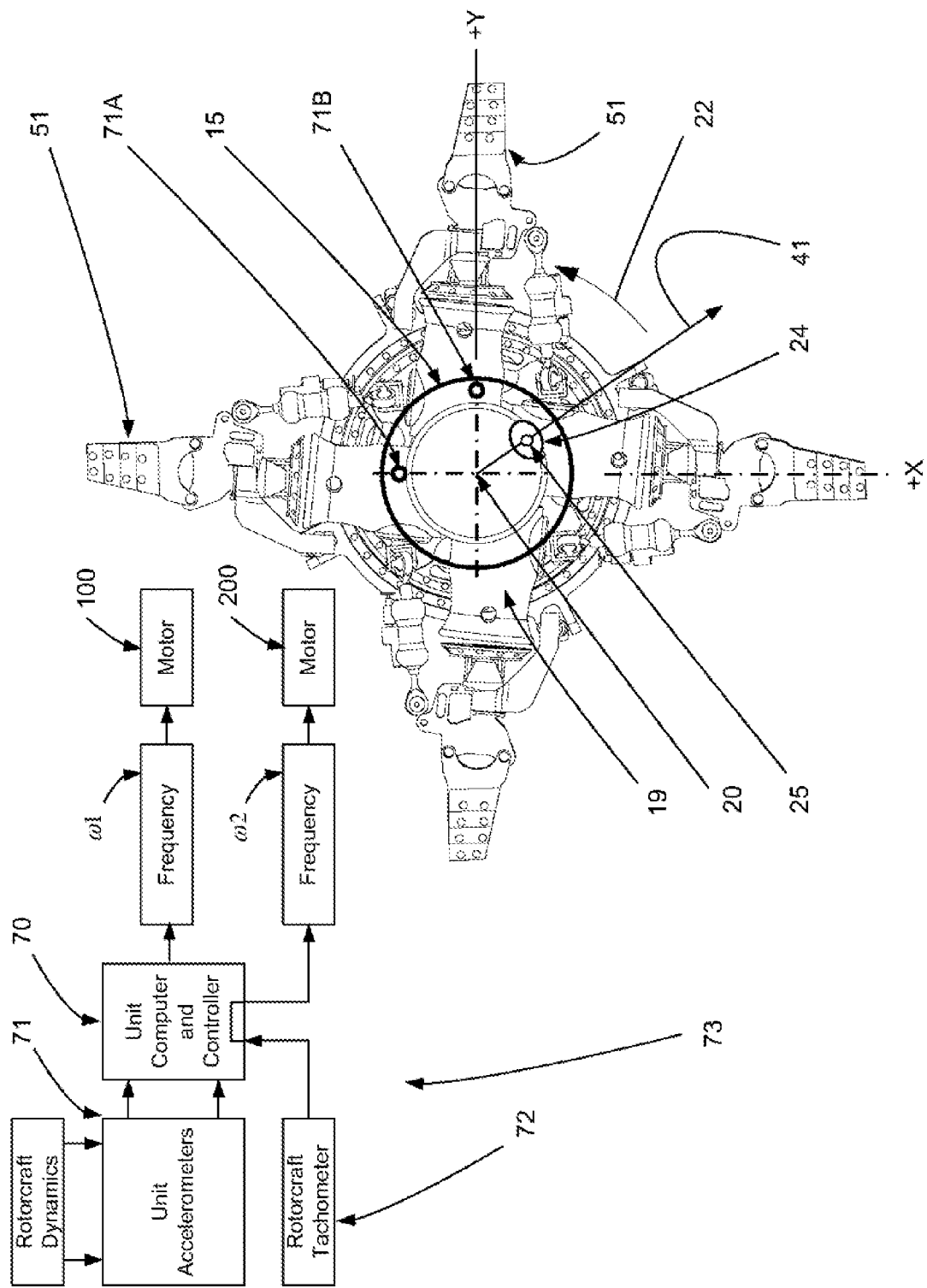
FIG. 14 is a schematic diagram of the vibration controller system for the vibration suppression unit shown in FIG. 1.
Figure 14A:
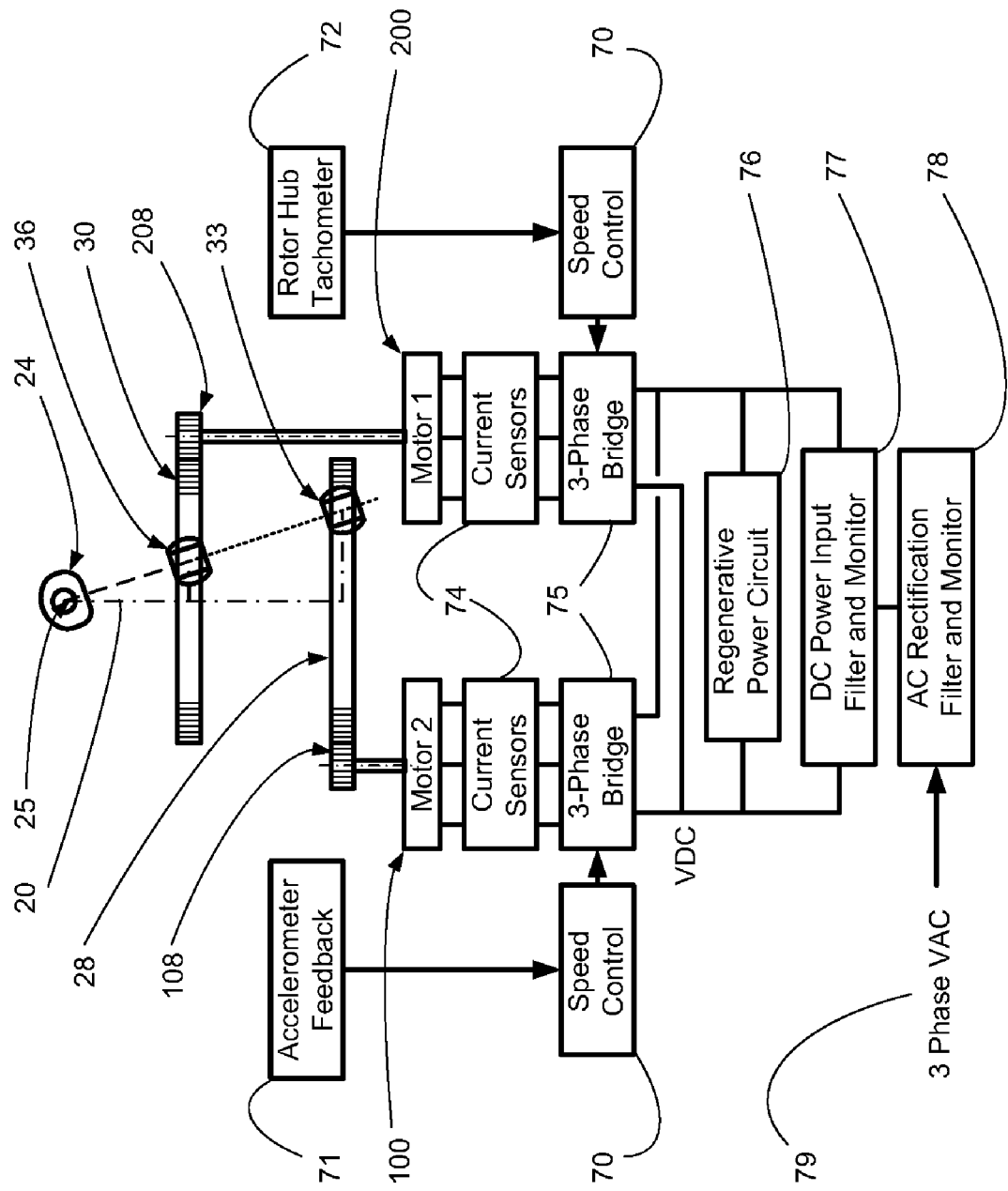
FIG. 14A is a detailed schematic diagram of the vibration power system for the vibration suppression unit shown in FIG. 1.

With reference to FIGS. 10A, 14 and 14A, to match the force magnitude curve to the desired peak force desired, the circular motion of center of mass 25, and resulting force vector 41, is controlled between the maximum force mode and the zero force mode to reach the desired magnitude of vibration counter force 41. In this embodiment, the circular motion of center of mass 25, and resulting force vector 41, is maintained at the desired orientation by controller 70 driving motor 100 and motor 200 relative to each other such that motor 100 rotates rotor 28 and pivot center 33 about axis 20 at a first rotation speed (ω1) and motor 200 rotates rotor 30 and pivot center 36 about axis 20 at a second rotational speed (ω2) that is substantially the same as the first rotational speed (ω1). Thus, the controller maintains the desired operational magnitude of circular vibration control force 41 by maintaining the speed constant between the speed of rotation of rotor 28 and pivot center 33 and the speed of rotation of rotor 30 and pivot center 36 about axis 20, respectively. Once a desired relationship between rotor 28 and rotor 30 is established and displacement angle 40 between the two eccentric center points 33 and 36 is defined, the magnitude of force 41 is constant while rotors 30 and 36 spin about axis 20 in the same direction and same speed.

In this embodiment, the orientation of rotor 28 and pivot center 33 and rotor 30 and pivot center 36 about axis 20 relative to each other, and resulting force vector 41, is modified or varied by controller 70 driving motor 100 and motor 200 relative to each other such that motor 100 rotates rotor 28 and pivot center 33 about axis 20 at a first rotation speed (ω1) and motor 200 rotates rotor 30 and pivot center 36 about axis 20 at a second rotational speed (ω2) that is not substantially equal to the first rotational speed (ω1). Thus, controller 70 varies the desired operational magnitude of vibration control force 41 by varying the speed differential between the speed of rotation of rotor 28 and pivot center 33 about axis 20 and the speed of rotation of rotor 30 and pivot center 36 about axis 20 from substantially 1 to 1. In other embodiments, the controller would vary the desired operational magnitude of vibration control force 41 by varying the speed differential between the speed of rotation of rotor 28 and pivot center 33 and the speed of rotation of rotor 30 and pivot center 36 about axis 20 from a constant that is a function of the differential between the speed coupling ratios of the subject rotational couplings between the motors 100 and 200 and mass 23. Once the desired operational magnitude of vibration control force 41 is reached, controller 70 returns to a speed differential between the speed of rotation of rotor 28 and pivot center 33 about axis 20 and the speed of rotation of rotor 30 and pivot center 36 about axis 20 of substantially 1 to 1.

As shown in FIG. 5, base portion 17A of unit housing 17 supports the electronics of vibration suppression unit 15, including microprocessor controller 70 and sensor package 71, 72. In this embodiment, controller 70 is located on annular base 17A of housing 17 and is configured to automatically control the operation of motors 100 and 200. However, controller 70 may be located external to housing 17, including on fuselage 21. Controller 70 receives input signals and outputs command signals to motor 100 and motor 200 to control the speed of rotation of vibration control mass 23 and displacement angle 40.

Controller 70 communicates with feedback accelerometers 71A and 71B, which in this embodiment are co-located ninety degrees apart in unit frame 17, and tachometer 72, which measures rotor hub 19 rotational speed about center axis 20 relative to fuselage 21. However, alternative and/or additional sensors may be located on rotor shaft 52, on hub 19 and/or on fuselage or airframe 21 to provide rotor shaft speed or operational frequency and vibration feedback data. Thus, sensors 71 may be located outside of housing 17, including on fuselage 21. Sensors may also be installed in other locations. Additional numbers and types of sensor may be used in the system.

Based on sensor data and measurements of vibrations transmitted into and through airframe 21, controller 70 controls the operation of vibration suppression unit 15. Controller 70 may control operation of vibration suppression unit 15 based on other data, such as airspeed, blade pitch angle, amount of rotor thrust, and/or other aircraft parameters and dynamics. Although not required in this embodiment, slip rings may provide input and output signals across the rotary gap to controller 70 and actuators 100 and 200 in housing 17 mounted on hub 19.

As shown in FIG. 14, controller 70 receives input signals from a plurality of sensors that measure various operating parameters of helicopter 16 and provides output commands as a function of such measurements. Vibrations are monitored by the sensors in order to generate forces to actively suppress such vibration. Controller 70 is configured to receive and execute software stored in a memory for executing commands to motors 100 and 200. The software may be implemented via a non-transitory computer readable medium having computer executable instructions that when executed by the processor generate a command. FIGS. 14 and 14A include block diagrams of the process 73 for generating commands to motors 100 and 200 based on input from sensors 71 and 72.

In particular, controller 70 sends commands to motors 110 and 200 based on tachometer 72 input to rotate rotor 30 and connection center 33 about center axis 20 relative to rotor shaft 52 and hub 19 in a rotational direction 22 that is the same as the rotational direction 22 of hub 19 and at a desired operational frequency or speed of rotation relative to the operational frequency or speed of rotation of rotor hub 19 about center axis 20. Thus, controller 70 is configured to control the rotation speed of mass 23 about axis 20 such that vibration control force vector 41 is a function of a speed sum of the rotational speed of hub 19 about central axis 20 relative to aircraft body 21 and the rotational speed of center of mass 23 about central axis 20 relative to hub 19.

Controller 70 sends commands to motors 100 and 200 based on accelerometer 71 input to drive motors 100 and 200 at such relative speeds as to provide the desired suppression force 41. For example, if accelerometers 71 are measuring an undesired x force, controller 70 varies the speed differential between the speed of rotation of rotor 28 and pivot center 33 about axis 20 (ω1) and the speed of rotation of rotor 30 and pivot center 36 about axis 20 (ω2) from the nominal differential of substantially 1 to 1 until the desired force magnitude is achieved, as described above, at which point the nominal speed differential of substantially 1 to 1 is returned to. This can also be used to correct for any operational differences or errors between the coupling speed ratio of gear train 104 and the coupling speed ratio of gear train 204. So if accelerometers 71 detect an acceleration or force that is not cancelled, or the suppression force is too high, displacement angle 40 between pivot center 33 pivot center 36 about axis 20 is changed by changing the speed of one of rotors 28 or 30. Because upper rotor 30, which is closest to center of mass 25, carries more inertia and higher reaction forces, in this embodiment controller 70 controls rotor 30 such that it rotates about axis 20 at the desired frequency of vibration. This is controlled by nominally controlling the speed of rotation (ω2) to match the input tachometer 72 signal from helicopter 16. Accelerometers 71 detect if the phase and frequency are not matched and controller 70 changes the speed (ω2) of rotor 30 until they do. Rotor 28, which is further away from mass center 25, is controlled such that its speed (ω1) is adjusted to provide the desired magnitude of vibration cancelling force 41. Since the magnitude of the force is likely to change more frequently, controller 70 modulates rotor 28 to control that force since it likely carries the least amount of inertia.

In this embodiment, motor 200 is commanded by controller 70 to rotate at a speed of n-blades times the hub rotational speed. For helicopter 16 having four blades 18, such rotational speed would be four times the rotational speed of hub 19. Motor 100 is then commanded to operate at such rotational speed as to provide the desired speed differential between the speed of rotation of rotor 28 and pivot center 33 about axis 20 (ω1) and the speed of rotation of rotor 30 and pivot center 36 about axis 20 (ω2) to achieve the desired force magnitude. Controller 70 then commands motor 100 to adjust the speed of rotation of rotor 28 and pivot center 33 about axis 20 (ω1) relative to the speed of rotation of rotor 30 and pivot center 36 about axis 20 (ω2) from the above nominal 1 to 1 speed differential until x and y accelerometer 71A and 71B measurements approach zero, with y accelerometer 71B providing feedback on whether to adjust the ratio above or below the nominal 1 to 1 differential.

Figure 15:
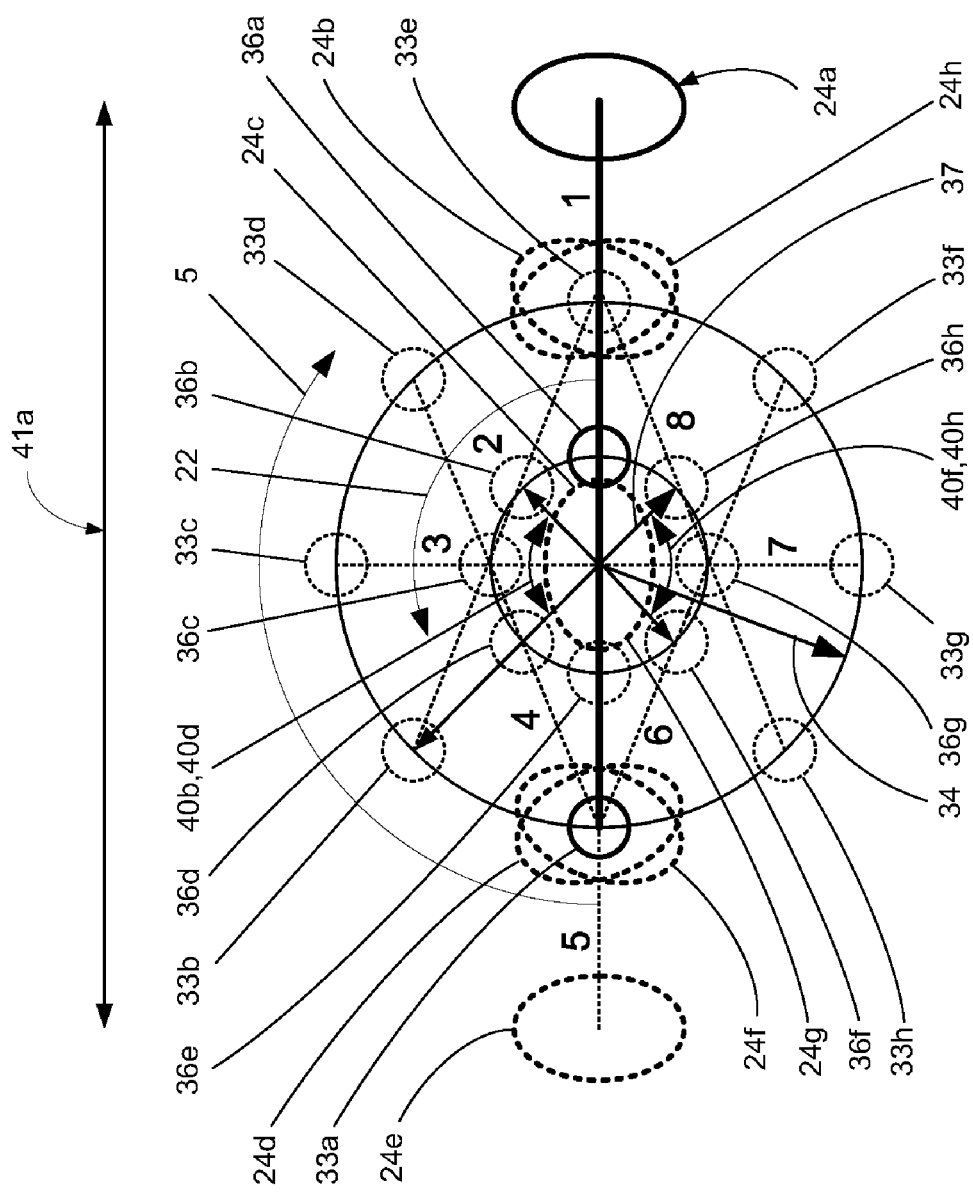
FIG. 15 is a diagram of the operational movement of the vibration suppression unit shown in FIG. 4 in a linear operational mode.

While an outwardly extending rotating suppression force is described above, alternatively, as shown in the sequencing of positions from 1 to 8 in FIG. 15, mass 23 may be controlled by controller 70 to provide a linear suppression force 41A by constantly varying displacements angle 40 between zero and 180 degrees during an operational cycle and rotating rotor 28 and center 33 in the opposite rotational direction 53 as the rotational direction 22 of rotor 30 and center 36 about axis 20. Thus, as shown in FIG. 15, by constantly varying angle 40 between 0 and 180 degrees and rotating rotor 28 and rotor 30 in opposite directions, the motion of center of mass 25 is rectilinear, with the travel of center of mass 25a-25h being points on a linear axis. The motion of pivot axis or center 36 is circular in direction 22 about axis 20, with the travel of center 36a-36h being points on a circle of radius 37 about axis 20. The motion of pivot axis or center 33 is circular in direction 53 about axis 20, with the travel of center 33a-33h being points on a circle of radius 34 about axis 20.

As shown in FIG. 15, mass 23 may be controlled in this linear mode of operation to provide a linear force 41A by constantly varying displacements angle 40, respectively, between zero and 180 degrees during an operational cycle. In this embodiment, angle 40 is varied to provide this linear motion and force by controller 70 driving rotors 28 and 30 relative to each at a constant speed but in opposite directions 22 and 53. Thus, as shown in FIG. 15, by maintaining the same speed at which motor 100 rotates rotor 28 and pivot center 33 about axis 20 and motor 200 rotates rotor 30 and pivot center 36 about axis 20, but in opposite directions, and thereby constantly varying angle 40 between 0 and 180 degrees, the motion of center of mass 25 is linear. In this mode, the linear motion of center of mass 25 and force vector 41A is controlled to also be substantially parallel to the longitudinal axis x-x of fuselage 21.

In this embodiment, the linear motion of center of mass 25 and resulting force vector 41A is maintained at the desired orientation by controller 70 driving motor 100 and motor 200 relative to each other such that motor 100 rotates rotor 28 and pivot center 33 about axis 20 at a first rotation speed (ω1) and motor 200 rotates rotor 30 and pivot center 36 about axis 20 in the opposite rotational direction and at a second rotational speed (−ω2) that is substantially equal to the first rotational speed (ω1). Thus, the controller maintains the desired operational magnitude of linear vibration control force 41A.

Figure 16:
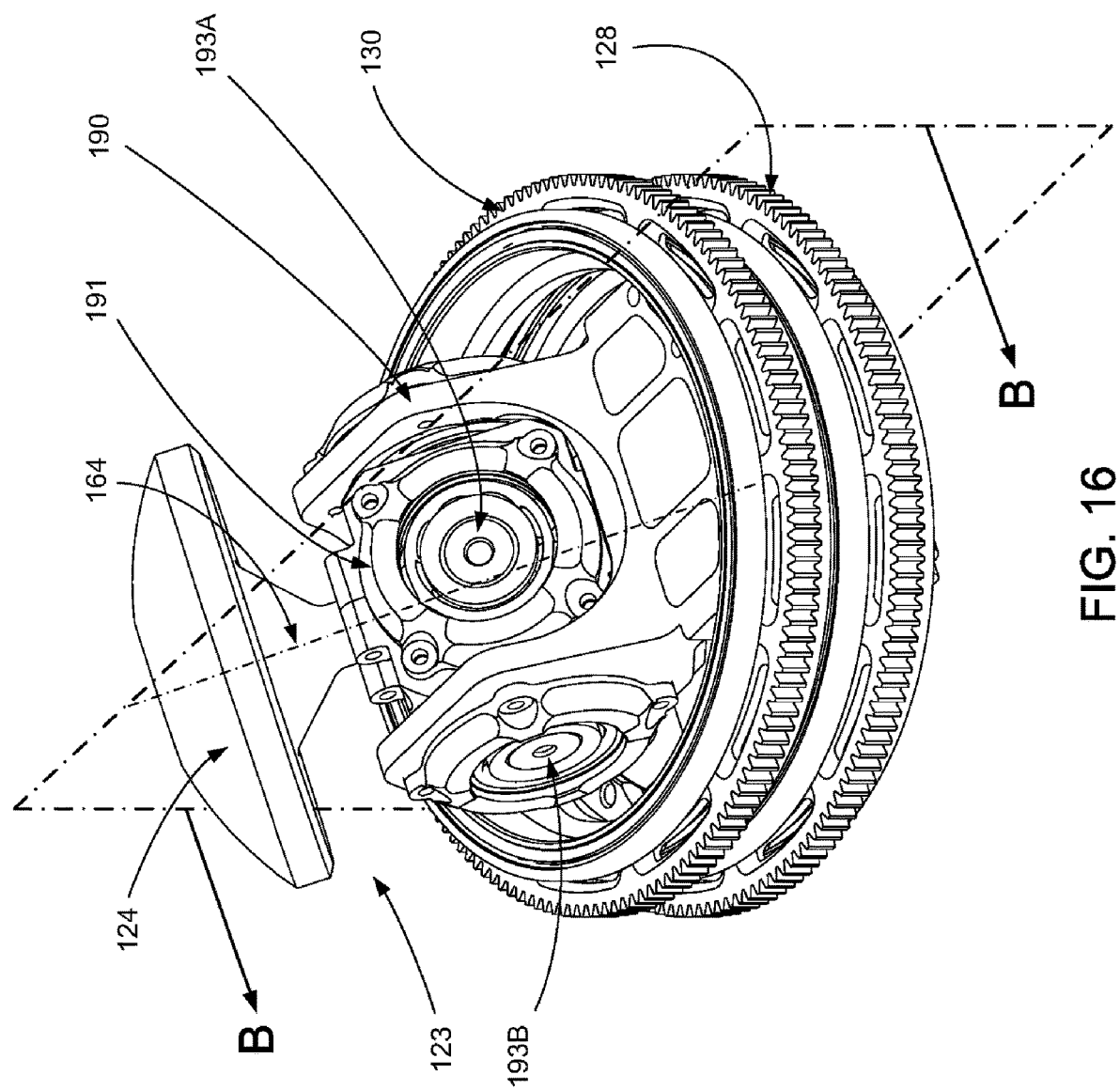
FIG. 16 is a perspective view of an alternative embodiment of the rotors and mass couplings shown in FIG. 4.
Figure 17:
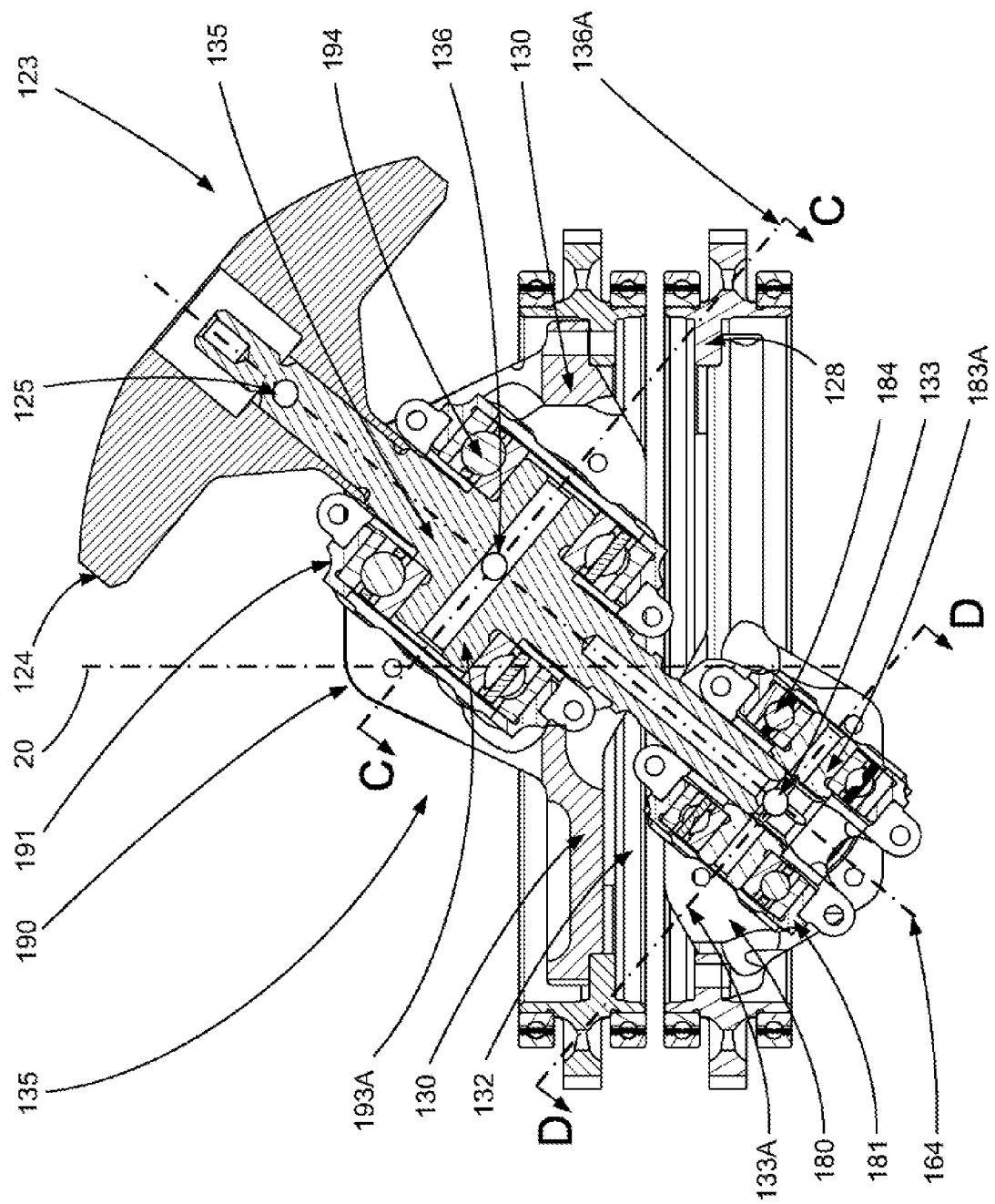
FIG. 17 is a longitudinal cross-sectional view of the rotors and mass couplings shown in FIG. 16, taken generally on line B-B of FIG. 16.

While in this embodiment couplings 32 and 35 between rotors 28 and 30 and mass 23 comprise spherical bearings, it is contemplated that other various alternative rotational couplings or pivot joints may be employed. For example, and without limitation, FIGS. 16 and 17 show alternative gimbal or universal joint type couplings 132 and 135 between rotors 128 and 130 and mass 123. In this embodiment, mass 123 also comprises a generally mushroom shaped mass head 124 fixed to first threaded end portion of shaft 126 by a nut. Shaft 26 is a generally cylindrical sold member orientated about mass link axis 164 such that mass 123 is generally symmetrical about mass link axis 164 and has a center of mass or center of gravity 125 on shaft axis 164. Mass 123 is rotationally supported at gimbal bearing 132 having coupling center 133 by direct rotor 128. Mass 123 is also rotationally supported at gimbal bearing 135 having coupling center 136 by direct rotor 130.

Figure 17A:
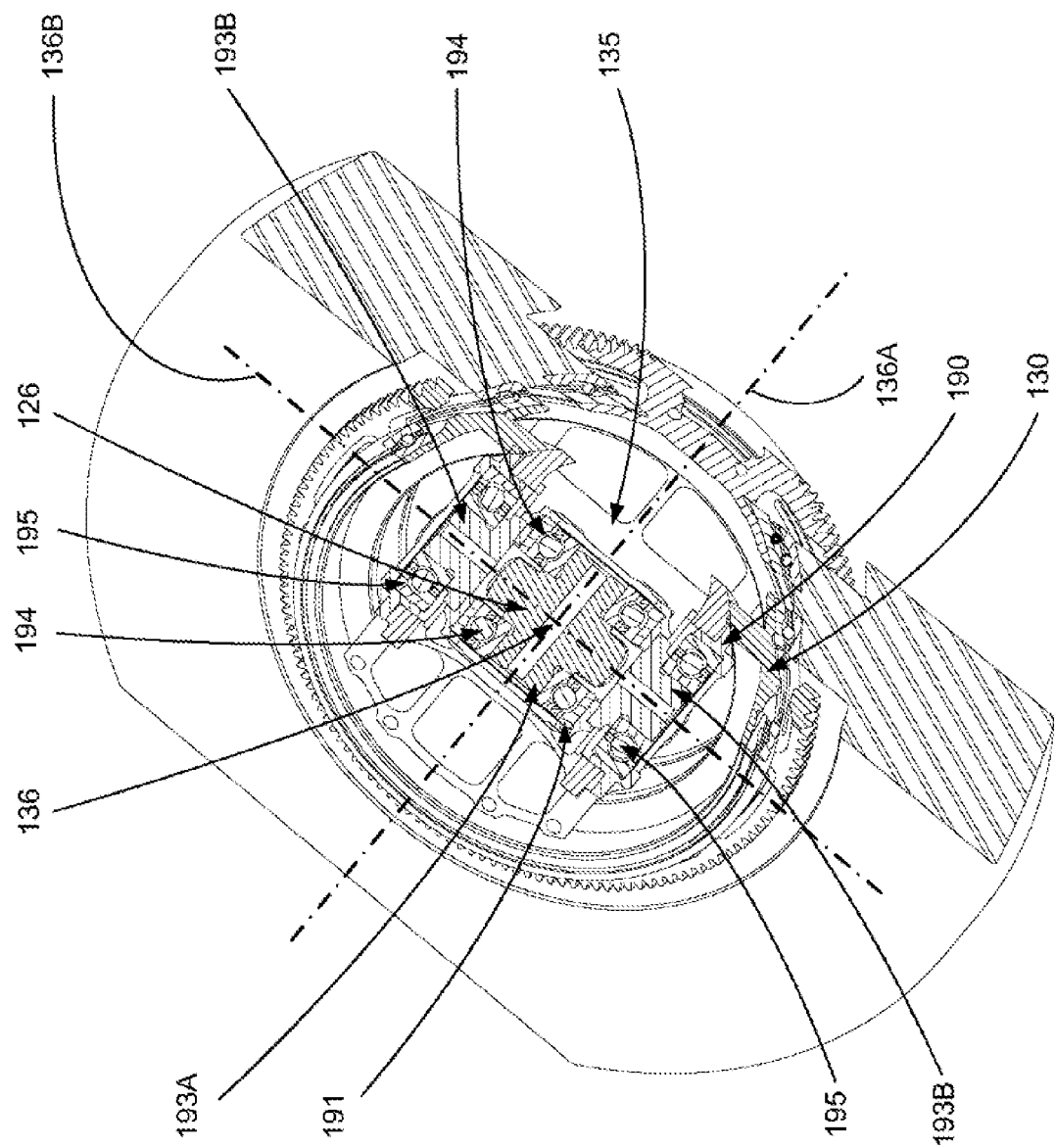
FIG. 17A is a transverse cross-sectional view of the top rotor and mass coupling shown in FIG. 17, taken generally on line C-C of FIG. 17.
Figure 17B:
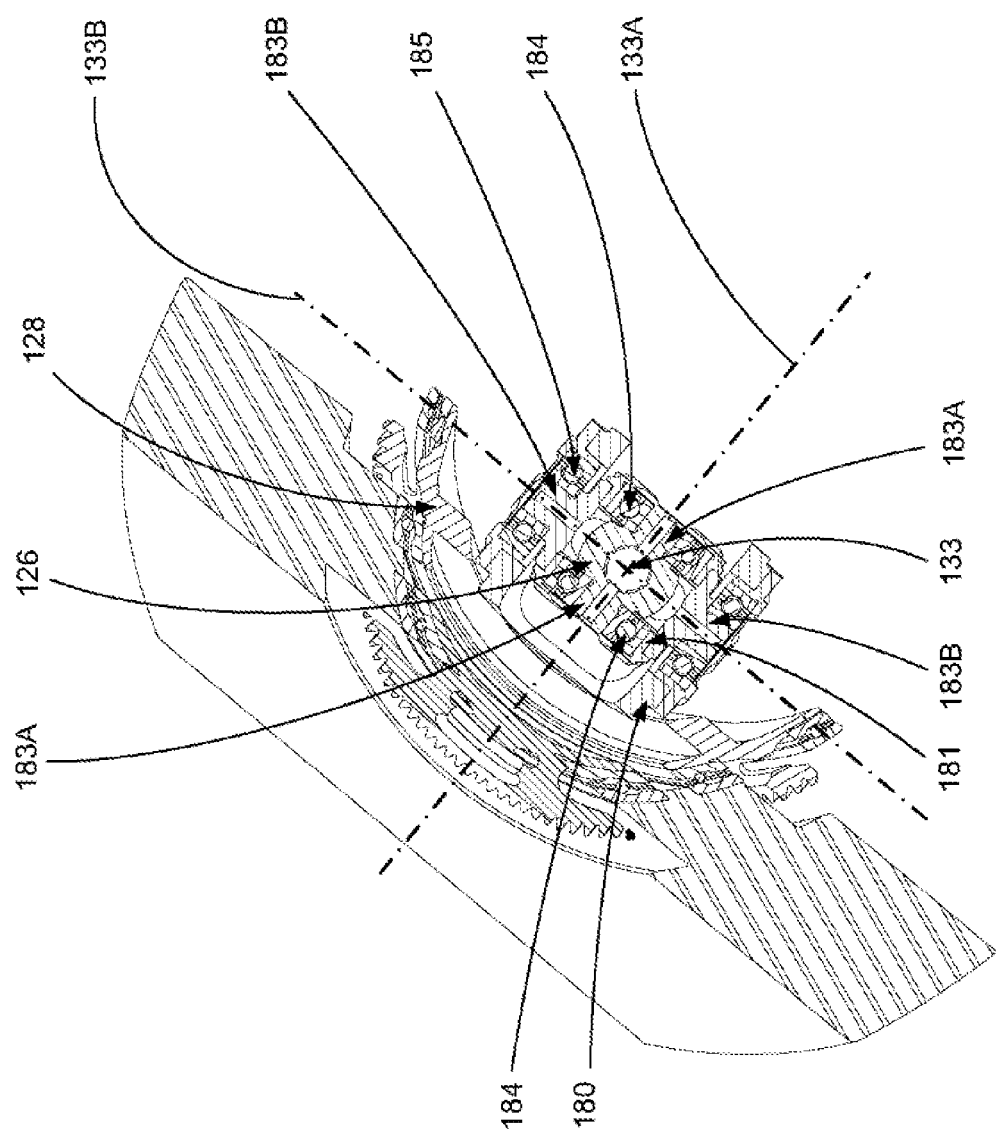
FIG. 17B is a transverse cross-sectional view of the bottom rotor and mass coupling shown in FIG. 17, taken generally on line D-D of FIG. 17.

In this embodiment, as shown in FIGS. 17 and 17B, coupling 132 comprises a universal type coupling having first yoke 180 that is connected to and rotates with rotation of first rotor 128. Mass shaft 126 includes pivot shaft 183A orientated perpendicular to shaft axis 164 on pivot axis 133A. Second yoke 181 includes pivot shaft 183B orientated perpendicular to both shaft axis 164 and pivot axis 133A on pivot axis 133B. Second yoke 181 is rotationally supported between mass shaft 126 and first yoke 180 by pivot shaft 183A and pivot shaft 183B, respectively. Pivot shaft 183A of mass shaft 126 is rotationally supported in second yoke 181 such that mass shaft 126 is free to rotate about pivot axis 133A relative to second yoke 181. Pivot shaft 183B of second yoke 181 is rotationally supported in first yoke 180 such that second yoke 181 is free to rotate about axis 133B relative to first yoke 180 and first rotor 128. Thus, mass shaft 126 and mass 123 are free to rotate about both pivot axis 133A and pivot axis 133B relative to rotor 128. Bearings 184 act between first pivot shaft 183A, orientated about pivot axis 133A, and second yoke 181. Bearings 185 act between pivot shaft 183B, orientated about pivot axis 133B, and first yoke 180.

As shown in FIGS. 17 and 17A, coupling 135 comprises a universal type coupling having first yoke 190 that is connected to and rotates with rotation of second rotor 130. Mass shaft 126 includes pivot shaft 193A orientated perpendicular to shaft axis 164 on pivot axis 136A. Second yoke 191 includes pivot shaft 193B orientated perpendicular to both shaft axis 164 and pivot axis 136A on pivot axis 136B. Second yoke 191 is rotationally supported between mass shaft 126 and first yoke 190 by pivot shaft 193A and pivot shaft 193B, respectively. Pivot shaft 193A of mass shaft 126 is rotationally supported in second yoke 191 such that mass shaft 126 is free to rotate about pivot axis 136A relative to second yoke 191. Pivot shaft 193B of second yoke 191 is rotationally supported in first yoke 190 such that second yoke 191 is free to rotate about axis 136B relative to first yoke 190 and second rotor 130. Thus, mass shaft 126 and mass 123 are free to rotate about both pivot axis 136A and pivot axis 136B relative to rotor 130. Bearings 194 act between first pivot shaft 193A, orientated about pivot axis 136A, and second yoke 191. Bearings 195 act between pivot shaft 193B, orientated about pivot axis 136B, and first yoke 190.

As shown, in this alternative configuration, first coupling center 133 is located at the intersection of pivot axis 133A and pivot axis 133B of pivot shaft 183A and pivot shaft 183B, respectively, and second coupling center 136 is located at the intersection of pivot axis 136A and pivot axis 136B of pivot shaft 193A and pivot shaft 193B, respectively.

Thus, first coupling center 133 rotates about center axis 20 with rotation of first yoke 180 and first rotor 128 about axis 20, and mass shaft 126 rotates in at least two degrees of motion about first coupling center 133 relative to rotor 128. Thus, second coupling center 136 rotates about axis 20 with rotation of third yoke 190 and second rotor 130 about axis 20, and fourth yoke 191 and mass shaft 126 rotate in at least two degrees of motion about second coupling center 136 relative to rotor 130.

Figure 18:
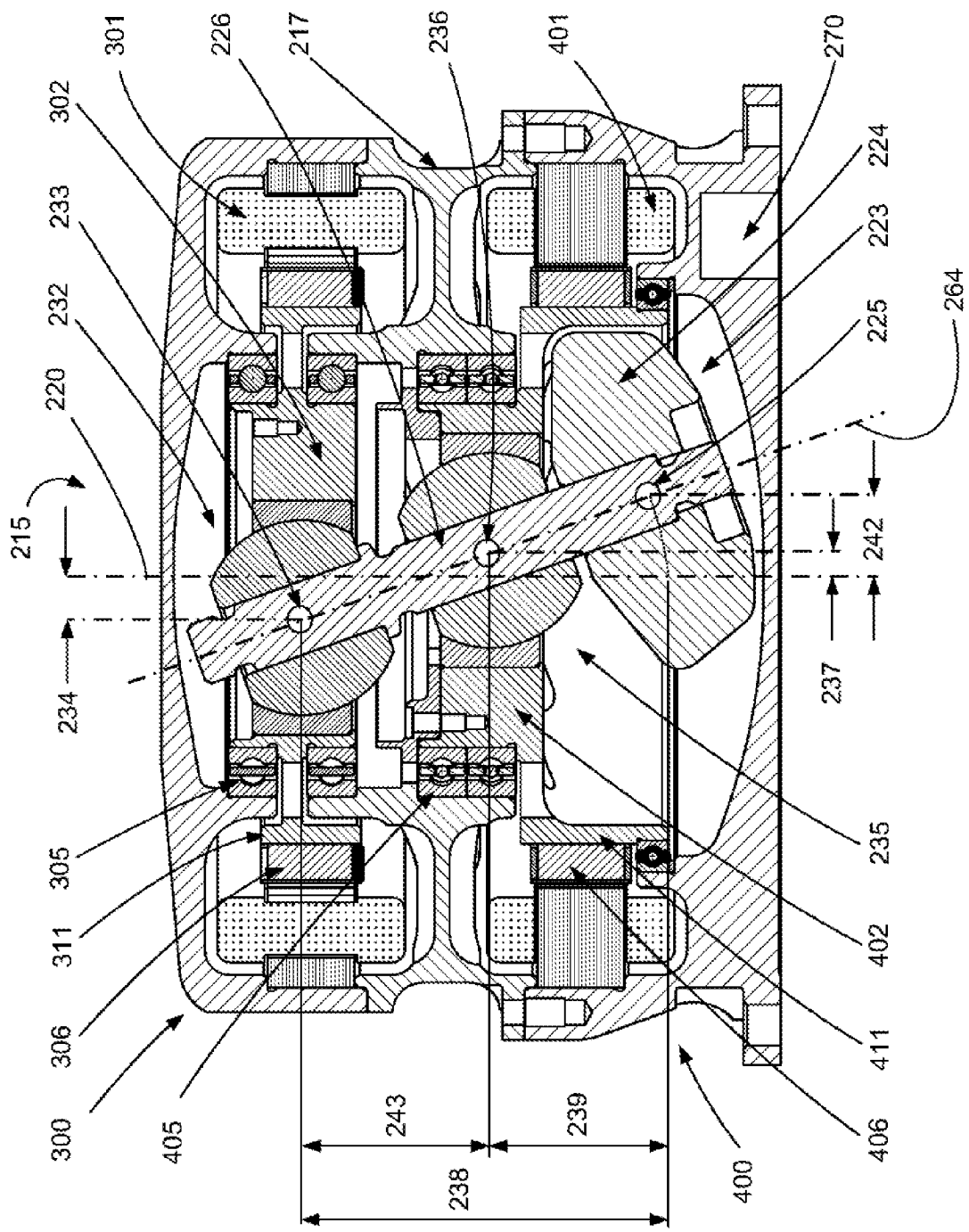
FIG. 18 is a vertical cross-sectional view of an alternative direct drive embodiment of the vibration suppression unit shown in FIG. 5.

FIG. 18 shows an alternative embodiment 215 in which rotors 302 and 402 are directly driven by motors 300 and 400 and mass 223 is orientated with mass head 224 below mass shaft 226, rather than above it. In this alternative embodiment, vibration suppression unit 215 generally includes mass 223 having mass head 224 and mass shaft 226, first motor 300 rotationally coupled directly to mass shaft 226 at first spherical bearing 232, second motor 400 rotationally coupled directly to mass shaft 226 at second spherical bearing 235, and controller 270, all supported within unit housing 217.

Housing 217 supports first motor 300 and second motor 400. Motor 300 comprises stator 301, fixed to frame 217, and rotor 302 that rotates about axis 220 relative to stator 301. Upper and lower bearings 305 act between rotor 302 and housing 217 such that rotor 302 is rotatable about axis 220 relative to housing 217. In this embodiment, motor 300 is a rotary brushless permanent magnet electric motor with rotor 302 having permanent magnets 306 spaced around its annular stator-facing rim 311 and stator 301 having coils energized to drive rotor 302 about axis 220 in either rotational direction 22 or 53.

Motor 400 comprises stator 401, fixed to frame 217, and rotor 402 that rotates about an axis 220 relative to stator 401. Upper and lower bearings 405 act between rotor 402 and housing 217 such that rotor 402 is rotatable about axis 220 relative to housing 217. In this embodiment, motor 400 is a rotary brushless permanent magnet electric motor with rotor 402 having permanent magnets 406 spaced around its annular stator-facing rim 411 and stator 401 having coils energized to drive rotor 402 about axis 220 in either rotational direction 22 or 53.

In this embodiment, central axis 220, the motor 300 axis and the motor 400 axis are coaxial. Thus, in a circular force mode, rotor 302 is selectively directly driven about axis 220 in rotational direction 22. Rotor 402 is selectively directly driven about axis 220 in rotational direction 22.

Mass 223 comprises a generally mushroom shaped mass head 224 fixed to shaft 226 and mass 223 has a center of mass or center of gravity 225 on shaft axis 264. Mass 223 is rotationally supported at spherical bearing 232 having coupling center 233 by rotor 302. Mass 223 is also rotationally supported at spherical bearing 235 having coupling center 236 by rotor 402.

As shown, coupling center 233 is offset perpendicularly from central axis 220 by first radial coupling distance 234. Similarly, coupling center 236 is offset perpendicularly from central axis 220 by second radial coupling distance 237. As shown, first radial coupling distance 234 is different from second radial coupling distance 237. In this embodiment, first radial coupling distance 234 is about twice second radial coupling distance 237.

As also shown, mass head 224 and center of mass 225, rotor 302, and rotor 402 are stacked axially relative to center axis 220 such that coupling center 233 is offset axially from center of mass 225 with respect to central axis 220 by a first axial coupling distance 238. Second coupling center 236 is in turn offset axially from center of mass 225 with respect to central axis 220 by a second axial coupling distance 239. Accordingly, first coupling center 233 is offset axially from second coupling center 236 with respect to central axis 220 by coupling distance 243. As shown, first axial coupling distance 238 is different from second axial coupling distance 239. In this embodiment, first axial coupling distance 238 is greater than second axial coupling distance 239.

Based on radial displacement distance 234 of coupling center 233 from axis 220 and radial displacement distance 237 of coupling center 236 from central axis 220, center of mass 225 has a selectively variable radial displacement distance 242 from central axis 220 ranging from a minimum distance (d=0) to a maximum distance (d max).

In some embodiments, the vibration suppression unit may generate a force that is applied to other components of the helicopter, or to other types of machines, equipment, vehicles or devices. For example, vibration suppression unit 15 may be mounted to fuselage 21 of helicopter 16 for providing a desired force directly to the fuselage based on sensor measurements.

While the presently preferred form of the improved vibration suppression system has been shown and described, and several modifications thereof discussed, persons skilled in this art will readily appreciate that various additional changes and modifications may be made without departing from the scope of the invention, as defined and differentiated by the claims.

What is claimed is:

1. A vibration suppression system comprising:
a vibration control mass having a center of mass;
a first rotor having a central axis of rotation;
a second rotor having an axis of rotation coincident with said central axis of rotation;
a first coupling between said first rotor and said vibration control mass;
said first coupling having a first coupling center offset perpendicularly from said central axis of rotation a first radial coupling distance;
a second coupling between said second rotor and said vibration control mass;
said second coupling having a second coupling center offset perpendicularly from said central axis of rotation a second radial coupling distance;
said first radial coupling distance being different from said second radial coupling distance;
said first coupling center offset axially from said center of mass with respect to said central axis of rotation by a first axial coupling distance;
said second coupling center offset axially from said center of mass with respect to said central axis of rotation by a second axial coupling distance;
said first axial coupling distance being different from said second axial coupling distance;
said first and second coupling centers having a selectively variable displacement angle defined by the inclusive angle between a line extending between said central axis of rotation and said first coupling center and a line extending between said central axis of rotation and said second coupling center;
wherein said first rotor and said second rotor are controllable to produce a vibration control force vector having a controllable magnitude and frequency about said central axis of rotation.

2. The vibration suppression system set forth in claim 1, wherein said first coupling center is offset axially from said second coupling center with respect to said central axis by a fixed distance.

3. The vibration suppression system set forth in claim 1, wherein said vibration control mass comprises a shaft elongated about a shaft axis and said shaft is restrained from movement axially along said shaft axis relative to one of said first coupling center and said second coupling center and is movable axially along said shaft axis relative to said other of said first coupling center and said second coupling center.

4. The vibration suppression system set forth in claim 1, wherein said vibration control force vector is a function of a speed sum of a rotational speed of said hub about said central axis relative to said non-rotating body of the aircraft and a rotational speed of said center of mass about said central axis relative to said hub.

5. The vibration suppression system set forth in claim 1, comprising a rotary-wing aircraft having a plurality of rotor blades mounted to a rotor hub driven about a hub axis of rotation that is coincident with said central axis of rotation at an operational speed and in a rotational direction relative to a non-rotating body of the aircraft.

6. The vibration suppression system set forth in claim 1, wherein said first rotor and second rotor are controllable to produce a circular vibration control force vector or a linear vibration control force vector.

7. The vibration suppression system set forth in claim 1, wherein:
said center of mass has a selectively variable radial displacement distance from said central axis of rotation ranging from a minimum distance to a maximum distance;
when said displacement angle is zero degrees, said center of mass is coincident to said central axis of rotation and said displacement distance is said minimum distance from said central axis of rotation; and
said center of mass is said maximum displacement distance from said central axis of rotation when said displacement angle is 180 degrees.

8. The vibration suppression system set forth in claim 1, wherein said vibration control mass comprises a mass head and a mass shaft and said first coupling is between said first rotor and said mass shaft and said second coupling is between said second rotor and said mass shaft.

9. The vibration suppression system set forth in claim 1, comprising:
a first motor driven to rotate said first rotor about said central axis of rotation;
a second motor driven to rotate said second rotor about said central axis of rotation; and
a controller that receives input signals and outputs command signals to said first motor and said second motor to control said speed of rotation of said first coupling center about said central axis of rotation, said speed of rotation of said second coupling center about said central axis of rotation, and said displacement angle.

10. The vibration suppression system set forth in claim 6, wherein said first rotor and second rotor are controllable to rotate in the same direction about said central axis of rotation to produce said circular vibration control force vector and said first rotor and second rotor are controllable to rotate in opposite directions about said central axis of rotation to produce said linear vibration control force vector.

11. The vibration suppression system set forth in claim 7, wherein said first coupling center, said second coupling center and said center of mass align on a common linkage axis when said displacement angle is zero, whereby a sum of moments of said first coupling center about said central axis is equal and opposite to a sum of moments of said second coupling center about said central axis.

12. The vibration suppression system set forth in claim 8, wherein:
said first coupling comprises a first spherical bearing having a first outer ring orientated about said first coupling center that rotates with rotation of said first rotor and a first inner ring rotatable with said mass shaft in at least two degrees of motion about said first coupling center relative to said first outer ring; and
said second coupling comprises a second spherical bearing having a second outer ring orientated about said second coupling center that rotates with rotation of said second rotor and a second inner ring rotatable with said mass shaft in at least two degrees of motion about said second coupling center relative to said second outer ring.

13. The vibration suppression system set forth in claim 8, wherein:
said first coupling comprises a universal coupling having a first yoke that rotates with rotation of said first rotor, a second yoke having a first pivot shaft rotationally supported by said first yoke about a first pivot axis, a bearing between said first pivot shaft and said first yoke, a second pivot shaft connected to said mass shaft and rotationally supported by said second yoke about a second pivot axis, and a bearing between said second pivot shaft and said second yoke;
said second coupling comprises a universal coupling having a third yoke that rotates with rotation of said second rotor, a fourth yoke having a third pivot shaft rotationally supported by said third yoke about a third pivot axis, a bearing between said third pivot shaft and said third yoke, a fourth pivot shaft connected to said mass shaft and rotationally supported by said fourth yoke about a fourth pivot axis, and a bearing between said fourth pivot shaft and said fourth yoke; and
said first coupling center comprises an intersection of said first pivot axis and said second pivot axis and said second coupling center comprises an intersection of said third pivot axis and said fourth pivot axis.

14. The vibration suppression system set forth in claim 12, wherein:
said first outer ring comprises a first annular bore having a first bore axis;
said first bore axis is not concentric with said central axis;
said first coupling center is concentric with said first bore axis;
said mass shaft extends through said first annular bore;
said second outer ring comprises a second annular bore having a second bore axis;
said second bore axis is not concentric with said central axis;
said second coupling center is concentric with said second bore axis; and
said mass shaft extends through said second annular bore.

15. The vibration suppression system set forth in claim 14, wherein:
said mass shaft is elongated about a shaft axis intersecting said first coupling center;
said mass shaft is fixed to said first inner ring, whereby said first inner ring rotates about said first coupling center with rotation of said mass shaft about said shaft axis and said mass shaft is restrained from movement axially along said shaft axis relative to said first inner ring; and
said mass shaft is in sliding engagement with said second inner ring, whereby said mass shaft is movable axially along said shaft axis relative to said second inner ring and said mass shaft is rotatable about said shaft axis relative to said second inner ring.

16. The vibration suppression system set forth in claim 5, comprising a vibration control housing adapted to be mounted to said rotor hub and operationally configured to rotate with said rotor hub about said hub axis in said rotational direction of said rotor hub.

17. The vibration suppression system set forth in claim 16, wherein said first rotor is rotationally supported by a first bearing set acting between said housing and said first rotor and said second rotor is rotationally supported by a second bearing set acting between said second rotor and said housing.

18. The vibration suppression system set forth in claim 9, wherein one of said first or second motors may be controlled to operate in a regeneration mode and the other of said first or second motors may be controlled to operate in a power generation mode.

19. The vibration suppression system set forth in claim 9, wherein said controller varies said displacement angle to vary said operational magnitude of said vibration control force vector and said controller maintains a constant displacement angle to maintain a desired constant operational magnitude of said vibration control force vector circularly about said central axis of rotation.

20. The vibration suppression system set forth in claim 9, wherein:
    said controller selectively controls said first motor and said second motor such that said first coupling center rotates about said central axis of rotation at a first rotational speed and said second coupling center rotates about said central axis of rotation at a second rotational speed, whereby said controller controls a speed differential between said speeds of rotation of said first and second coupling centers about said central axis of rotation;
    said controller varies said displacement angle by varying said speed differential from substantially 1 to 1;
    said controller varies said operational magnitude of said vibration control force vector by varying said speed differential such that said first rotational speed that said first coupling center rotates about said central axis of rotation is different from said second rotational speed that said second coupling center rotates about said central axis of rotation; and
    said controller maintains said operational magnitude of said vibration control force vector at a constant by maintaining said speed differential at substantially 1 to 1.

21. The vibration suppression system set forth in claim 9, comprising:
    a unit frame;
    said first motor having a stator mounted to said unit frame;
    said first rotor having an annular stator-facing rim and a plurality of magnets supported by said annular stator-facing rim;
    said second motor having a stator mounted to said unit frame; and
    said second rotor having an annular stator-facing rim and a plurality of magnets supported by said annular stator-facing rim.

22. The vibration suppression system set forth in claim 9, comprising:
    a unit frame;
    said first motor having a first stator mounted to said unit frame and a first output shaft rotatable about a first motor axis relative to said first stator;
    a first rotational coupling between said output shaft of said first motor and said first rotor;
    said second motor having a second stator mounted to said unit frame and a second output shaft rotatable about a second motor axis relative to said second stator; and
    a second rotational coupling between said second output shaft of said second motor and said second rotor.

23. The vibration suppression system set forth in claim 9, comprising a sensor for measuring vibration and providing said input signals to said controller.

24. The vibration suppression system set forth in claim 22, wherein:
    said first rotational coupling comprises a first output gear connected to said first output shaft and a first ring gear connected to said first rotor, said first ring gear in meshed engagement with said first output gear; and
    said second rotational coupling comprises a second output gear connected to said second output shaft and a second ring gear connected to said second rotor, said second ring gear in meshed engagement with said second output gear.

* * * * *